US008546299B2

(12) United States Patent
Fujii et al.

(10) Patent No.: US 8,546,299 B2
(45) Date of Patent: Oct. 1, 2013

(54) COLOR-DEVELOPING COMPOSITION AND RECORDING MATERIAL CONTAINING THE SAME

(75) Inventors: Hiroshi Fujii, Ichihara (JP); Tadashi Kawakami, Ichihara (JP); Satoshi Kodama, Ichihara (JP); Kazumi Jyujyo, Kisarazu (JP)

(73) Assignee: Nippon Soda Co., Ltd., Tokyo (JP)

( * ) Notice: Subject to any disclaimer, the term of this patent is extended or adjusted under 35 U.S.C. 154(b) by 281 days.

(21) Appl. No.: 12/997,791

(22) PCT Filed: Jun. 18, 2009

(86) PCT No.: PCT/JP2009/002787

§ 371 (c)(1),
(2), (4) Date: Dec. 13, 2010

(87) PCT Pub. No.: WO2009/153997

PCT Pub. Date: Dec. 23, 2009

(65) Prior Publication Data

US 2011/0104619 A1 May 5, 2011

(30) Foreign Application Priority Data

Jun. 18, 2008 (JP) ................................. 2008-159647
Aug. 1, 2008 (JP) ................................. 2008-200268

(51) Int. Cl.
*B41M 5/333* (2006.01)
*C09D 11/00* (2006.01)

(52) U.S. Cl.
USPC ....................................... 503/216; 106/31.18

(58) Field of Classification Search
None
See application file for complete search history.

(56) References Cited

U.S. PATENT DOCUMENTS

| | | | |
|---|---|---|---|
| 5,801,288 | A | 9/1998 | Fujii et al. |
| 6,037,308 | A | 3/2000 | Sato et al. |

FOREIGN PATENT DOCUMENTS

| | | | |
|---|---|---|---|
| CN | 1149867 | A | 5/1997 |
| EP | 0 764 635 | A1 | 3/1997 |
| EP | 0 860 429 | A1 | 8/1998 |
| EP | 2 272 682 | A1 | 1/2011 |
| JP | A-08-333329 | | 12/1996 |
| JP | A-10-029969 | | 2/1998 |
| JP | A-10-264522 | | 10/1998 |
| JP | A-2002-255925 | | 9/2002 |
| WO | WO 95/33714 | A1 | 12/1995 |

OTHER PUBLICATIONS

International Search Report in International Application No. PCT/JP2009/002787; dated Jul. 14, 2009 (with English-language translation).
Mar. 30, 2012 Extended European Search Report issued in European Patent Application No. 09766445.2.
International Preliminary Report on Patentability issued in International Application No. PCT/JP2009/002787 dated Feb. 8, 2011.

*Primary Examiner* — Bruce H Hess
(74) *Attorney, Agent, or Firm* — Oliff & Berridge, PLC

(57) ABSTRACT

Provided is a recording material with a superior heat resistance and having a low content of a dihydroxydiphenylsulfone derivative, and a color-developing composition for producing the recording material. With the use of this color-developing composition, a recording material with a superior heat resistance at the background part can be provided and the content of a dihydroxydiphenylsulfone derivative, such as 4,4'-dihydroxydiphenylsulfone, in the color-developing composition can be reduced to 2% by mass or less, or further to 1% by mass or less.

4 Claims, No Drawings

COLOR-DEVELOPING COMPOSITION AND RECORDING MATERIAL CONTAINING THE SAME

TECHNICAL FIELD

The present invention relates to color-developing compositions containing a diphenylsulfone cross-linking compound, especially to color-developing compositions with a low content of dihydroxydiphenylsulfone, and relates to recording materials containing the same. The present application claims priority to Japanese Patent Application No. 2008-159647 filed on Jun. 18, 2008 and Japanese Patent Application No. 2008-200268 filed on Aug. 1, 2008. Contents of these applications are hereby incorporated by reference in their entirety.

BACKGROUND ART

Diphenylsulfone cross-linking compounds represented by the following formula (1) are known as a color-developing composition or an image storage stabilizer (e.g., see Patent Document 1).

(1)

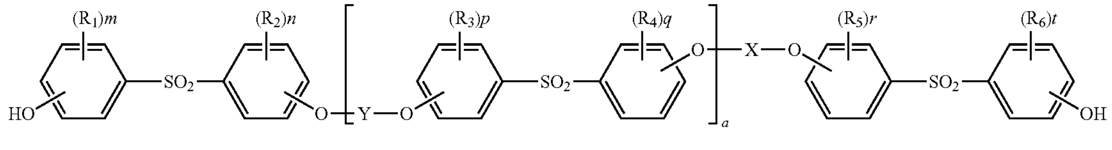

[wherein X and Y may each be different, and each either represents a linear or branched C1-C12 hydrocarbon group which may be saturated or unsaturated or may have an ether bond, or represents the following formula

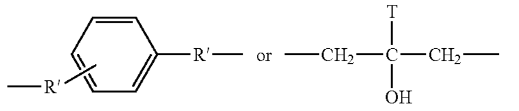

(wherein R' represents a methylene group or ethylene group; T represents a hydrogen atom or C1-C4 alkyl group); $R_1$-$R_6$ each independently represents a halogen atom, C1-C6 alkyl group or C2-C4 alkenyl group; m, n, p, q, r and t each represents an integer of 0 to 4 and when representing an integer of 2 or more, $R_1$-$R_6$ may each be different; and "a" represents an integer of 0 to 10)

such composition is a mixture of, for example, diphenylsulfone cross-linking compounds with different degrees of polymerization that are produced by reacting 4,4'-dihydroxydiphenylsulfone with bis(2-chloroethyl)ether. Therefore, the raw material 4,4'-dihydroxydiphenylsulfone is remained in the reactant.

However, since the 4,4'-dihydroxydiphenylsulfone referred to above is currently designated as a Type II Monitoring Chemical Substance set forth in the "Law Concerning the Examination and Regulation of Manufacture, etc. of Chemical Substances", compositions with a low content of this compound has been longed for. Further, this composition has been insufficient in terms of heat resistance at the background part when used for a recording material.

[Patent Document 1] Japanese Laid-Open Patent Application No. 10-29969

DISCLOSURE OF THE INVENTION

Object to be Solved by the Invention

The object of the present invention is to provide a color-developing composition containing a diphenylsulfone cross-linking compound with a low content of the raw material dihydroxydiphenylsulfone derivative, and to provide a recording material with a superior heat resistance with the use of the color-developing composition.

Means to Solve the Object

The present inventors have found a color-developing composition which contains dihydroxydiphenylsulfone in an amount of 2% by mass or less relative to the solid content of the reactants among those reactants having dihydroxydiphenylsulfone as a raw material, and have found recording materials containing such color-developing composition. The present invention has thus been completed.

The present invention thus relates to: [1] a recording material containing a color-developing composition, wherein the color-developing composition comprises as a main component one or more compounds represented by formula (III)

(III)

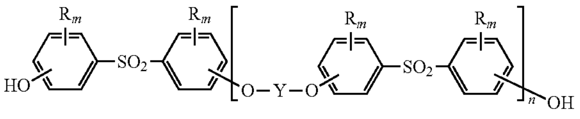

{wherein each R independently represents a halogen atom, C1-C6 alkyl group or C2-C6 alkenyl group; Y either represents a linear, branched or cyclic C1-C12 hydrocarbon group which may have an ether bond, or represents the following formula

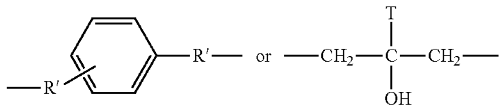

(wherein R' represents a methylene group or ethylene group and T represents a hydrogen atom or C1-C4 alkyl group); m represents an integer of 0 to 4; and n represents an integer of 1 to 6), and wherein a dihydroxydiphenylsulfone derivative represented by formula (I)

(I)

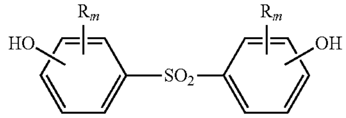

(wherein each R and m have the same meaning as defined above) is contained in the color-developing composition in an amount of 2% by mass or less relative to the total solid content of the color-developing composition, and [2] the recording material according to [1], wherein the one or more compounds represented by formula (III) is a reactant of the dihydroxydiphenylsulfone derivative represented by formula (I) and a dihalide represented by formula (II)

X—Y—X (II)

(wherein X represents a halogen atom and Y has the same meaning as defined above).

The present invention further relates to: [3] the recording material according to [1] or [2], wherein the dihydroxydiphenylsulfone derivative represented by formula (I) is 4,4'-dihydroxydiphenylsulfone.

The present invention still further relates to: [4] a color-developing composition which comprises as a main component one or more compounds represented by formula (III)

(III)

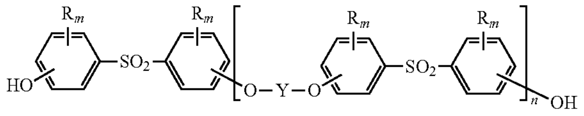

{wherein each R independently represents a halogen atom, C1-C6 alkyl group or C2-C6 alkenyl group; Y either represents a linear, branched or cyclic C1-C12 hydrocarbon group which may have an ether bond, or represents the following formula

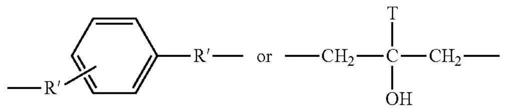

(wherein R' represents a methylene group or ethylene group and T represents a hydrogen atom or C1-C4 alkyl group); m represents an integer of 0 to 4; and n represents an integer of 1 to 6), and which contains a dihydroxydiphenylsulfone derivative represented by formula (I)

(I)

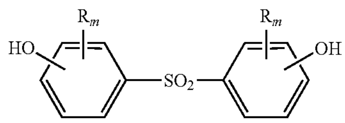

(wherein each R and m have the same meaning as defined above) in an amount of 2% by mass or less relative to the solid content of the color-developing composition, and [5] the color-developing composition according to [4], wherein the dihydroxydiphenylsulfone derivative represented by formula (I) is 4,4'-dihydroxydiphenylsulfone.

MODE OF CARRYING OUT THE INVENTION

Color-Developing Composition

A color-developing composition of the present invention is a color-developing composition which comprises as a main component one or more compounds represented by formula (III)

(III)

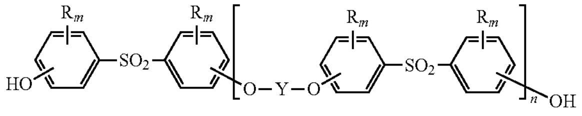

{wherein each R independently represents a halogen atom, C1-C6 alkyl group or C2-C6 alkenyl group; Y either represents a linear, branched or cyclic C1-C12 hydrocarbon group which may have an ether bond, or represents the following formula

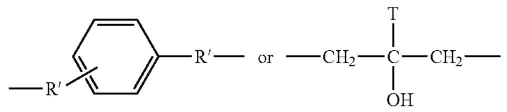

(wherein R' represents a methylene group or ethylene group and T represents a hydrogen atom or C1-C4 alkyl group); m represents an integer of 0 to 4; and n represents an integer of 1 to 6}, and wherein the a dihydroxydiphenylsulfone derivative represented by formula (I)

(I)

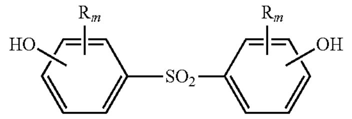

(wherein each R and m have the same meaning as defined above) is contained in the color-developing composition in an amount of 2% by mass or less relative to the total solid content of the color-developing composition (hereinafter referred to as a color-developing composition of the present invention).

In the present specification, "as a main component" means that one or more compounds represented by formula (III) are contained in the solid content of a color-developing composition in an amount of preferably 50-99.9% by mass relative to the solid content of the color-developing composition. When 2 or more kinds of the compounds represented by formula (III) are contained in the color-developing composition, it is taken to mean that the total amount of these compounds is within the range referred to in the above.

A color-developing composition of the present invention is obtained by reacting a compound of formula (I)

(I)

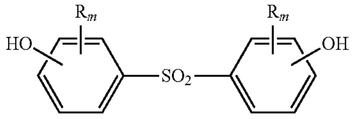

(wherein each R and m have the same meaning as defined above) with a dihalide represented by formula (II)

X—Y—X (II)

(wherein X represents a halogen atom and Y has the same meaning as defined above). For example, a color-developing composition of the present invention is produced as follows in a water solvent (e.g. see Japanese Laid-Open Patent Application No. 10-29969 and WO95/33714).

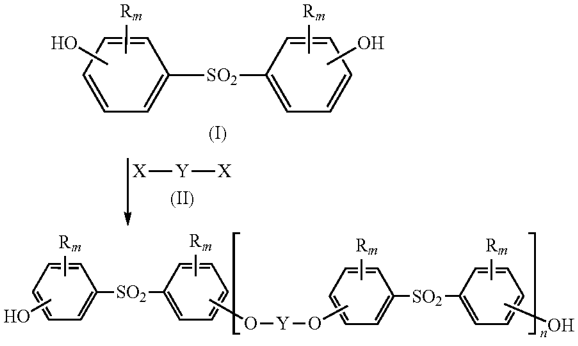

(III)

In the above reaction formula, each R independently represents a halogen atom, C1-C6 alkyl group or C2-C6 alkenyl group. Y either represents a linear, branched or cyclic C1-C12 hydrocarbon group which may have an ether bond, or represents the following formula

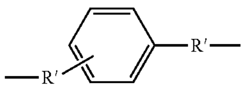 or 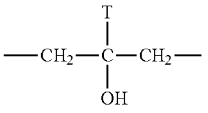

(wherein R' represents a methylene group or ethylene group, and T represents a hydrogen atom or C1-C4 alkyl group). X represents a halogen atom. m represents an integer of 0 to 4, and where m is 2 or more, they may be different from each other. n represents an integer of 1 to 6.

A color-developing composition of the present invention can be obtained by adjusting, if necessary, pH of the reactant produced as above, mixing the reactant with an organic solvent, cooling the mixture or allowing it to cool, and then carrying out separation by filtration.

An organic solvent to be mixed is preferably an alcohol solvent and a ketone solvent. The amount to be added is 5% by mass or more relative to the whole solution. The alcohol solvent is exemplified by chained or cyclic alcohols such as methanol, ethanol, propanol and isopropanol, where these may be used alone or as a mixed solvent of two or more kinds thereof. The ketone solvent is exemplified by chained or cyclic ketones such as acetone, methylisobutylketone, cyclopentanone, cyclohexanone and isophorone, where these may be used alone or as a mixed solvent of two or more kinds thereof.

Specific examples of the substituent for the compounds represented by the above formulae (I) to (III) are shown in the following.

Examples of R include a methyl group, ethyl group, n-propyl group, isopropyl group, n-butyl group, sec-butyl group, tert-butyl group, n-pentyl group, isopentyl group, neopentyl group, tert-pentyl group, n-hexyl group, isohexyl group, 1-methylpentyl group, 2-methylpentyl group, vinyl group, allyl group, isopropenyl group, 1-propenyl group, 2-butenyl group, 3-butenyl group, 1,3-butanedienyl group, and 2-methyl-2-propenyl group.

Examples of X include chlorine, bromine, fluorine and iodine.

Examples of Y include methylene group, ethylene group, trimethylene group, tetramethylene group, pentamethylene group, hexamethylene group, heptamethylene group, octamethylene group, nonamethylene group, decamethylene group, undecamethylene group, dodecamethylene group, methylmethylene group, dimethylmethylene group, methylethylene group, methyleneethylene group, ethylethylene group, 1,2-dimethylethylene group, 1-methyltrimethylene group, 1-methyltetramethylene group, 1,3-dimethyltrimethylene group, 1-ethyl-4-methyl-tetramethylene group, vinylene group, propenylene group, 2-butenylene group, ethynylene group, 2-butynylene group, 1-vinylethylene group, ethyleneoxyethylene group, tetramethyleneoxytetramethylene group, ethyleneoxyethyleneoxyethylene group, ethyleneoxymethyleneoxyethylene group, 1,3-dioxane-5,5-bismethylene group, 1,2-xylyl group, 1,3-xylyl group, 1,4-xylyl group, 2-hydroxytrimethylene group, 2-hydroxy-2-methyltrimethylene group, 2-hydroxy-2-ethyltrimethylene group, 2-hydroxy-2-propyltrimethylene group, 2-hydroxy-2-isopropyltrimethylene group, and 2-hydroxy-2-butyltrimethylene group.

Examples of T include a methyl group, ethyl group, n-propyl group, isopropyl group, n-butyl group, sec-butyl group and tert-butyl group. Preferably exemplified is an alkylene group having an ether bond such as an ethyleneoxyethylene group.

Such composition is consisting of a mixture of an unreacted raw material and reaction products with different polymerization degrees, and it is preferred that the composition contains all of the compounds from n=1 to n=6 represented by formula (III). However, because the production ratios differ among these compounds depending on reaction conditions and the like, it suffices if only one type of compounds is contained as for the compounds where n is 2 or more. A bis compound where n=1 is essential and is contained by 5-80% by mass, preferably 10-60% by mass, particularly preferably 20-50% by mass relative to the solid content of the reaction composition. Such reaction composition is preferably a reaction composition of 4,4'-dihydroxydiphenylsulfone and bis (2-chloroethyl)ether, where the n=1 compound is 2,2'-bis[4-(4-hydroxyphenylsulfonyl)phenoxy]diethylether.

In the present invention, the content of a compound of formula (I) is 2% by mass or less and further preferably 1% by mass or less relative to the solid content of the color-developing composition that is a reactant of the reaction referred to above. Here, the solid content of a color-developing composition means a composition represented by formula (III), a compound represented by formula (I), and residues of other raw materials and impurities.

Specific examples of the compound represented by formula (III) include: 4,4'-bis[4-[4-(4-hydroxyphenylsulfonyl)phenoxy]-2-trans-butenyloxy]diphenylsulfone, 4,4'-bis[4-(4-hydroxyphenylsulfonyl)phenoxy-4-butyloxy]diphenylsulfone, 4,4'-bis[4-(4-hydroxyphenylsulfonyl)phenoxy-3-propyloxy]diphenylsulfone, 4,4'-bis[4-(4-hydroxyphenylsulfonyl)phenoxy-2-ethyloxy] diphenylsulfone, 4-[4-(4-hydroxyphenylsulfonyl)phenoxy-4-butyloxy]-4'-[4-(4-hydroxyphenylsulfonyl)phenoxy-3-propyloxy]diphenylsulfone, 4-[4-(4-hydroxyphenylsulfonyl)phenoxy-4-butyloxy]-4'-[4-(4-hydroxyphenylsulfonyl)phenoxy-2-ethyloxy] diphenylsulfone, 4-[4-(4-hydroxyphenylsulfonyl)phenoxy-3-propyloxy]-4'-[4-(4-hydroxyphenylsulfonyl)phenoxy-2-ethyloxy]diphenylsulfone, 4,4'-bis[4-(4-hydroxyphenylsulfonyl)phenoxy-5-pentyloxy] diphenylsulfone, 4,4'-bis[4-(4-hydroxyphenylsulfonyl) phenoxy-6-hexyloxy]diphenylsulfone, 4-[4-[4-(4-hydroxyphenylsulfonyl)phenoxy]-2-trans-butenyloxy]-4'-[4-(4-hydroxyphenylsulfonyl)phenoxy-4-butyloxy] diphenylsulfone, 4-[4-(4-hydroxyphenylsulfonyl)phenoxy-2-trans-butenyloxy]-4'-[4-(4-hydroxyphenylsulfonyl) phenoxy-3-propyloxy]diphenylsulfone, 4-[4-[4-(4-hydroxyphenylsulfonyl)phenoxy]-2-trans-butenyloxy]-4'-[4-(4-hydroxyphenylsulfonyl)phenoxy-2-ethyloxy] diphenylsulfone, 1,4-bis[4-[4-[4-(4-hydroxyphenylsulfonyl) phenoxy-2-trans-butenyloxy]phenylsulfonyl]-cis-2-butene, 1,4-bis[4-[4-[4-(4-hydroxyphenylsulfonyl)phenoxy-2-trans-butenyloxy]phenylsulfonyl]phenoxy]-trans-2-butene, 4,4'-bis[4-[4-(2-hydroxyphenylsulfonyl)phenoxy]butyloxy] diphenylsulfone, 4,4'-bis[4-[2-(4-hydroxyphenylsulfonyl) phenoxy]butyloxy]diphenylsulfone, 4,4'-bis[4-(4-hydroxyphenylsulfonyl)phenoxy-2-ethyleneoxyethoxy] diphenylsulfone, 4,4'-bis[4-(4-hydroxyphenylsulfonyl) phenyl-1,4-phenylenebis methyleneoxy]diphenylsulfone, 4,4'-bis[4-(4-hydroxyphenylsulfonyl)phenyl-1,3-phenylenebis methyleneoxy]diphenylsulfone, 4,4'-bis[4-(4-hydroxyphenylsulfonyl)phenyl-1,2-phenylenebis methyleneoxy] diphenylsulfone, 2,2'-bis[4-[4-[4-(4-hydroxyphenylsulfonyl)phenoxy-2-ethyleneoxyethoxy] phenylsulfonyl]phenoxy]diethylether, α,α'-bis[4-[4-[4-(4-hydroxyphenylsulfonyl)phenyl-1,4-phenylenebismethyleneoxy]phenylsulfonyl]phenoxy]-p-xylene, α,α'-bis[4-[4-[4-(4-hydroxyphenylsulfonyl)phenyl-1,3-phenylenebismethyleneoxy]phenylsulfonyl]phenoxy]-m-xylene, α,α'-bis[4-[4-[4-(4-hydroxyphenylsulfonyl) phenyl-1,2-phenylenebismethyleneoxy]phenylsulfonyl] phenoxy]-o-xylene, 2,4'-bis[2-(4-hydroxyphenylsulfonyl) phenoxy-2-ethyleneoxyethoxy]diphenylsulfone, 2,4'-bis[4-(2-hydroxyphenylsulfonyl)phenoxy-2-ethyleneoxyethoxy] diphenylsulfone, 4,4'-bis[3,5-dimethyl-4-(3,5-dimethyl-4-hydroxyphenylsulfonyl)phenoxy-2-ethyleneoxyethoxy] diphenylsulfone, 4,4'-bis[3-allyl-4-(3-allyl-4-hydroxyphenylsulfonyl)phenoxy-2-ethyleneoxyethoxy] diphenylsulfone, 4,4'-bis[3,5-dimethyl-4-(3,5-dimethyl-4-hydroxyphenylsulfonyl)phenyl-1,4-phenylenebismethyleneoxy]diphenylsulfone, 4,4'-bis[3,5-dimethyl-4-(3,5-dimethyl-4-hydroxyphenylsulfonyl) phenyl-1,3-phenylenebismethyleneoxy]diphenylsulfone, 4,4'-bis[3,5-dimethyl-4-(3,5-dimethyl-4-hydroxyphenylsulfonyl)phenyl-1,2-phenylenebismethyleneoxy]diphenylsulfone, 4,4'-bis[3-allyl-4-(3-allyl-4-hydroxyphenylsulfonyl)1,4-phenylenebismethyleneoxy]diphenylsulfone, 4,4'-bis[3-allyl-4-(3-allyl-4-hydroxyphenylsulfonyl)1,3-phenylenebismethyleneoxy]diphenylsulfone, 4,4'-bis[3-allyl-4-(3-allyl-4-hydroxyphenylsulfonyl)1,2-phenylenebismethyleneoxy]diphenylsulfone, 4,4'-bis[4-(4-hydroxyphenylsulfonyl)phenoxy]-2-hydroxypropyloxy] diphenylsulfone, and 1,3-bis[4-[4-[4-(4-hydroxyphenylsulfonyl)phenoxy-2-hydroxypropyloxy] phenylsulfonyl]phenoxy]-2-hydroxypropane.

Particularly preferably exemplified is a reaction mixture of compounds represented by formula

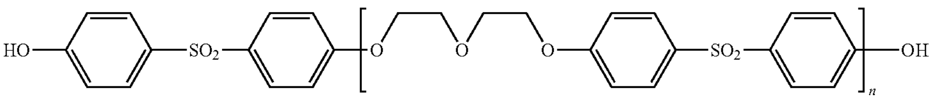

(wherein n represents an integer of 1 to 6).

(Recording Material)

When using a composition of the present invention as a color-developing composition for thermal recording papers, it may be used in a similar manner to a method of using known image storage stabilizers or color-developing agents. For example, a recording material can be produced as follows. Suspension solutions are mixed and applied onto a support, such as a paper, and dried, wherein the suspension solutions are prepared by respectively dispersing particulates of a composition of the present invention and particulates of a color-forming compound in the aqueous solutions comprising a water-soluble binder such as polyvinylalcohol and cellulose. Further, apart from the methods as described above wherein the color-developing composition is contained in the color-forming layer, the color-developing composition can also be contained in any layer such as a protective layer and undercoat layer when the thermal recording paper consists of a multilayer structure.

The ratio of a composition of the present invention to be used relative to a color-forming compound is 0.01 to 100 parts by mass relative to 1 part by mass of the color-forming compound. When used as a color-developing adjuvant, the ratio is preferably 0.01 to 10 parts by mass and particularly preferably 0.2 to 5 parts by mass relative to 1 part by mass of the color-forming compound. When used as a color-developing agent, the ratio is preferably 1 to 10 parts by mass, particularly preferably 1.5 to 5 parts by mass relative to 1 part by mass of the color-forming compound.

Two or more kinds of a composition of the present invention may be used in combination as a color-developing composition for a recording material of the present invention. For example, among the color-developing compositions of the present invention, one may be used as an image storage stabilizer and another as a color-developing agent. A mixture of the two or more kinds can be prepared by mixing the color-developing compositions in advance or they may be mixed at the point of use. In addition, a color-developing composition may be mixed with a color-forming compound or the like in such a manner that the compositions are mixed as powder, or added at the point of the preparation and dispersion of the coating solution, or added in the form of a dispersion solution. It is particularly advantageous when a composition of the present invention is used as a color-developing agent.

Further, n=1 compounds of the present invention include those having different crystalline forms depending on the conditions for precipitating crystals such as solvent types and the precipitation temperature, or those forming an adduct with the solvent, where all of these belong to the compounds of the present invention. Further, these n=1 compounds can be demonstrated based on the melting point of the crystal, an infrared spectroscopic analysis, X-ray diffraction analysis, etc.

A recording material of the present invention may further contain as necessary one or more of the following: another color-developing agent, another image storage stabilizer, sensitizer, loading material, dispersant, antioxidant, desensitizer, antiadhesive agent, defoamer, light stabilizer, fluorescent brightener, etc. These are respectively used in an amount of usually within a range of 0.01 to 15 parts by mass, preferably 1 to 10 parts by mass, relative to 1 part by mass of the color-forming compound. These agents may be contained in the color-forming layer, while they may be contained in any layer such as a protective layer when the recording material consists of a multilayer structure. Especially when an overcoat layer or undercoat layer is provided on the upper part and/or the bottom part of the color-forming layer, such overcoat layer and undercoat layer may contain an antioxidant, light stabilizer, etc. In addition, an antioxidant and a light stabilizer may be contained in these layers in such a manner as being encapsulated in a microcapsule according to need.

A color-developing composition of the present invention is suitably used as a color-developing agent mainly for thermal recording materials, and it may be used alone or in combination with a color-developing agent other than the reactant mentioned above.

When a color-developing composition of the present invention is used in combination with other color-developing agent, examples of such color-developing agent to be used include the following and they may be used alone or in combination of two or more kinds thereof according to need: a bisphenol compound such as bisphenol A, 4,4'-sec-butylidenebisphenol, 4,4'-cyclohexylidenebisphenol, 2,2'-bis(4-hydroxyphenyl)-3,3'-dimethylbutane, 2,2'-dihydroxydiphenyl, pentamethylene-bis(4-hydroxybenzoate), 2,2'-dimethyl-3,3'-di(4-hydroxyphenyl)pentane, 2,2'-di(4-dihydroxyphenyl)hexane, 2,2-bis(4-hydroxyphenyl)propane, 2,2-bis(4-hydroxyphenyl)butane, 2,2-bis(4-hydroxy-3-methylphenyl)propane, 4,4'-(1-phenylethylidene)bisphenol, 4,4'-ethylidenebisphenol, (hydroxyphenyl)methylphenol, 2,2-bis(4-hydroxyphenyl)-4-methylpentane, 4,4-isopropylidenebis-o-cresol, 4,4'-dihydroxy-diphenylmethane, 2,2'-bis(4-hydroxy-3-phenyl-phenyl)propane, 4,4'-(1,3-phenylenediisopropylidene) bisphenol, 4,4'-(1,4-phenylenediisopropylidene)bisphenol, and 2,2-bis(4-hydroxyphenyl)butyl acetate; a sulfur containing bisphenol such as 4,4'-dihydroxydiphenylthioether, 1,7-di(4-hydroxyphenylthio)-3,5-dioxaheptane, 2,2'-di(4-hydroxyphenylthio)diethylether, 4,4'-dihydroxy-3,3'-dimethylphenylthioether, 1,5-di(4-hydroxyphenylthio)-3-oxapentane, bis(4-hydroxyphenylthioethoxy)methane, and a condensation mixture primarily comprising a binuclear condensate of 2,2'-methylenebis(4-t-butylphenol) described in Japanese Laid-Open Patent Application No. 2003-154760; 4-hydroxybenzoic acid esters such as 4-hydroxybenzoic acid benzyl, 4-hydroxybenzoic acid ethyl, 4-hydroxybenzoic acid propyl, 4-hydroxybenzoic acid isopropyl, 4-hydroxybenzoic acid butyl, 4-hydroxybenzoic acid isobutyl, 4-hydroxybenzoic acid chlorobenzyl, 4-hydroxybenzoic acid methylbenzyl and 4-hydroxybenzoic acid diphenylmethyl; a benzoic acid metal salt such as zinc benzoate and zinc 4-nitrobenzoate; a condensate of 4-hydroxybenzoic acid and polyhydric alcohol; salicylic acids such as bis(4-(2-(4-methoxyphenoxy) ethoxy))salicylate, 3,5-bis(α-methylbenzyl)salicylate, and 3,5-bis-tert-butylsalicylate; a salicylate metal salt such as zinc salicylate, and zinc-bis(4-(octyloxycarbonylamino)-2-hydroxybenzoate); hydroxysulfones such as 4,4'-dihydroxydiphenylsulfone, 4-hydroxy-4'-isopropoxydiphenylsulfone, 4-hydroxy-4'-butoxydiphenylsulfone, 4-hydroxy-4'-phenylsulfonyloxy-3,3'-phenylsulfonyldiphenylsulfone, 4,4'-dihydroxy-3,3'-diallyldiphenylsulfone, 3,4-dihydroxy-4'-methyldiphenylsulfone, 4,4'-dihydroxy-3,3',5,5'-tetrabromodiphenylsulfone, 2-(4-hydroxyphenylsulfonyl) phenol, a mixture of 2-(4-hydroxyphenylsulfonyl)phenol and 4,4'-sulfonyldiphenol, an equivalent mixture of 4-(4-methylphenylsulfonyl)phenol and 2-(4-methylphenylsulfonyl) phenol, 4,4'-sulfonylbis(2-(2-propenyl))phenol, 4-((4-(propoxy)phenyl)sulfonyl)phenol, 4-((4-(allyloxy)phenyl) sulfonyl)phenol, 4-((4-(benzyloxy)phenyl)sulfonyl)phenol, and 2,4-bis(phenylsulfonyl)-5-methyl-phenol; multivalent metal salts such as 4-phenylsulfonylphenoxy zinc, 4-phenylsulfonylphenoxy magnesium, 4-phenylsulfonylphenoxy aluminum and 4-phenylsulfonylphenoxy titanium; 4-hydroxyphthalic acid diesters such as dimethyl 4-hydroxyphthalate; dicyclohexyl 4-hydroxyphthalate, and diphenyl 4-hydroxyphthalate; hydroxy naphthalene acid esters such as 2-hydroxy-6-carboxynaphthalene; hydroxyacetophenone; p-phenylphenol; benzyl 4-hydroxyphenyl acetate; p-benzylphenol; hydroquinone-monobenzylether; trihalomethylsulfones; 4,4'-bis((4-methylphenylsulfonyl)aminocarbonylamino) diphenylmethane; sulfonylureas such as N-(4-methylphenylsulfonyl)-N'-(3-(4-methylphenylsulfonyloxy)phenyl)urea, tetracyanoquinodimethanes; 2,4-dihydroxy-2'-methoxybenzanilide; N-(2-hydroxyphenyl)-2-((4-hydroxyphenyl)thio) acetamide; N-(4-hydroxyphenyl)-2-((4-hydroxyphenyl)thio) acetamide; 4-hydroxybenzenesulfonanilide; 4'-hydroxy-4-methylbenzenesulfonanilide; 4,4'-bis((4-methyl-3-phenoxycarbonyl)aminophenylureide))diphenylsulfone; 3-(3-phenylureide)benzenesulfonamide; octadecyl phosphate; and dodecyl phosphate.

Preferably exemplified are 4,4'-isopropylidenediphenol, 2,2-bis(4-hydroxyphenyl)-4-methylpentane, 4,4'-isopropylidenebis-o-cresol, 4,4'-(1-phenylethylidene)bisphenol, 4,4'-cyclohexylidenebisphenol, 2,2-bis(4-hydroxy-3-phenylphenyl)propane, 4,4'-(1,3-phenylendiisopropylidene) bisphenol, 4,4'-(1,4-phenylendiisopropylidene)bisphenol, bis(p-hydroxyphenyl)butyl acetate, 4,4'-dihydroxydiphenylsulfone, 2,4'-dihydroxydiphenylsulfone, bis(3-allyl-4-hydroxyphenyl)sulfone, 4-hydroxy-4'-isopropoxydiphenylsulfone, 4-hydroxy-4'-n-propoxydiphenylsulfone, 4-hydroxy-4'-allyloxydiphenylsulfone, 4-hydroxy-4'-benzyloxydiphenylsulfone, 3,4-dihydroxyphenyl-4'-methylphenylsulfone, N-(2-hydroxyphenyl)-2-[(4-hydroxyphenyl)thio]acetamide, N-(4-hydroxyphenyl)-2-[(4-hydroxyphenyl)thio]acetamide, an equivalent mixture of N-(2-hydroxyphenyl)-2-[(4-hydroxyphenyl)thio]acetamide and N-(4-hydroxyphenyl)-2-[(4-hydroxyphenyl)thio]acetamide, benzyl p-hydroxybenzoate, di(4-hydroxy-3-methylphenyl)sulfide, 4-hydroxybenzene sulfonanilide, hydroquinonemonobenzyl ether, a condensation mixture primarily comprising a binuclear condensate of 2,2'-methylenebis(4-t-butylphenol) described in Japanese Laid-Open Patent Application No. 2003-154760, 4,4'-bis(N-p-tolylsulfonylaminocarbonylamino)diphenylmethane, N-p-tolylsulfonyl-N'-3-(p-tolylsulfonyloxy)phenylurea, 4,4'-bis[(4-methyl-3-phenoxycarbonylaminophenylureide)]diphenylsulfone, 3-(3-phenylureide)benzenesulfonamide, zinc-bis[4-(n-octyloxycarbonylamino)salicylate]dihydrate, zinc 4-[2-(4-methoxyphenoxy)ethoxy]salicylate, and zinc 3,5-bis(α-methylbenzyl)salicylate.

More specifically, these color-developing agents may be appropriately used at a ratio of such as 0.1 to 10 parts by mass relative to 1 part by mass of a color-developing composition of the present invention. For example, a thermal recording paper can be produced by combining 1 part by mass of a color-developing composition of the present invention and 1 part by mass of 4-hydroxy-4'-isopropoxydiphenylsulfone as other color-developing agent, relative to 1 part by mass of 3-di(n-butyl)amino-6-methyl-7-anilinofluoran as a dye. Likewise, the color-developing agents referred to above such as 4-hydroxy-4'-n-propoxydiphenylsulfone, 4-hydroxy-4'-allyloxydiphenylsulfone and 2,4'-dihydroxydiphenylsulfone may be combined.

Following color-developing agents are also exemplified when used for pressure sensitive copying papers: an inorganic acid substance such as an acid earth, activated earth, attapulgite, bentonite, colloidal silica, aluminum silicate, magnesium silicate, zinc silicate, tin silicate, fired kaolin and talc; aliphatic carboxylic acid such as oxalic acid, maleic acid, tartaric acid, citric acid, succinic acid and stearic acid; aromatic carboxylic acid such as benzoic acid, p-t-butylbenzoic acid, phthalic acid, gallic acid, salicylic acid, 3-isopropylsalicylic acid, 3-phenylsalicylic acid, 3-cyclohexylsalicylic acid, 3-5-di-t-butylsalicylic acid, 3-methyl-5-benzylsalicylic acid, 3-phenyl-5-(2,2-dimethylbenzyl)salicylic acid, 3,5-di-(2-methylbenzyl)salicylic acid and 2-hydroxy-1-benzyl-3-naphthoic acid; a metallic salt such as zinc, magnesium, aluminum and titanium of these aromatic carboxylic acids; a color-developing agent based on phenolic resin such as p-phenylphenol-formalin resin and p-butylphenol-acetylene resin; and a mixture of such phenolic resin-based color-developing agent and the metallic salt of an aromatic carboxylic acid mentioned above.

When using a reactant represented by formula (III) and other color-developing agent in combination, content of the reactant represented by formula (III) is not particularly limited. However, the mass ratio of a compound represented by formula (III) is preferably within a range of 10:0.01 to 0.01:10, more preferably within a range of 10:0.1 to 0.1:10, and still more preferably within a range of 10:1 to 1:10.

Examples of the color-forming compound to be used for a recording material of the present invention include: a leuco dye such as fluoran-based, phthalide-based, lactam-based, triphenylmethane-based, phenothiazine-based and spiropyran-based dyes. The color-forming compound, however, is not limited to these examples and any color-forming compound may be used as long as it forms color by contacting with an acid substance. Further, although it is a matter of course to use these color-forming compounds singularly to produce a recording material of the color developed by the dye used, the color-forming compounds may also be used in combination of two or more kinds thereof. For example, it is possible to produce a recording material that produces a real black by using dyes developing three primary colors (red, blue, green) and/or black dyes in combination.

Examples of the color-forming compound include: 3-diethylamino-6-methyl-7-anilinofluoran, 3-di(n-butyl)amino-6-methyl-7-anilinofluoran, 3-(N-methyl-N-cyclohexylamino)-6-methyl-7-anilinofluoran, 3-(N-ethyl-N-isobutylamino)-6-methyl-7-anilinofluoran, 3-(N-methyl-N-propylamino)-6-methyl-7-anilinofluoran, 3-(N-ethyl-N-isoamylamino)-6-methyl-7-anilinofluoran, 3-(N-ethyl-p-toluidino)-6-methyl-7-anilinofluoran, 3-diethylamino-7-(m-trifluoromethylanilino)fluoran, 3-di(n-pentyl)amino-6-methyl-7-anilinofluoran, 3-(N-ethyl-N-ethoxypropylamino)-6-methyl-7-anilinofluoran, 3-diethylamino-6-methyl-7-n-octylaminofluoran, 3-diethylamino-6-methyl-7-(m-methylanilino)fluoran, 3-diethylamino-6-methyl-7-(o,p-dimethylanilino)fluoran, 3-diethylamino-6-chloro-7-anilinofluoran, 3-diethylamino-7-(o-chloroanilino)fluoran, 3-dibutylamino-7-(o-chloroanilino)fluoran, 3-(N-ethyl-N-tetrahydrofurfurylamino)-6-methyl-7-anilinofluoran, 3-dibutylamino-7-(o-fluoroanilino)fluoran, 3-diethylamino-7-(o-fluoroanilino)fluoran, 2,4-dimethyl-6-[(4-dimethylamino)anilino]fluoran, 2-chloro-3-methyl-6-p(p-phenylaminophenyl)aminoanilinofluoran, 3,3-bis[1-(4-methoxyphenyl)-1-(4-dimethylaminophenyl)ethylene-2-yl]-4,5,6,7-tetrachlorophthalide, 3,6,6'-tris(dimethylamino)spiro[fluorene-9,3'-phthalide], 3,3-bis(p-dimethylaminophenyl)-6-dimethylaminophthalide, 10-benzoyl-3,7-bis(dimethylamino)phenothiazine, 3-(4-diethylamino-2-hexyloxyphenyl)-3-(1-ethyl-2-methyl-3-indolyl)-4-azaphthalide, 3-(4-diethylamino-2-methylphenyl)-3-(1-ethyl-2-methyl-3-indolyl)-4-azaphthalide, 3-(4-diethylamino-2-ethoxyphenyl)-3-(1-ethyl-2-methyl-3-indolyl)-4-azaphthalide, 3-(4-diethylamino-2-ethoxyphenyl)-3-(1-octyl-2-methyl-3-indolyl)-4-azaphthalide, 3-diethylamino-5-methyl-7-dibenzylaminofluoran, 3-diethylamino-7-dibenzylaminofluoran, 3-(N-ethyl-p-tolyl) amino-7-N-methylanilinofluoran, 3,3-bis(4-diethylamino-2-ethoxyphenyl)-4-azaphthalide, 3-[2,2-bis(1-ethyl-2-methylindole-3-yl)vinyl]-3-[4-(diethyl amino)phenyl]isobenzofuran-1-one, 3,6,6'-tris(dimethylamino)spiro[fluorene-9,3'-phthalide], 2-[3,6-bis(diethylamino)-9-(o-chloroanilino)xanthyl]benzoic acid lactam, 3-diethylamino-7-chlorofluoran, 3,6-bis-(diethylamino)fluoran-γ-(4'-nitro)-anilinolactam, 3-diethylamino-benzo[a]fluoran, 3-(N-ethyl-N-isopentylamino)-benzo[a]fluoran, 2-methyl-6-(N-ethyl-N-p-tolylamino)fluoran, 3,3-bis(1-butyl-2-methyl-3-indolyl)phthalide, 3-diethylamino-6-methyl-7-chlorofluoran, 3-dibutylamino-6-methyl-7-bromofluoran, 3-cyclohexylamino-6-chlorofluoran, 3-diethylamino-6,8-dimethylfluoran, and 4,4'-isopropylidenedi(4-phenoxy)bis[4-(quinazoline-2-yl)-N,N-diethylaniline].

Preferred examples of the black dye include: 3-diethylamino-6-methyl-7-anilinofluoran, 3-di(n-butyl)amino-6-methyl-7-anilinofluoran, 3-(N-methyl-N-cyclohexylamino)-6-methyl-7-anilinofluoran, 3-(N-methyl-N-propylamino)-6-methyl-7-anilinofluoran, 3-(N-ethyl-N-isoamylamino)-6-methyl-7-anilinofluoran, 3-(N-ethyl-p-toluidino)-6-methyl-7-anilinofluoran, 3-diethylamino-7-(m-trifluoromethylanilino)fluoran, 3-di(n-pentyl)amino-6-methyl-7-anilinofluoran, 3-(N-ethyl-N-ethoxypropylamino)-6-methyl-7-anilinofluoran, 3-diethylamino-6-methyl-7-n-octylaminofluoran, 3-diethylamino-6-methyl-7-(m-methylanilino)fluoran, 3-diethylamino-6-chloro-7-anilinofluoran, 3-diethylamino-7-(o-chloroanilino)fluoran, 3-dibutylamino-7-(o-chloroanilino)fluoran, 3-(N-ethyl-N-tetrahydrofurfurylamino)-6-methyl-7-anilinofluoran, and 3-dibutylamino-7-(o-fluoroanilino)fluoran.

Especially preferred examples include: 3-diethylamino-6-methyl-7-anilinofluoran, 3-di(n-butyl)amino-6-methyl-7-anilinofluoran, 3-(N-ethyl-N-isoamylamino)-6-methyl-7-anilinofluoran, 3-(N-ethyl-p-toluidino)-6-methyl-7-anilinofluoran, and 3-di(n-pentyl)amino-6-methyl-7-anilinofluoran.

The near-infrared absorption dye can be exemplified by 3,3-bis[1-(4-methoxyphenyl)-1-(4-dimethylaminophenyl)ethylene-2-yl]-4,5,6,7-tetrachlorophthalide, and 3,6,6'-tris(dimethylamino)spiro[fluorene-9,3'-phthalide].

In addition, examples of the blue dye, green dye, red dye and yellow dye include: 3,3-bis(p-dimethylaminophenyl)-6-dimethylaminophthalide, 3-(4-diethylamino-2-ethoxyphenyl)-3-(1-ethyl-2-methyl-3-indolyl)-4-azaphthalide, 3-(4-diethylamino-2-ethoxyphenyl)-3-(1-octyl-2-methyl-3-indolyl)-4-azaphthalide, 3-diethylamino-7-dibenzylaminofluoran, 3-(N-ethyl-p-tolyl)amino-7-N-methylanilinofluoran, 3,3-bis(4-diethylamino-2-ethoxyphenyl)-4-azaphthalide, 3,6,6'-tris(dimethylamino) spiro[fluorene-9,3'-phthalide], 3-diethylamino-7-chlorofluoran, 3-diethylamino-benzo[a]fluoran, 3-diethylamino-6-methyl-7-chlorofluoran, 3-cyclohexylamino-6-chlorofluoran, 3-diethylamino-6,8-dimethylfluoran, and 4,4'-isopropylidenedi(4-phenoxy)bis[4-(quinazoline-2-yl)-N,N-diethylaniline].

When a color-developing composition of the present invention is used in combination with other image storage stabilizer, the examples of such image storage stabilizer include the following and they may be used alone or in combination of two or more kinds thereof according to need: 1,1,3-tris(2-methyl-4-hydroxy-5-t-butylphenyl)butane, 1,1,3-tris(2-methyl-4-hydroxy-5-t-cyclohexylphenyl)butane, 4,4'-butylidenebis(6-t-butyl-3-methylphenol), 2,2'-methylenebis(6-t-butyl-4-methylphenol), 2,2'-methylenebis(6-t-butyl-4-ethylphenol), 4,4'-thiobis(6-t-butyl-3-methylphenol), 1,3,5-tris(2,6-dimethyl-4-t-butyl-3-hydroxybenzyl)isocyanurate, 1,3,5-tris[[3,5-bis(1,1-dimethylethyl)-4-hydroxyphenyl]methyl]-1,3,5-triazine-2,4,6(1H, 3H, 5H)-trione, 2-methyl-2-[[4-[[4-(phenylmethoxy)phenyl]sulfonyl]phenoxy] methyl]-oxirane, 2,4,8,10-(tetra(t-butyl)-6-hydroxy-12H-dibenzo[d,g][1,3,2]dioxaphosphocin-6-oxide sodium salt, 2,2-bis(4'-hydroxy-3',5'-dibromophenyl)propane, 4,4'-sulfonylbis(2,6-dibromophenol) 2-(2'-hydroxy-5'-methylphenyl) benzotriazole, 4-benzyloxy-4-(2-methylglycidyloxy)-diphenylsulfone, 4,4'-diglycidyloxydiphenylsulfone, 1,4-diglycidyloxybenzene, 4-(α-(hydroxymethyl)benzyloxy)-4'-hydroxydiphenylsulfone, and 2,2-methylenebis(4,6-tert-butylphenyl)phosphate.

Preferably exemplified are 1,1,3-tris(2-methyl-4-hydroxy-5-t-butylphenyl)butane, 1,1,3-tris(2-methyl-4-hydroxy-5-t-cyclohexylphenyl)butane, 4,4'-butylidenebis(6-t-butyl-3-methylphenol), 2,2'-methylenebis(4-ethyl-6-t-butylphenol), 1,3,5-tris(2,6-dimethyl-4-t-butyl-3-hydroxybenzyl)isocyanurate, 2-methyl-2-[[4-[[4-(phenylmethoxy)phenyl]sulfonyl]phenoxy]methyl]-oxirane, 4,4'-sulfonylbis(2,6-dibromophenol), and 2-(2'-hydroxy-5'-methylphenyl) benzotriazole.

Examples of the sensitizer include the following and they may be used alone or in combination of two or more kinds thereof according to need: a higher fatty acid amide such as stearic acid amide; benzamide; stearic acid anilide; acetoacetanilide; thioacetanilide; dibenzyl oxalate; di(4-methylbenzyl)oxalate; di(4-chlorobenzyl)oxalate; dimethyl phthalate; dimethyl terephthalate; dibenzyl terephthalate; dibenzyl isophthalate; bis(tert-butylphenol); diphenylsulfone and its derivative such as 4,4'-dimethoxydiphenylsulfone, 4,4'-diethoxydiphenylsulfone, 4,4'-dipropoxydiphenylsulfone, 4,4'-diisopropoxydiphenylsulfone, 4,4'-dibutoxydiphenylsulfone, 4,4'-diisobutoxydiphenylsulfone, 4,4'-dipentyloxydiphenylsulfone, 4,4'-dihexylphenylsulfone, 2,4'-dimethoxydiphenylsulfone, 2,4'-diethoxydiphenylsulfone, 2,4'-dipropoxydiphenylsulfone, 2,4'-diisopropoxydiphenylsulfone, 2,4'-dibutoxydiphenylsulfone, 2,4'-dipentyloxydiphenylsulfone, 2,4'-dihexyloxydiphenylsulfone; diethers of 4,4'-dihydroxydiphenylsulfone; diethers of 2,4'-dihydroxydiphenylsulfone; 1,2-bis(phenoxy)ethane; 1,2-bis(4-methylphenoxy)ethane; 1,2-bis(3-methylphenoxy)ethane; diphenylamine; carbazole; 2,3-di-m-tolylbutane; 4-benzylbiphenyl; 4,4'-dimethylbiphenyl; m-terphenyl; di-β-naphthylphenylenediamine; 1-hydroxy-2-naphthoic acid phenyl ester; 2-naphthylbenzyl ether; 4-methylphenyl-biphenylether; 1,2-bis(3,4-dimethylphenyl) ethane; 2,3,5,6-tetramethyl-4'-methyldiphenylmethane; 1,2-bis(phenoxymethyl)benzene; acrylic acid amide; diphenylsulfone; 4-acetylbiphenyl; and carbonic acid diphenyl.

Preferably exemplified are 2-naphthylbenzylether, m-terphenyl, p-benzylbiphenyl, benzyl oxalate, di(p-chlorobenzyl)oxalate, an equivalent mixture of benzyl oxalate and di(p-chlorobenzyl)oxalate, di(p-methylbenzyl)oxalate, an equivalent mixture of di(p-chlorobenzyl)oxalate and di(p-methylbenzyl)oxalate, 1-hydroxy-2-naphthoic acid phenyl ester, 1,2-diphenoxyethane, 1,2-di-(3-methylphenoxy) ethane, 1,2-bis(phenoxymethyl)benzene, dimethyl terephthalate, stearic acid amide, "amide AP-1" (a mixture of stearic acid amide and palmitic acid amide at 7:3), diphenylsulfone, and 4-acetylbiphenyl.

More specifically, these sensitizers may be appropriately used at a ratio of 0.1 to 10 parts by mass relative to 1 part by mass of a dye. For example, a thermal recording paper can be produced by combining 2 parts by mass of a color-developing composition of the present invention and 1 part by mass of di(p-methylbenzyl)oxalate as a sensitizer, relative to 1 part by mass of 3-di(n-butyl)amino-6-methyl-7-anilinofluoran as a dye. Likewise, the sensitizers referred to above such as 1,2-di-(3-methylphenoxy)ethane, 1,2-bis(phenoxymethyl)benzene and diphenylsulfone may be combined.

As a loading material, the followings can be used: silica, clay, kaolin, fired kaolin, talc, satin white, aluminum hydroxide, calcium carbonate, magnesium carbonate, zinc oxide, titanium oxide, barium sulfate, magnesium silicate, aluminum silicate, plastic pigment, etc. Particularly preferred for a recording material of the present invention is a salt of alkaline earth metal. A carbonate salt is further preferred, and calcium carbonate, magnesium carbonate, etc. are preferable. The ratio of loading material for use is 0.1 to 15 parts by mass, preferably 1 to 10 parts by mass relative to 1 part by mass of the color-forming compound. In addition, the loading materials referred to above can be mixed for use.

Examples of the dispersant include sulfosuccinic acid esters such as dioctyl sodium sulfosuccinate, dodecylbenzenesulfonic acid sodium, sodium salt of lauryl alcohol sulfate ester, and a fatty acid salt.

Examples of the antioxidant include 2,2'-methylenebis(4-methyl-6-tert-butylphenol), 2,2'-methylenebis(4-ethyl-6-tert-butylphenol), 4,4'-propylmethylenebis(3-methyl-6-tert-butylphenol), 4,4'-butylidenebis(3-methyl-6-tert-butylphenol), 4,4'-thiobis(2-tert-butyl-5-methylphenol), 1,1,3-tris(2-methyl-4-hydroxy-5-tert-butylphenol)butane, 4-[4-{(1,1-bis(4-hydroxyphenyl)ethyl}-α,α'-dimethylbenzyl] phenol, 1,1,3-tris(2-methyl-4-hydroxy-5-cyclohexylphenyl) butane, 2,2'-methylenebis(6-tert-butyl-4-methylphenol), 2,2'-methylenebis(6-tert-butyl-4-ethylphenol), 4,4'-thiobis (6-tert-butyl-3-methyl-phenol, 1,3,5-tris((4-(1,1-dimethylethyl)-3-hydroxy-2,6-dimethylphenyl)methyl-1,3,5-triazine-2,4,6(1H, 3H, 5H)-trione, and 1,3,5-tris((3,5-bis(1,1-dimethylethyl)-4-hydroxyphenyl)methyl)-1,3,5-triazine-2,4,6(1H, 3H, 5H)-trione.

The desensitizer is exemplified by a fatty higher alcohol, polyethyleneglycol and guanidine derivative.

The antiadhesive agent is exemplified by stearic acid, zinc stearate, calcium stearate, carnauba wax, paraffin wax and ester wax.

Examples of the light stabilizer include: a salicylic acid-based ultraviolet absorber such as phenylsalicylate, p-tert-butylphenylsalicylate, and p-octylphenylsalicylate a benzophenone-based ultraviolet absorber such as 2,4-dihydroxybenzophenone, 2-hydroxy-4-methoxybenzophenone, 2-hydroxy-4-benzyloxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl)methane; a benzotriazole-based ultraviolet absorber such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3-tert-butyl-5'-methylphenyl)-5-chloro-benzotriazole, 2-(2'-hydroxy-3',5'-di-tert-amylphenyl)benzotriazole, 2-(2'-hydroxy-3',5'-di-tert-butylphenyl)-5-chlorobenzotriazole, 2-(2'-hydroxy-5'-tert-butylphenyl)benzotriazole, 2-(2'-hydroxy-5'-(1",1",3",31"-tetramethylbutyl)phenyl)benzotriazole, 2-[2'-hydroxy-3'-(3",4",5",6"-tetrahydrophthalimidomethyl)-5'-methylphenyl]benzotriazole, 2-(2'-hydroxy-5'-tert-octylphenyl)benzotriazole, 2-[2'-hydroxy-3',5'-bis(α,α'-dimethylbenzyl)phenyl]-2H-benzotriazole, 2-(2'-hydroxy-3'-dodecyl-5'-methylphenyl)benzotriazole, 2-(2'-hydroxy-3'-undecyl-5'-methylphenyl)benzotriazole, 2-(2'-hydroxy-3'-tridecyl-5'-methylphenyl)benzotriazole, 2-(2'-hydroxy-3'-tetradecyl-5'-methylphenyl)benzotriazole, 2-(2'-hydroxy-3'-pentadecyl-5'-methylphenyl)benzotriazole, 2-(2'-hydroxy-3'-hexadecyl-5'-methylphenyl)benzotriazole, 2-[2'-hydroxy-4'-(2"-ethylhexyl)oxyphenyl]benzotriazole, 2-[2'-hydroxy-4'-(2"-ethylheptyl)oxyphenyl]benzotriazole, 2-[2'-hydroxy-4'-(2"-ethyloctyl)oxyphenyl]benzotriazole, 2-[2'-hydroxy-4'-(2"-propyloctyl)oxyphenyl]benzotriazole, 2-[2'-hydroxy-4'-(2"-propylheptyl)oxyphenyl]benzotriazole, 2-[2'-hydroxy-4'-(2"-propylhexyl)oxyphenyl]benzotriazole, 2-[2'-hydroxy-4'-(1"-ethylhexyl)oxyphenyl]benzotriazole, 2-[2'-hydroxy-4'-(1"-ethylheptyl)oxyphenyl]benzotriazole, 2-[2'-hydroxy-4'-(1"-ethyloctyl)oxyphenyl]benzotriazole, 2-[2'-hydroxy-4'-(1"-propyloctyl)oxyphenyl]benzotriazole, 2-[2'-hydroxy-4'-(2"-propylheptyl)oxyphenyl]benzotriazole, 2-[2'-hydroxy-4'-(2"-propylhexyl)oxyphenyl]benzotriazole, 2,2'-methylenebis[4-(1,1,3,3-tetramethylbutyl)-6-(2H-benzotriazole-2-yl)phenol, and a condensate of polyethyleneglycol and methyl-3-[3-tert-butyl-5-(2H-benzotriazole-2-yl)-4-hydroxyphenyl]propionate; a cyanoacrylate-based ultraviolet absorber such as 2'-ethylhexyl-2-cyano-3,3-diphenylacrylate, and ethyl-2-cyano-3,3-diphenylacrylate; a hindered amine-based ultraviolet absorber such as bis(2,2,6,6-tetramethyl-4-piperidyl)sebacate, succinic acid-bis(2,2,6,6-tetramethyl-4-piperidyl)ester, and 2-(3,5-di-tert-butyl)malonic acid-bis(1,2,2,6,6-pentamethyl-4-piperidyl)ester; and 1,8-dihydroxy-2-acetyl-3-methyl-6-methoxynaphthalene and its related compounds.

Examples of the fluorescent dye include 4,4'-bis[2-anilino-4-(hydroxyethyl)amino-1,3,5-triazinyl-6-amino]stilbene-2,2'-disulfonic acid disodium salt, 4,41-bis[2-anilino-4-bis(hydroxyethyl)amino-1,3,5-triazinyl-6-amino]stilbene-2,2'-disulfonic acid disodium salt, 4,4'-bis[2-methoxy-4-(hydroxyethyl)amino-1,3,5-triazinyl-6-amino]stilbene-2,2'-disulfonic acid disodium salt, 4,4'-bis[2-anilino-4-(hydroxypropyl)amino-1,3,5-triazinyl-6-amino]stilbene-2,2'-disulfonic acid disodium salt, 4,4'-bis[2-m-sulfoanilino-4-bis(hydroxyethyl)amino-1,3,5-triazinyl-6-amino] stilbene-2,2'-disulfonic acid disodium salt, 4-[2-p-sulfoanilino-4-bis(hydroxyethyl)amino-1,3,5-triazinyl-6-amino]-4'-[2-m-sulfoanilino-4-bis(hydroxyethyl)amino-1,3,5-triazinyl-6-amino]stilbene-2,2'-disulfonic acid tetrasodium salt, 4,4'-bis[2-p-sulfoanilino-4-bis(hydroxyethyl)amino-1,3,5-triazinyl-6-amino]stilbene-2,2'-disulfonic acid tetrasodium salt, 4,4'-bis[2-(2,5-disulfoanilino)-4-phenoxyamino-1,3,5-triazinyl-6-amino]stilbene-2,2'-disulfonic acid hexasodium salt, 4,4'-bis[2-(2,5-disulfoanilino)-4-(p-methoxycarbonylphenoxy) amino-1,3,5-triazinyl-6-amino]stilbene-2,2'-disulfonic acid hexasodium salt, 4,4'-bis[2-(p-sulfophenoxy)-4-bis(hydroxyethyl)amino-1,3,5-triazinyl-6-amino]stilbene-2,2'-disulfonic acid hexasodium salt, 4,4'-bis[2-(2,5-disulfoanilino)-4-formalinylamino-1,3,5-tri azinyl-6-amino] stilbene-2,2'-disulfonic acid hexasodium salt, and 4,4'-bis[2-(2,5-disulfoanilino)-4-bis(hydroxyethyl)amino-1,3,5-triazinyl-6-amino]stilbene-2,2'-disulfonic acid hexasodium salt.

Following embodiments can be exemplified for dispersant solutions containing a color-developing composition of the present invention.

EMBODIMENT 1

4-Hydroxy-4'-isopropoxydiphenylsulfone is contained as a first color-developing agent, a dibenzyloxalate compound is contained as a sensitizer, and a color-developing composition of the present invention and/or 1,1,3-tris(2-methyl-4-hydroxy-5-cyclohexylphenyl)butane is contained as a second color-developing agent. A mixture solution comprising this dispersant solution is applied and dried to form a thermal recording material.

Further, a dispersant solution containing the above color-developing agent preferably contains an itaconic acid-denatured polyvinylalcohol as a dispersant in an amount of 7.5 wt % or more relative to the total dry weight of the dispersant solution. In addition, it is preferred to contain ethyleneoxide with a cloud point of 50° C. or above.

EMBODIMENT 2

A color-developing composition of the present invention and following (A) and/or (B) are contained in a thermal recording composition comprising as main components a leuco dye and a color-developing agent which develops the leuco dye upon heating.

(A) (Poly)-4-hydroxybenzoate Derivative Represented by the Following Formula (2)

(2)

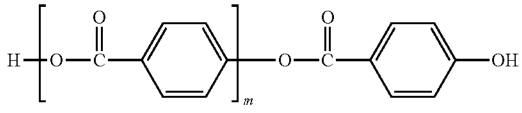

(wherein m represents an integer of 0 to 2)

(B) Ureaurethane Compound.

Further, the leuco dye is dispersed by using a nonionic surfactant, and the content ratio of a component having the particle diameter of 0.07 μm or less can be achieved to be 1.0% or less when the average particle diameter of the leuco dye is 0.10-0.30 μm.

Alternatively, the leuco dye can be dispersed by concurrently using a nonionic surfactant and an anionic surfactant.

Further, thermal recording materials can be preferably produced with the use of these thermal recording compositions.

Examples of the ureaurethane compound include compounds represented by any one of the following formulae (3) to (8).

(3)

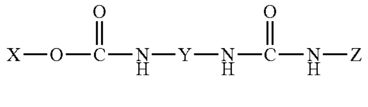

(wherein X, Y and Z represent an aromatic compound residue, heterocyclic compound residue or aliphatic compound residue, where each residue may have a substituent)

(4)

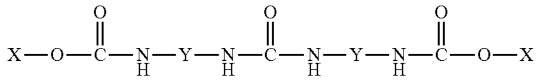

(wherein X and Y represent an aromatic compound residue, heterocyclic compound residue or aliphatic compound residue, where each residue may have a substituent)

(5)

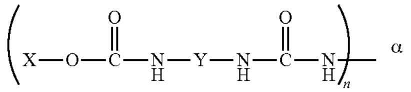

(wherein X and Y represent an aromatic compound residue, heterocyclic compound residue or aliphatic compound residue; α represents a residue with a valence of divalence or more; and n represents an integer of 2 or more. Each residue may have a substituent.)

(6)

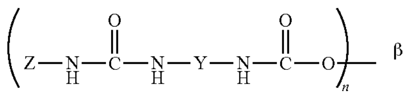

(wherein Z and Y represent an aromatic compound residue, heterocyclic compound residue or aliphatic compound residue; β represents a residue with a valence of divalence or more; and n represents an integer of 2 or more. Each residue may have a substituent.)

(7)

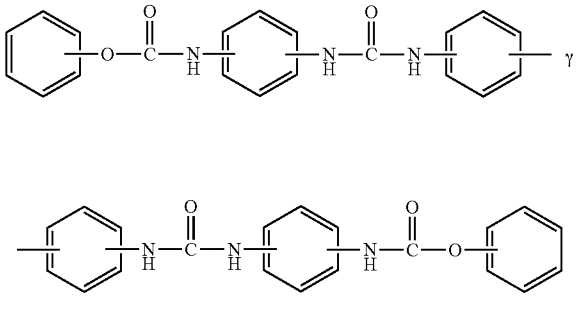

(wherein a hydrogen atom of the benzene ring may be substituted by an aromatic compound residue, aliphatic compound residue or heterocyclic residue, where each residue may have a substituent; γ represents anyone of —$SO_2$—, —O—, —$(S)_n$—, —$(CH_2)_n$—, —CO—, —CONH— and formulae (a)

(a)

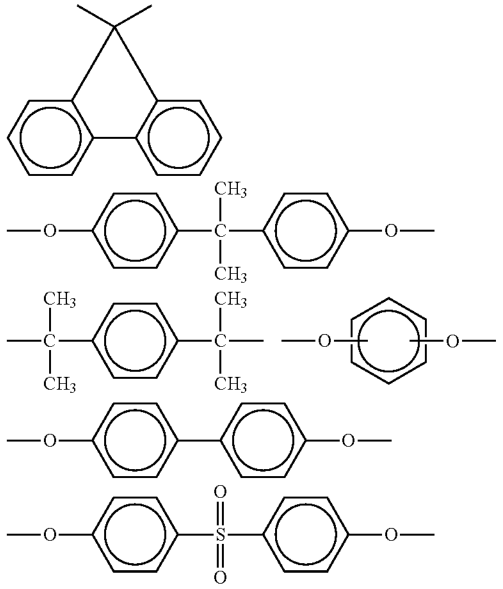

or represents its absence; and n represents an integer of 1 or 2)

(8)

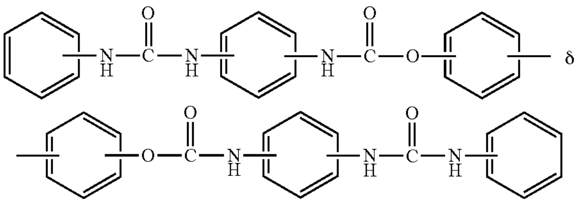

(wherein a hydrogen atom on the benzene ring may be substituted by an aromatic compound residue, aliphatic compound residue or heterocyclic residue, where each residue may have a substituent; δ represents —$SO_2$—, —O—, —$(S)_n$—, —$(CH_2)_n$—, —CO—, —CONH—, —NH—, —$CH(COOR_1)$—, —$C(CF_3)_2$—$CR_2R_3$—, or represents its absence; $R_1$, $R_2$ and $R_3$ represent an alkyl group; and n represents an integer of 1 or 2)

Further, the above color-developing compositions may contain a nonionic surfactant as a dispersant.

Following embodiments can be exemplified for recording materials.

EMBODIMENT 3

For a thermal recording material, wherein an undercoat layer having a binder and a loading material as main components and a thermal color-forming layer having a leuco dye, a color-developing agent and a binder as main components are sequentially accumulated onto a support, a color-developing composition of the present invention is used as a color-developing agent in the thermal color-forming layer, and a water-insoluble and alkali-soluble high-molecular compound is used as a binder for the thermal color-forming layer and/or the undercoat layer.

A protective layer may be further provided, which contains a water-soluble high-molecular compound, a cross-linking agent and a loading material as main components, on the thermal color-forming layer.

Still further, a backcoat layer which contains a binder and a loading material as main components may be further provided on the surface opposite to the thermal color-forming layer of a support, and a water-insoluble and alkali-soluble high-molecular compound may be used as a binder for the backcoat layer.

Still further, a thermal recording material can be prepared in which an adhesive layer and an abrasive board are sequentially accumulated onto the backcoat layer that is provided on the surface opposite to or on the thermal color-forming layer of a support.

In this embodiment, a water-insoluble and alkali-soluble high-molecular compound as a binder is not particularly limited. However, such compound is preferred that is not dissolved in water but is dissolved or swelled when immersed in or contacted with an alkaline solution and that is dissolved or swelled in aqueous solution of 1% NaOH. Specifically exemplified are an acrylic acid ester type (co)polymer, styrenic/acrylic copolymer, epoxy resin, polyvinyl acetate, polyvinylidene chloride, polyvinyl chloride, and a derivative of these.

In this embodiment, a leuco dye used for a thermal color-forming layer may be adopted alone or in combination of 2 or more kinds thereof, and those leuco dyes adopted for thermal recording materials of this type may be arbitrarily adopted herein. For example, leuco dye compounds of such as triphenylmethane-based, fluoran-based, phenothiazine-based, auramine-based, spiropyran-based and indolinophthalide-based are preferably used. Specific examples of the leuco dye include the following.

3,3-Bis(p-dimethylaminophenyl)-phthalide, 3,3-bis(p-dimethylaminophenyl)-6-dimethylaminophthalide (alias: crystal violet lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)-phthalide, 3-cyclohexylphenylamino-6-chlorofluoran, 3-dimethylamino-5,7-dimethylfluoran, 3-N-methyl-N-isopropyl-6-methyl-7-anilinofluoran, 3-N-methyl-N-isobutyl-6-methyl-7-anilinofluoran, 3-N-methyl-N-isoamyl-6-methyl-7-anilinofluoran, 3-diethylamino-7-chlorofluoran, 3-diethylamino-7-methylfluoran, 3-diethylamino-7,8-benzofluoran, 3-diethylamino-6-methyl-7-chlorofluoran, 3-(N-p-tolyl-N-ethylamino)-6-methyl-7-anilinofluoran, 3-pyrrolidino-6-methyl-7-anilinofluoran, 2-{N-(3'-trifluolmethylphenyl)amino}-6-diethylaminofluoran, 2-{3,6-bis(diethylamino)-9-(o-chloroanilino)xanthylic benzoate lactam}, 3-diethylamino-6-methyl-7-(m-trichloromethylanilino) fluoran, 3-diethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyclohexylamino-6-methyl-7-anilinofluoran, 3-diethylamino-6-methyl-7-anilinofluoran, 3-diethylamino-6-methyl-7-(2',4'-dimethylanilino)fluoran, 3-(N,N-diethylamino)-5-methyl-7-(N,N-dibenzylamino)fluoran, benzoylleucomethylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl)phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl) phthalide, 3-(2'-methoxy-4'-dimethylaminophenyl)-3-(2'-hydroxy-4'-chloro-5'-methylphenyl)phthalide, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino) fluoran, 3-pyrrolidino-7-(di-p-chlorophenyl)methylaminofluoran, 3-diethylamino-5-chloro-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-(N-methyl-N-isopropylamino)-6-methyl-7-anilinofluoran, 3-dibutylamino-6-methyl-7-anilinofluoran, 3-dipentylamino-6-methyl-7-anilinofluoran, 3,6-bis(dimethylamino) fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-N-ethyl-N-(2-ethoxypropyl) amino-6-methyl-7-anilinofluoran, 3-N-ethyl-N-tetrahydrofurfurylamino-6-methyl-7-anilinofluoran, and 3-diethylamino-6-methyl-7-mesitidino-4',5'-benzofluoran.

Further, phenolic substances, organic or inorganic acid substances, or the esters and salts of these as exemplified below can be used as a color-developing agent together with a color-developing composition of the present invention: gallic acid, salicylic acid, 3-isopropylsalicylic acid, 3-cyclohexylsalicylic acid, 3,5-di-tert-butylsalicylic acid, 3,5-di-α-methylbenzyl salicylic acid, 4,4'-isopropylidenediphenol, 1,1'-isopropylidenebis(2-chlorophenol), 4,4'-isopropylidenebis(2,6-dibromophenol), 4,4'-isopropylidenebis(2,6-dichlorophenol), 4,4'-isopropylidenebis(2-methylphenol), 4,4'-isopropylidenebis(2,6-dimethylphenol), 4,4'-isopropylidenebis(2-tert-butylphenol), 4,4'-sec-butylidenediphenol, 4,4'-cyclohexylidenebisphenol, 4,4'-cyclohexylidenebis(2-methylphenol), 4-tert-butylphenol, 4-phenylphenol, 4-hydroxydiphenoxide, α-naphthol, β-naphthol, 3,5-xylenol, thymol, methyl-4-hydroxybenzoate, 4-hydroxyacetophenone, novolac-type phenolic resin, 2,2'-thiobis(4,6-dichlorophenol), catechol, resorcin, hydroquinone, pyrogallol, phloroglycine, phloroglycine carboxylic acid, 4-tert-octylcatechol, 2,2'-methylenebis(4-chlorophenol), 2,2'-methylenebis(4-methyl-6-tert-butylphenol), 2,2'-dihydroxydiphenyl, ethyl p-hydroxybenzoate, propyl p-hydroxybenzoate, butyl p-hydroxybenzoate, benzyl p-hydroxybenzoate, p-hydroxybenzoate-p-chlorobenzyl, p-hydroxybenzoate-o-chlorobenzyl, p-hydroxybenzoate-p-methylbenzyl, p-hydroxybenzoate-n-octyl, benzoic acid, zinc salicylate, 1-hydroxy-2-naphthoic acid, 2-hydroxy-6-naphthoic acid, zinc 2-hydroxy-6-naphthoic acid, 4-hydroxydiphenylsulfone, 4-hydroxy-4'-chlorodiphenylsulfone, bis(4-hydroxydiphenyl)sulfide, 2-hydroxy-p-toluoylic acid, zinc 3,5-di-tert-butylsalicylic acid, tin 3,5-di-tert-butylsalicylic acid, tartaric acid, oxalic acid, maleic acid, citric acid, succinic acid, stearic acid, 4-hydroxyphthalic acid, boric acid, thiourea derivative, 4-hydroxythiophenol derivative, ethyl bis (4-hydroxyphenyl)acetate, n-propyl bis(4-hydroxyphenyl) acetate, n-butyl bis(4-hydroxyphenyl)acetate, phenyl bis (4-hydroxyphenyl)acetate, benzyl bis(4-hydroxyphenyl) acetate, phenethyl bis(4-hydroxyphenyl)acetate, bis(3-methyl-4-hydroxyphenyl)acetate, methyl bis(3-methyl-4-hydroxyphenyl)acetate, n-propyl bis(3-methyl-4-hydroxyphenyl)acetate, 1,7-bis(4-hydroxyphenylthio)3,5-dioxaheptane, 1,5-bis(4-hydroxyphenylthio)-3-oxapentane, dimethyl 4-hydroxyphthalate, 4-hydroxy-4'-methoxydiphenylsulfone, 4-hydroxy-4'-ethoxydiphenylsulfone, 4-hydroxy-4'-isopropoxydiphenylsulfone, 4-hydroxy-4'-propoxydiphenylsulfone, 4-hydroxy-4'- butoxydiphenylsulfone, 4-hydroxy-4'-isobutoxydiphenylsulfone, 4-hydroxy-4'-sec-butoxydiphenylsulfone, 4-hydroxy-4'-tert-butoxydiphenylsulfone, 4-hydroxy-4'-benzyloxydiphenylsulfone, 4-hydroxy-4'-phenoxydiphenylsulfone, 4-hydroxy-4'-(m-methylbenzyloxy)diphenylsulfone, 4-hydroxy-4'-(p-methylbenzyloxy)diphenylsulfone, 4-hydroxy-4'-(o-methylbenzyloxy)diphenylsulfone, and 4-hydroxy-4'-(p-chlorobenzyloxy)diphenylsulfone.

EMBODIMENT 4

A thermal color-forming layer that forms color upon heating is provided on a support, and a protective layer containing a binding resin, cross-linking agent, filler and releasing agent (which being a hydrocarbon group-denatured silicone oil) is provided on the thermal color-forming layer.

Here, the thermal color-forming layer contains a color-developing composition of the present invention, and at least one color-developing agent selected from a (poly)4-hydroxybenzoate derivative, ureaurethane compound, diphenylsulfonic acid derivative, a compound having a sulfonylaminocarbonylamide group, and 4,4'-dihydroxydiphenylsulfone.

Further, it is preferred that the binding resin is polyvinylalcohol having a reactive carbonyl group and that the cross-linking agent is a hydrazide compound.

Further, it is preferred that the oil absorption of the filler is 50 ml/100 g to 200 ml/100 g, and it is even more preferred that the filler is contained at 100-500% relative to the binding resin.

In addition, it is preferable to provide an intermediate layer containing thermoplastic hollow resin powder between the support and the thermal color-forming layer.

In this embodiment, conventionally known substances can be used as a hydrocarbon group-denatured silicone oil to be used as a releasing agent. For example, an alkyl-denatured silicone oil, aralkyl-denatured silicone oil and alkyl/aralkyl-denatured silicone oil may be used. These hydrocarbon group-denatured silicone oils can be obtained by reacting α-olefin, a phenyl group substituted α-olefin, etc. with silicone oil having a Si—H group. Here, the number of carbons in the hydrocarbon group is not particularly limited, but it is usually between 2 and 12, preferably between 3 and 8. These hydrocarbon group-denatured silicone oils are sold from such as Dow Corning Toray by the product name of “SM7001”, “SM7002”, etc.

In this embodiment, while a similar binding resin to those used in Embodiment 1 may be used, polyvinylalcohol having a reactive carbonyl group may also be used. The polyvinylalcohol having a reactive carbonyl group can be produced by a known method such as wherein a vinyl monomer having a reactive carbonyl group is copolymerized with an aliphatic acid vinyl ester to obtain a polymer and then the polymer is subjected to saponification. The vinyl monomer having a reactive carbonyl group includes a compound having an ester bond and a compound having acetone group, where a vinyl monomer having a diacetone group is preferred. Specifically, diacetoneacrylamide and meta-diacetoneacrylamide are preferred. As for the aliphatic acid vinyl ester, vinyl formate, vinyl acetate, vinyl propionate, etc. are exemplified, where vinyl acetate is preferred. The polyvinylalcohol having a reactive carbonyl group for use in this embodiment may be those wherein polymerizable vinyl monomers are polymerized. These polymerizable vinyl monomers are exemplified by acrylic acid ester, butadiene, ethylene, propylene, acrylic acid, methacrylic acid, maleic acid, maleic acid anhydrate, itaconic acid, etc. The content of the reactive carbonyl group in the polyvinylalcohol having a reactive carbonyl group used in this embodiment is 0.5-20 mol % in the polymer. A range of 2-10 mol % is particularly preferred from the standpoint of water resistance. If the content is less than 2%, water resistant becomes practically insufficient. Even when the content exceeds 10 mol % contrarily, water resistance will not improve and it becomes expensive from the economical standpoint. Polymerization degree of the polyvinylalcohol having a reactive carbonyl group used in this embodiment is between 300 and 3000, where a range between 500 and 2200 is particularly preferred. Saponification degree is preferably 80% or more.

Examples of the hydrazine compound as a cross-linking agent include but not limited to carbohydrazide, oxalic acid dihydrazide, formic acid hydrazide, acetic acid hydrazide, malonic acid dihydrazide, succinic acid dihydrazide, adipic acid dihydrazide, azelaic acid hydrazide, sebacic acid dihydrazide, dodecanedioic acid dihydrazide, maleic acid dihydrazide, fumar, itaconic acid dihydrazide, benzoic acid hydrazide, glutaric acid dihydrazide, diglycolic acid hydrazide, tartaric acid dihydrazide, malic acid dihydrazide, isophthalic acid hydrazide, terephthalic acid dihydrazide, 2,7-naphthoic acid dihydrazide and polyacrylic acid hydrazide. In this embodiment, two or more types of hydrazide compounds may be used in combination, and other known cross-linking agents such as epichlorohydrin and glyoxal may be used in combination in so far as the activity of the hydrazide compound is not impaired.

Examples of the filler include calcium carbonate, silica, zinc oxide, titanium oxide, aluminum hydroxide, zinc hydroxide, barium sulfate, clay, talc, surface-treated inorganic particulates of such as calcium and silica, urea-formalin resin, styrene/methacrylate copolymer, and organic particulates of such as polystyrene resin.

EMBODIMENT 5

A thermal color-forming layer is provided on a support, wherein the thermal color-forming layer contains as main components a leuco dye and a color-developing agent which develops the leuco dye upon heating. A color-developing composition of the present invention is used as a color-developing agent and the thermal color-forming layer also contains a calcium phosphate compound having a petal-type porous structure and oil absorption of 150 ml/100 g or more.

It is preferred that the thermal color-forming layer further contains any one of 4-acetylbiphenyl, bis(4-methylbenzyl) oxalate and dibenzyl oxalate as a thermoplastic compound.

It is further preferred to provide an intermediate layer between the support and the thermal color-forming layer, wherein the intermediate layer comprises hollow powder formed by a copolymer of acrylonitrile and/or methacrylonitrile and/or acrylic acid ester and/or methacrylic acid ester. A hollow rate of the hollow powder is 60% to 98%, and it is preferred that the maximum particle diameter (D100) is 5.0-10.0 μm, while D100/D50, the ratio of the maximum particle diameter relative to the particle diameter of 50% frequency (D50), being 1.5 to 3.0.

Further, the average particle diameter of the leuco dye is preferably 0.10-0.30 μm.

A calcium phosphate compound for use in this embodiment which has a petal-type porous structure and oil absorption of 150 ml/100 g or more has been porousified that occur concurrently with calcium-phosphorus exchange brought by treating heavy calcium carbonate or light calcium carbonate with phosphoric acid. Such calcium phosphate compound refers to a special calcium carbonate/calcium phosphate complex and the examples include amorphous calcium phosphate ($Ca_3(PO_4)_2.nH_2O$), fluorine apatite ($Ca_{10}(PO_4)_6F_2$), hydroxyapatite ($Ca_{10}(PO_4)_6(OH)_2$), octacalcium phosphate ($Ca_8H_2(PO_4)_6.5H_2O$), and tricalcium phosphate ($Ca_3(PO_4)_2$). Further specific examples include product names Poronex, Poronex 40G and Poronex 40P (calcium phosphates manufactured by Maruo Calcium Co., Ltd.) as well as HAP (hydroxyapatite manufactured by Maruo Calcium Co., Ltd.). Herein, oil absorption shall refer to those stipulated in JIS-K-5101 and it is preferred to be 150 ml/100 g or more from the standpoint of sticking quality. If the oil absorption is below this level, troubles such as adhesion of slag and occurrence of sticking tend to occur.

Leuco dyes are exemplified by those referred to in the embodiment 1.

EMBODIMENT 6

In a thermal recording material consisted by providing a thermal color-forming layer on a support wherein the thermal color-forming layer comprises a leuco dye and a color-developing agent as main components, 4-hydroxy-4'-allyloxydiphenylsulfone and 4,4'-diallyloxydiphenylsulfone as well as a color-developing composition of the present invention as a color-developing agent are contained in the thermal color-forming layer.

It is preferred that 0.5 to 10 parts by weight of 4,4'-diallyloxydiphenylsulfone is contained relative to 100 parts by weight of 4-hydroxy-4'-allyloxydiphenylsulfone, and that the weight ratio between 4-hydroxy-4'-allyloxydiphenylsulfone and the color-developing composition of the present invention is preferably between 3:7 to 7:3.

The above-mentioned leuco dye is preferably any one of 3-dibutylamino-6-methyl-7-anilinofluoran, 3-di(n-pentyl)amino-6-methyl-7-anilinofluoran, and 3-(N-ethyl-N-p-toluidino)-6-methyl-7-anilinofluoran. The average particle diameter of the leuco dye is preferably 0.1-0.3 μm.

Further, an undercoat layer at least comprising hollow powder can be provided between the support and the thermal recording layer, and it is preferred that the hollow powder comprises a thermoplastic resin as a shell, and has a hollow rate of 30% or more and the average particle diameter of 0.4-10 μm. Still further, a printing layer can be provided on the thermal recording layer.

These recording materials can be made into thermal recording type labels by providing an adhesive layer on the back side surface of the support of a thermal recording material. They may also be used for thermal recording magnetic ticket papers, thermal recording type tickets, thermal recording type loyalty point cards, etc.

EMBODIMENT 7

In a thermal recording material comprising on a support a thermal color-forming layer that forms color upon heating and a protective layer containing a binding resin, cross-linking agent, filler and releasing agent in this sequential order, the releasing agent is a spherical powder silicone compound having a structure of $(CH_3SiO_{3/2})_n$(n>15) and the thermal color-forming layer contains a color-developing composition of the present invention.

In this embodiment, the average particle diameter of the spherical powder silicone compound having the structure of $(CH_3SiO_{3/2})_n$ is preferably 1-4 μm.

The spherical powder silicone compound having the structure of $(CH_3SiO_{3/2})_n$ is preferably used as a releasing agent solution that is uniformly dispersed in an aqueous surfactant solution.

Further, the binding resin for the above-mentioned protective layer is preferably polyvinylalcohol comprising a reactive carbonyl group.

Further, the cross-linking agent of the protective layer is preferably a hydrazide compound and the filler for the protective layer preferably contains at least one among aluminum hydroxide, calcium carbonate and kaolin. It is preferred that the filler for the protective layer is aluminum hydroxide with the average particle diameter of 0.2-0.5 μm and that Montan ester wax is contained in the protective layer.

In this embodiment, it is preferred that a thermal color-forming layer contains an acidic filler and it is further preferred that the acidic filler is silica.

The thermal color-forming layer preferably contains polyvinylalcohol comprising a reactive carbonyl group.

As other specific examples of the binding resin, cross-linking agent and releasing agent, those the same as the exemplifications in Embodiments 1 and 2 can be used.

EMBODIMENT 8

In a thermal recording material provided with a thermal color-forming layer wherein the thermal color-forming layer comprises a leuco dye and a color-developing agent on the top side surface of a support having a top side surface and a back side surface, 4-hydroxy-4'-allyloxydiphenylsulfone and a color-developing composition of the present invention are contained as the above-mentioned color-developing agents at a ratio of 1/1 to 1/0.1, and a leuco dye of 0.15 μm or more and 0.8 μm or less is used.

Further, it is preferred that the leuco dye is at least one kind selected from the group consisting of 2-anilino-3-methyl-6-dibutylaminofluoran, 2-anilino-3-methyl-6-dipentylaminofluoran and 2-anilino-3-methyl-6-[ethyl (4-methylphenyl)amino]fluoran It is preferred to further provide an under layer comprising plastic hollow powder having the hollow rate of 50% or more between the support and the thermal color-forming layer.

Further, it is preferred to provide an over layer comprising a pigment and a water-soluble resin on the thermal color-forming layer.

In this embodiment, the support is preferably a plastic film or a synthetic paper, and it is preferred that the above-mentioned back side surface of the support is further provided with a back layer and/or adhesive layer. The back side surface of the support may be further provided with a magnetic recording layer.

As for the leuco dye and the color-developing agent, those the same as the exemplifications in Embodiments 1 and 2 can be exemplified.

As for the pigment, there are inorganic pigments and organic pigments, where, for example, a known pigment conventionally used as a filler may be used. The specific examples include a silicate salt such as silica dioxide, calcium silicate, magnesium silicate, aluminum silicate, zinc silicate and amorphous silica; an inorganic pigment such as zinc oxide, aluminum oxide, titanium oxide, aluminum hydroxide, barium sulfate, talc, clay, magnesium oxide, magnesium hydroxide, calcium carbonate and magnesium carbonate; and an organic pigment such as a nylon resin filler, urea-formalin resin filler and raw starch powder.

EMBODIMENT 9

In a thermal recording material comprising a thermal color-forming layer on a support, the thermal color-forming layer contains a leuco dye, a first color-developing agent and a second color developing agent (a color-developing composition of the present invention), wherein the first color-developing agent is obtained by reacting a compound represented by the following formula

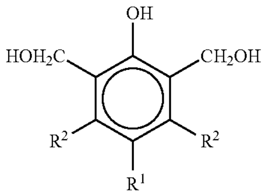

with a compound represented by the following formula,

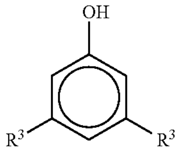

and wherein a compound represented by the following formula

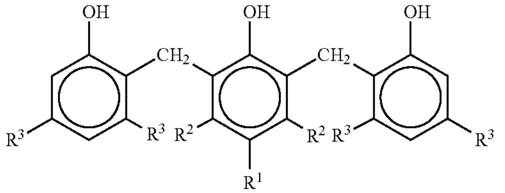

(wherein $R_1$ represents a halogen group, cyano group, alkyl group having 1-10 carbons, alkoxyl group having 1-10 carbons or aryl group having 6-8 carbons; $R_2$ represents a hydrogen atom, halogen group, cyano group, alkyl group having 1-4 carbons or alkoxyl group having 1-4 carbons; and $R_3$ represents a hydrogen atom, halogen group, cyano group, alkyl group having 1-4 carbons or alkoxyl group having 1-4 carbons) has a molar fraction of 35% to 85%.

The mass ratio of the second color-developing agent, which is a color-developing composition of the present invention, relative to the leuco dye can be 0.2 to 2.

Further, the average particle diameters of the first and second color-developing agents are preferably 0.5-2.0 μm.

The above-mentioned leuco dye is 3-(N-cyclohexyl-N-methylamino)-6-methyl-7-anilinofluoran, 6'-(N-ethyl-N-4-methylphenylamino)-3'-methyl-2'-phenylamino spiro [isobenzofuran-1(3H), 9'-[9H]xanthene]-3-one, or 2-anilino-3-methyl-6-dibutylaminofluoran. The average particle diameter can be 0.1-0.3 μm.

Further, the thermal color-forming layer may further contain calcium carbonate and the weight ratio of the calcium carbonate relative to the leuco dye can be 0.5 to 3.

Further, an undercoat layer at least comprising hollow powder can be provided between the support and the thermal color-forming layer. It is preferred that the hollow powder has a hollow rate of 80% or more and the average particle diameter of 0.4-10 μm.

Alternatively, a protective layer comprising diacetone-denatured polyvinylalcohol can be provided on the thermal color-forming layer, and it is preferred that the protective layer further contains a hydrazide compound.

As a hydrazide compound, those the same as the exemplifications in Embodiment 2 can be exemplified.

EMBODIMENT 10

For a thermal recording material comprising a support, an intermediate layer on the support, and a thermal recording layer containing at least a leuco dye and a color-developing agent on the intermediate layer, a color-developing composition of the present invention is used as the color-developing agent and a dispersion solution as follows is used as a forming solution for the intermediate layer.

Such dispersion solution comprises hollow powder, styrene-butadiene copolymer, and a copolymer of vinylalcohol and a metal salt of allyl sulfonate. The hollow rate of hollow powder is 60% to 98%, and the maximum particle diameter (D100) is 5.0-10.0 μm, while D100/D50, the ratio of the maximum particle diameter relative to the particle diameter of 50% frequency (D50), being 1.5 to 3.0. The solid content of the copolymer of vinylalcohol and a metal salt of allylsulfonate is 10 to 50 parts by mass relative to 100 parts by mass of the hollow powder.

The mass average molecular weight of the copolymer of vinylalcohol and a metal salt of allylsulfonate can be 10,000 or more and the saponification degree can be 80 mol % or more.

The ratio of hollow powder with a particle diameter of 2 μm or less relative to the whole hollow powder is preferably 5% to 10%, and the hollow powder preferably comprises a cross-linking structure.

Further, it is preferred that the solid content of the styrene-butadiene copolymer is 100 to 300 parts by mass relative to 100 parts by mass of the hollow powder.

Further, a leuco dye is at least one kind selected from 3-(N,N-dibutylamino)-6-methyl-7-anilinofluoran, 3-(N-ethyl-N-isoamylamino)-6-methyl-7-anilinofluoran, and 3-[N-ethyl-N-(P-methylphenyl)]-6-methyl-7-anilinofluoran, and a volume average particle diameter of the leuco dye is preferably 0.10-0.30 μm.

EMBODIMENT 11

A thermal recording layer containing a leuco dye and a color-developing agent is provided on one surface of a support, and a pressure sensitive adhesive layer and a releasing layer are accumulated on the other surface of the support. The main component of the pressure sensitive adhesive layer is an emulsion of acrylic resin that is obtained by the emulsion polymerization of a monomer which is mainly comprised of at least one kind selected from among (meth)acrylate alkyl esters in which their alkyl group has 5 to 12 carbons. A color-developing composition of the present invention is used as a color-developing agent for the thermal recording layer.

2-Ethylhexylacrylate is used as (meth)acrylate alkyl ester, and 6-[ethyl (4-methylphenyl)amino]-3-methyl-2-anilinofluoran is used as a leuco dye.

Further, an undercoat layer can be provided between the support and the thermal recording layer, and it is preferred that the undercoat layer contains hollow powder with the hollow rate of 80% or more.

Further, a backcoat layer may be provided between the support and the pressure sensitive adhesive layer, and an overcoat layer can be provided on the thermal recording layer.

Specific examples of the (meth)acrylate alkyl ester include n-pentyl(meth)acrylate, n-hexyl(meth)acrylate, 2-ethylhexyl (meth)acrylate, n-octyl(meth)acrylate, isooctyl(meth)acrylate, n-decyl(meth)acrylate and n-dodecyl(meth)acrylate.

EMBODIMENT 12

A thermal recording material is prepared which comprises a thermal color-forming layer on a support, wherein the thermal color-forming layer forms color upon heating and contains 4-hydroxy-4'-allyloxydiphenylsulfone and a color-developing composition of the present invention. The mass ratio of 4-hydroxy-4'-allyloxydiphenylsulfone and a color-developing composition of the present invention is preferably 3:7 to 7:3.

Further, it is preferred that the thermal color-forming layer further contains 4,4'-diallyloxydiphenylsulfone, and it is preferred that the thermal color-forming layer still further contains a benzotriazol compound. Amount of the benzotriazol compound to be added is preferably 0.5 to 3.0 parts by mass relative to 1 part by mass of 4-hydroxy-4'-allyloxydiphenylsulfone.

An undercoat layer comprising hollow powder can be provided between the support and the thermal color-forming layer and it is preferred that the hollow powder comprises a thermoplastic resin as a shell, and has a hollow rate of 30% or more and the average particle diameter of 0.4-10 μm. In addition, a protective layer consisting of a binder resin and an inorganic filler can be provided on the thermal color-forming layer, where the binder resin is preferably a diacetone-denatured polyvinylalcohol.

Further, it is also possible to apply OP varnish on the surface of the thermal recording material and to provide an eye mark, false adhesion or a magnetic recording layer on the side opposite to the back side surface of the support, i.e., on the side reverse to the thermal color-forming layer side.

EMBODIMENT 13

For a thermal recording material comprising a thermal recording layer on a support wherein the thermal recording layer comprises as main components a leuco dye and a color-developing agent which develops the leuco dye upon heating, a color-developing composition of the present invention is used as the color-developing agent and a leuco dye dispersion solution, in which an anionic surfactant is dispersed as a dispersant, is used. Here, such leuco dye dispersion solution is characterized in that the volume average particle diameter of the leuco dye being 0.10-0.30 μm.

The volume average particle diameter of the dye powder in the leuco dye dispersion solution can be within a range of 0.10-0.20 μm, and an anionic surfactant having a polyoxyethylene group can be used as a dispersant for the leuco dye dispersion solution. Further, it is preferred that polyoxyethylene of the anionic surfactant has the molar number of 15 or less and has a terminal ether residue selected from the group consisting of a saturated or unsaturated aliphatic hydrocarbon group, an unsubstituted aryl group and an aryl group substituted by a saturated or unsaturated aliphatic hydrocarbon group.

In addition, content ratio of the component with a particle diameter of 0.07 μm or less in the leuco dye dispersion solution is preferably 1% or less.

It is preferred that an anionic surfactant is contained at 5-20% by weight and a silicone emulsion is contained at 1-10% by weight relative to the leuco dye. A high-molecular dispersant may also be contained, where the high-molecular dispersant is preferably polyvinylalcohol, a metal salt of polyacryl sulfonate and a partially saponified polyvinylalcohol.

An intermediate layer comprising thermoplastic hollow resin powder can be provided between the support and the thermal color-forming layer.

In this embodiment, a color-developing agent may contain the following in addition to a color-developing composition of the present invention: (poly)4-hydroxybenzoate derivative, ureaurethane compound, a color-developing composition having a sulfonylaminocarbonylamide group, 4,4'-dihydroxydiphenylsulfone(bisphenol S), and 4-isopropoxy-4'-hydroxydiphenylsulfone.

As an ureaurethane compound, those the same as described in the above embodiment can be exemplified. As a color-developing composition having a sulfonylaminocarbonylamide group, those described in the Japanese Laid-Open Patent Application No. 08-333329 can be exemplified.

EMBODIMENT 14

In a thermal recording body comprising a thermal recording layer on a support wherein the thermal recording layer contains a leuco dye, a color-developing agent and a sensitizer, the thermal recording layer contains a color-developing composition of the present invention as the color-developing agent, and a diphenylsulfone and a higher fatty acid amide as sensitizers.

It is preferred that the higher fatty acid amide is contained at 10 to 50 parts by weight relative to 100 parts by weight of diphenylsulfone and that the higher fatty acid amide is stearic acid amide.

In addition, the average particle diameter of the higher fatty acid amide is preferably 0.1-0.5 μm.

EMBODIMENT 15

For a thermal recording body comprising a thermal recording layer on a support wherein the thermal recording layer comprises a leuco dye, a color-developing agent and an adhesive, a color-developing composition of the present invention is used as the color-developing agent and a graft copolymer of starch and polyvinyl acetate is used as the adhesive.

It is preferred that at least one kind selected from 4-hydroxy-4'-isopropoxydiphenylsulfone, 2,4'-dihydroxydiphenylsulfone, 4,4'-dihydroxydiphenylsulfone, bis(3-allyl-4-hydroxyphenyl)sulfone and 2,4-bis(phenylsulfonyl)phenol is contained in the thermal recording layer as a further color-developing agent.

In addition, it is preferred that a color-developing composition of the present invention is contained at 5-90 wt % relative to the total amount of 4-hydroxy-4'-isopropoxydiphenylsulfone, 2,4'-dihydroxydiphenylsulfone, 4,4'-dihydroxydiphenylsulfone, bis(3-allyl-4-hydroxyphenyl)sulfone and 2,4-bis(phenylsulfonyl)phenol.

EMBODIMENT 16

In a thermal recording body comprising a thermal recording layer on a support wherein the thermal recording layer contains a leuco dye, a color-developing agent and a sensitizer, the thermal recording layer contains 3-di(n-pentyl)amino-6-methyl-7-anilinofluoran as the leuco dye, a color-developing composition of the present invention as the color-developing agent, and at least one of di-p-methylbenzyl oxalate ester and di-p-chlorobenzyl oxalate ester as the sensitizer.

It is preferred that the sensitizer is di-p-methylbenzyl oxalate ester and di-p-chlorobenzyl oxalate ester. It is further preferred that di-p-chlorobenzyl oxalate ester is contained at 5 to 100 parts by weight relative to 100 parts by weight of di-p-methylbenzyl oxalate ester.

EMBODIMENT 17

In a thermal recording body comprising a thermal color-forming layer on a support wherein the thermal color-forming layer contains a leuco dye, a color-developing agent and a storage property improver, N-p-toluenesulfonyl-N'-3-(p-toluenesulfonyloxy)phenylurea is contained as the color-developing agent, and 1,3,5-tris(4-tert-butyl-3-hydroxy-2,6-dimethylbenzyl)isocyanurate and a color-developing composition of the present invention are used as the storage property improver.

It is preferred that the color-developing agent is N-p-toluenesulfonyl-N'-3-(p-toluenesulfonyloxy)phenylurea and that the storage property improver consists of a color-developing composition of the present invention and at least one kind selected from 1,1,3-tris(2-methyl-4-hydroxy-5-cyclohexylphenyl)butane, 1,1,3-tris(2-methyl-4-hydroxy-5-tert-butylphenyl)butane, 1,3,5-tris(4-tert-butyl-3-hydroxy-2,6-dimethylbenzyl)isocyanurate and 4-benzyloxyphenyl-4'-(2-methyl-2,3-epoxypropyloxy)phenylsulfone.

It is preferred that N-p-toluenesulfonyl-N'-3-(p-toluenesulfonyloxy)phenylurea is contained at 20-50% by mass and the color-developing composition of the present invention is contained at 1-20% by mass relative to the total solid content of the thermal color-forming layer.

EMBODIMENT 18

In a thermal recording body comprising a thermal recording layer on a support wherein the thermal recording layer comprises a leuco dye and a color-developing agent, at least color-developing composition of the present invention as the color-developing agent and paraffin wax are contained in the thermal recording layer.

The paraffin wax in the thermal recording layer is 1-10 wt % relative to the total solid content of the thermal recording layer, and it is preferred that the paraffin wax is obtained by emulsification and dispersion.

In addition, it is further preferred that melting point of the paraffin wax in the thermal recording layer is 60-75° C. and that a protective layer having an aqueous adhesive as a main component is provided on the thermal recording layer.

EMBODIMENT 19

At least one kind selected from 4,4'-bis[(4-methyl-3-phenoxycarbonylaminophenyl)ureido]diphenylsulfone, 2,2-bis[4-(4-methyl-3-phenylureidophenyl)aminocarbonyloxyphenyl]propane, and a color-developing composition of the present invention is used as a color-developing agent for a thermal recording body which comprises on a support at least a thermal recording layer containing a leuco dye and a color-developing agent. Here, such thermal recoding body is further characterized in that optical concentration of the recording part A is 1.00 or more as recorded from the thermal recording layer side at the energy of 50 $mJ/mm^2$ using a thermal head, and in that optical concentration of the recording part A' (after contacting the recording part A with a hot plate of 170° C. for 5 seconds) is lower than optical concentration of the background part B' (after contacting the background part B of the thermal recording body with a hot plate of 170° C. for 5 seconds).

It is preferred that optical concentration of the recording part A is higher than that of the recording part A' and that the difference in optical concentration between the background part B' and the recording part A' is 0.05 or more. It is preferred that an undercoat layer is provided between the support and the thermal recording layer, wherein the undercoat layer contains at least one kind selected from a pigment and a hollow organic filler with an oil absorption (based on JIS-K-5101) of 70-300 ml/100 g.

Further, it is preferred that a protective layer containing an aqueous resin is provided on the thermal recording layer and that diphenylsulfone is contained in the thermal recording layer.

In addition, it is preferred that 1,1-bis(4-hydroxyphenyl)-1-phenylethane is further contained in the thermal recording layer.

EMBODIMENT 20

In a thermal recording body comprising a thermal recording layer on a support wherein the thermal recording layer contains a leuco dye and a color-developing agent, at least a compound represented by the following formula (9) and a color-developing composition of the present invention are used as the color-developing agent,

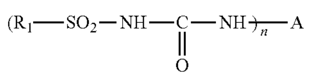
(9)

(wherein $R_1$ represents a phenyl group or naphthyl group which may be substituted by a lower alkyl group; A represents a group with a valence of 2, 3 or 4; and n represents an integer of 2, 3 or 4)

It is preferred that a color-developing composition of the present invention is contained at 10 to 40 parts by weight relative to 100 parts by weight of a compound represented by formula (9), and A is preferably a divalent group in formula (9).

Further, a compound represented by formula (9) is preferably at least one kind selected from 3,3'-bis(p-toluenesulfonylaminocarbonylamino)diphenylsulfone, 4,4'-bis(p-toluenesulfonylaminocarbonylamino)diphenylsulfone and 1,4-bis[4 (p-toluenesulfonylaminocarbonylamino)phenylcarbonyloxy]butane. It is further preferred that 1,3,5-tris(4-tert-butyl-3-hydroxy-2,6-dimethylbenzyl)isocyanurate is contained in the thermal recording layer.

EMBODIMENT 21

A color-developing composition of the present invention is concurrently used as a color-developing agent for a thermal recording body which comprises on a support a thermal color-forming layer containing a leuco dye and a color-developing agent. Here, the thermal recording body is further characterized in that the thermal color-forming layer contains either composite powder in which a leuco dye is contained in the solid resin powder or microcapsules encapsulating a leuco dye and a hydrophobic organic solvent, and in that the color-developing agent is N-p-toluenesulfonyl-N'-3-(p-toluenesulfonyloxy)phenylurea.

A leuco dye which forms a color tone different from the color tone produced by the above-mentioned leuco dye may be contained in the thermal color-forming layer. It is preferred that the composite powder is a powder obtained by emulsifying and dispersing a solution in water, wherein the solution has a polyvalent isocyanate compound as a solvent and a leuco dye as a solute, and then conducting a resinification reaction of the polyvalent isocyanate compound.

EMBODIMENT 22

In a thermal recording body sequentially comprising on a support a thermal recording layer that contains an electron-donating compound an electron-accepting compound and an aqueous adhesive, and a protective layer that contains an aqueous adhesive, a color-developing composition of the present invention is used as a color-developing agent. Here, the aqueous adhesive in the protective layer is an acetoacetyl-denatured resin, the protective layer contains a polyamideamine-epichlorohydrine resin, and the thermal recording layer contains a polyvalent carboxylic acid hydrazide compound, wherein the acetoacetyl-denatured resin in the protective layer is preferably an acetoacetyl-denatured polyvinylalcohol.

EMBODIMENT 23

In a thermal recording label consisted by sequentially accumulating a thermal recording body, an adhesive layer and a releasing paper, the adhesive layer and the thermal recording body concurrently meets the following conditions.

(i) A adhesive forming the adhesive layer comprises as main components: a thermoplastic polymer which being a mixture of ABA-type triblock copolymer (wherein A is polystyrene and B is a rubber intermediate block) and AB-type diblock copolymer; and a tackifier with the softening point of 80-130° C., wherein the polystyrene A is contained at 20-40% by mass and the AB-type diblock copolymer is contained at 20-85% by mass in the thermoplastic polymer, and wherein the tackifier is contained at 100 to 160 parts by mass relative to 100 parts by mass of the thermoplastic polymer.

(ii) A color-developing agent in the thermal recording layer which forms the thermal recording body is one or more kinds selected from a color-developing composition of the present invention, 4,4-bis(p-toluenesulfonylaminocarbonylamino)diphenylmethane, N-p-tolylsulfonyl-N-phenylurea, 4-hydroxy-4'-isopropoxydiphenylsulfone, and bis(3-allyl-4-hydroxyphenyl)sulfone.

EMBODIMENT 24

In a thermal recording body comprising on a support a thermal recording layer which contains a leuco dye and a color-developing agent, a color-developing composition of the present invention is used as a color-developing agent: wherein the thermal recording body is specifically characterized in that the support comprises a resin layer, which comprises a polyolefin type resin as a main component, on both surfaces of the a paper having the thickness of 180-240 μm (based on JIS-P-8118), and in that the resin layer thickness being 10-50 μm on the side of the thermal recording layer.

It is preferred that the thermal recording body has Taber Stiffness (based on JIS-P-8125) of 3.0-5.0 mN·m, wherein the Taber Stiffness is measured under the conditions of 40° C. and 90% RH in the longitudinal direction of the thermal recording body (paper-making direction for the paper in the support). It is preferred that a stripe magnetic recording layer is provided on the thermal recording layer.

EMBODIMENT 25

In a thermal recording body provided with a recordable thermal recording layer, a color-developing composition of the present invention is used as a color-developing agent. Here, the recordable thermal recording layer becomes recordable by being conferred heat energy onto the undercoat layer that is provided on a support and that contains microcapsules encapsulating a hydrophobic medium that is substantially free of color-forming component. The film wall of the microcapsule is polyurethane/polyurea formed by a polymerization reaction of polyvalent isocyanate, which polyvalent isocyanate contains at least one kind of adducts of an aromatic polyvalent isocyanate and polyethyreneglycol.

The aromatic polyvalent isocyanate is preferably at least one kind selected from 4,4'-diphenylmethanediisocyanate, 2,4-tolylenediisocyanate, 2,6-tolylenediisocyanate, and a multimer of these. The average particle diameter of primary, particles of the microcapsule is preferably 0.5-2.5 μm. It is further preferred that a pigment is contained in the undercoat layer.

EMBODIMENT 26

In a thermal recording body comprising on a support a thermal recording layer which contains a leuco dye, a color-developing agent and an adhesive, the color-developing agent is a compound represented by the following formula (10), a color-developing composition of the present invention, or at least one kind selected from 4,4'-bis(N-p-tolylsulfonylaminocarbonylamino)diphenylmethane, N-p-tolylsulfonyl-N'-3-(p-tolylsulfonyloxy)phenylurea, 4,4-bis[(4-methyl-3-phenoxycarbonylaminophenyl)ureido]diphenylsulfone, 2,2-bis[4-(4-methyl-3-phenylureidophenyl)aminocarbonyloxyphenyl]propane and 4-(p-tolylsulfonylamino)phenol. And a compound represented by the following formula (11) is contained in the thermal recording layer.

(10)

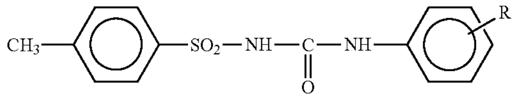

(In formula (10), R represents a hydrogen atom, alkyl group having 1-4 carbons, alkoxyl group having 1-4 carbons, or alkoxylcarbonyl group having 1-4 carbons.)

(11)

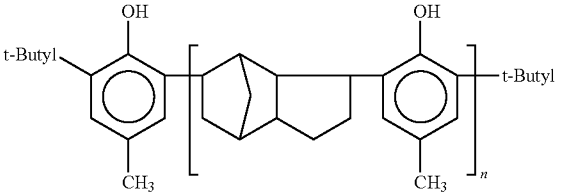

(In formula (11), n represents an integer of 1 to 20.)

In formula (11), it is preferred that n is an integer of 1 or 2, and that its average molecular weight is 460 to 700. An compound represented by formula (10) is preferably N-p-tolylsulfonyl-N'-p-(n-butoxycarbonyl)phenylurea.

EMBODIMENT 27

In a thermal recording body provided with a recordable thermal recording layer, a color-developing composition of the present invention is used as a color-developing agent. Here, the recordable thermal recording layer becomes recordable by being conferred heat energy onto an undercoat layer which is provided on a support and which contains composite particulate of polyurethane/polyurea resin and an addition polymer of monomers. The composite particulate is obtained by emulsifying oil phase containing addition-polymerizable monomer, a monomer polymerization initiator and a polyvalent isocyanate in an aqueous medium and then subjecting the emulsification product to heat polymerization.

The polyvalent isocyanate is preferred to be at least one type of abducts of aromatic polyvalent isocyanate and polyethyreneglycol, where aromatic polyvalent isocyanate is at least one kind selected from 4,4-diphenylmethanediisocyanate and its multimer.

Further, it is preferred that a pigment is contained in the undercoat layer.

EMBODIMENT 28

At least one kind selected from a color-developing composition of the present invention and 1,1-bis(2-methyl-4-hydroxy-5-tert-butylphenyl)butane is further contained in the thermal recording layer for a thermal recording body comprising on a support a thermal recording layer which contains a leuco dye and a color-developing agent. Here, the thermal recording body is further characterized in that the thermal recording layer contains a leuco dye (A) consisting of 3,6-bis (dimethylamino)fluorene-9-spiro-3'-(6'-dimethylamino) phthalide and a leuco dye (B) consisting of black color-forming fluorane-based compound, wherein 2 to 5 parts by mass of the leuco dye (B) are contained relative to 1 part by mass of the leuco dye (A), and in that a hydroxydiphenylsulfone-type compound is contained as a color-developing compound.

The leuco dye (B) is preferably 3-di(n-butyl)amino-6-methyl-7-anilinofluoran, and a hydroxydiphenylsulfone-type compound is preferably at least one kind selected from 4-hydroxy-4'-isopropoxydiphenylsulfone and 3,3'-diallyl-4,4'-dihydroxydiphenylsulfone.

EMBODIMENT 29

In a thermal recording body provided with a thermal recording layer on a support wherein the thermal recording layer contains a colorless or pale basic dye, a color-developing agent and a sensitizer, 2,4'-dihydroxydiphenylsulfone is contained as the color-developing agent, di-p-methylbenzyl oxalate ester and 1-20% by mass of di-p-chlorobenzyl oxalate ester relative to the di-p-methylbenzyl oxalate ester are contained as a sensitizer, and a color-developing composition of the present invention is contained at 10-75% by mass relative to the color-developing agent.

The above-mentioned basic dye is preferably 3-di(n-pentyl)amino-6-methyl-7-anilinofluoran.

EMBODIMENT 30

For a thermal recording body comprising a support and a thermal recording layer that is formed on the support and contains a leuco dye, a color-developing agent which reacts with and develops the leuco dye upon heating, and a sensitizer, N-p-toluenesulfonyl-N'-3-(p-toluenesulfonyloxy)phenylurea and a color-developing composition of the present invention are used as the color-developing and agents 3-(N-ethyl-p-toluidino)-6-methyl-7-anilinofluoran is used as the leuco dye.

It is preferred that a color-developing composition of the present invention is contained at 10-50 parts by mass relative to 100 parts by mass of N-p-toluenesulfonyl-N'-3-(p-toluenesulfonyloxy)phenylurea. It is preferred that a sensitizer is at least one kind selected from 1,2-di(3-methylphenoxy)ethane and 1,2-diphenoxyethane.

EMBODIMENT 31

For a thermal recording body comprising on a support a thermal recording layer which contains a leuco dye and a color-developing agent, a color-developing composition of the present invention and further 1-[α-methyl-α-(4'-hydroxyphenyl)ethyl]-4-[α',α'-bis(4''-hydroxyphenyl)ethyl]benzene are contained as the color-developing agents.

It is preferred that 1-200 parts by mass of 1-[α-methyl-α-(4'-hydroxyphenyl)ethyl]-4-[α',α'-bis(4''-hydroxyphenyl) ethyl]benzene is contained relative to the color-developing composition of the present invention.

EMBODIMENT 32

For a thermal recording body provided with a thermal recording layer on a support wherein the thermal recording layer contains a colorless or pale basic dye, a color-developing agent and a sensitizer, 4-hydroxy-4'-isopropoxydiphenylsulfone is contained as the color-developing agent, di-p-methylbenzyl oxalate ester and di-p-chlorobenzyl oxalate ester are used concurrently (wherein di-p-chlorobenzyl oxalate ester is contained at 3-50% by mass relative to di-p-methylbenzyl oxalate ester) as the sensitizers, and a color-developing composition of the present invention is further used.

EMBODIMENT 33

A first thermal color-forming layer is provided on a support wherein the thermal color-forming layer contains a dye precursor which produces black color, and a color-developing agent. A second thermal color-forming layer is provided on the first thermal color-forming layer, wherein the second thermal color-forming layer contains composite powder consisting of an organic high-molecular compound and a dye precursor which produces black color; solid dispersion particulates consisting of a dye precursor which forms a color tone different from that of the composite powder; and a color-developing agent. A color-developing composition of the present invention is contained in the first thermal color-forming layer.

It is preferred that the first thermal color-forming layer further contains at least one kind selected from spherical plastic resin powder and hollow plastic resin powder. It is preferred that a color-developing composition of the present invention is contained at 5-250 parts by mass relative to 100 parts by mass of the color-developing agent in the first thermal color-forming layer.

The above-mentioned organic high-molecular compound is preferably at least one kind selected from polyurea and polyurea-polyurethane, and the color-developing agent in the second thermal color-forming layer is preferably N-p-toluenesulfonyl-N'-3-(p-toluenesulfonyloxy)phenylurea.

Further, it is preferred that melting point of the dye precursor which produces black color in the first thermal color-forming layer is 200° C. or more. The dye precursor which forms a color tone different from that of the composite powder contained in the second thermal color-forming layer is preferably 3,3'-bis(1-n-butyl-2-methylindol-3-i1)phthalide. The color-developing agents in the first and the second thermal color-forming layers are preferably N-p-toluenesulfonyl-N'-3-(p-toluenesulfonyloxy)phenylurea It is preferred that the dye precursor used for composite powder contained in the second thermal color-forming layer is at least one kind selected from 3-di(n-butyl)amino-6-methyl-7-anilinofluoran, 3-di(n-pentyl)amino-6-methyl-7-anilinofluoran and 3-di(n-butylamino)-7-(2-chloroanilino) fluoran. It is preferred that the composite powder contained in the second thermal color-forming layer further contains 3,3'-bis(4-diethylamino-2-ethoxyphenyl)-4-azaphthalide.

EMBODIMENT 34

In a thermal recording body provided with a thermal recording layer on a support wherein the thermal recording layer contains a colorless or pale basic colorless dye and an organic color-developing agent as main components, a color-developing composition of the present invention is contained in the thermal recording layer as the organic color-developing agent and at least one kind among the compounds represented by the following formula (12) is also contained at 0.01 to 0.9 parts by mass relative to the color-developing composition of the present invention.

(12)

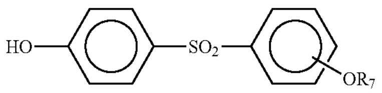

(wherein $R_7$ represents an unsubstituted or substituted alkyl group having 1-4 carbons, aralkyl group, phenyl group or hydrogen atom)

EMBODIMENT 35

In a thermal recording body provided with a thermal recording layer on a support wherein the thermal recording layer contains a colorless or pale basic colorless dye and an organic color-developing agent as main components, a color-developing composition of the present invention is contained in the thermal recording layer as the organic color-developing agent, and at least one kind of compounds represented by the following formula (13) is also contained as the sensitizer at 0.01 to 2 parts by mass relative to 1 part by mass of the color-developing agent.

(13)

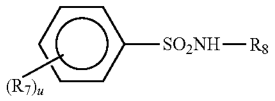

(wherein $R_7$ represents a halogen atom or an alkyl group having 1-6 carbons and u represents an integer of 0 to 2. $R_8$ represents an unsubstituted or substituted phenyl group or benzyl group, where the substituent represents a halogen atom, halogen-substituted alkyl group or an alkyl group having 1-6 carbons.)

EMBODIMENT 36

In a thermal recording body provided with a thermal recording layer on a support wherein the thermal recording layer contains a colorless or pale basic colorless dye and an organic color-developing agent as main components, a color-developing composition of the present invention is contained in the thermal recording layer as the organic color-developing agent and at least one kind of compounds represented by the following formula (14) is also contained as the sensitizer at 0.01 to 2 parts by mass relative to 1 part by mass of the color-developing agent.

(14)

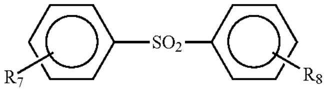

(wherein $R_7$ and $R_8$ represents a hydrogen atom, alkoxy group having 1-6 carbons or allyloxy group)

EMBODIMENT 37

In a thermal recording body provided with a thermal recording layer on a support wherein the thermal recording layer contains a colorless or pale basic colorless dye and an organic color-developing agent as main components, a color-developing composition of the present invention is contained in the thermal recording layer as the organic color-developing agent and at least one kind of compounds represented by the following formula (15) is also contained as the sensitizer at 0.01 to 2 parts by mass relative to 1 part by mass of the color-developing agent.

(15)

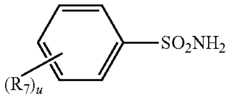

(wherein $R_7$ represents an alkyl group having 1-6 carbons or an electron-attracting group, and u represents an integer of 0 to 2)

EMBODIMENT 38

In a thermal recording body provided with a thermal recording layer on a support wherein the thermal recording layer contains a colorless or pale basic colorless dye and an organic color-developing agent as main components, a color-developing composition of the present invention is contained in the thermal recording layer as the organic color-developing agent and at least one kind of compounds represented by the following formula (16) is also contained at 0.01 to 0.09 parts by mass relative to 1 part by mass of the color-developing composition of the present invention, and at least one kind of compounds represented by the following formula (17) or (18) at 0.01 to 2 parts by mass relative to 1 part by mass of the color-developing composition of the present invention is further contained.

(16)

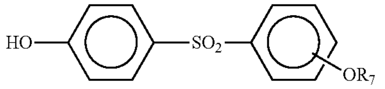

(wherein $R_7$ represents an unsubstituted or substituted alkyl group having 1-4 carbons, aralkyl group, phenyl group or hydrogen atom)

(17)

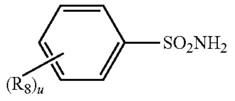

(wherein $R_8$ represents an alkyl group having 1-6 carbons or an electron-attracting group, and u represents an integer of 0 to 2)

(18)

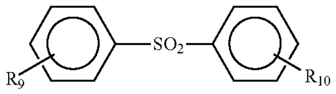

(wherein $R_9$ and $R_{10}$ represents a hydrogen atom, alkoxy group having 1-6 carbons or allyloxy group)

EMBODIMENT 39

In a thermal recording body provided with an intermediate layer and a thermal recording layer on a support wherein the thermal recording layer contains as main components a colorless or pale basic colorless dye and a color-developing agent that forms color upon reacting with the basic colorless dye, hollow polymer powder and a color-developing composition of the present invention as the color-developing agent are contained in the intermediate layer. Here, the hollow polymer powder has an opening obtainable by truncating a part of the hollow polymer powder.

The hollow polymer powder contained in the intermediate layer is bowl-shaped powder having an opening that is obtainable by truncating a part of the spherical hollow polymer powder. The cross section which is perpendicular to the cut surface and which runs through the center of the spherical hollow polymer powder and takes the shape in which a part of double circle has been truncated by a straight line. It is preferred that the maximum length of the perpendicular line from the outer arc of the cross section to the above-mentioned straight line is equal to or larger than the radius of the maximum diameter of the double circle.

EMBODIMENT 40

In a thermal recording body comprising a thermal recording layer on a support wherein the thermal recording layer contains a leuco dye-type color-forming component consisting of a basic leuco dye and an organic color-developing agent, and a metallic chelate-type color-forming component consisting of an electron acceptor and an electron donor, a color-developing composition of the present invention as the organic color-developing agent, a higher fatty acid metal salt having 16-35 carbons as the electron acceptor, and a polyvalent hydroxy aromatic compound represented by the following formula (19) as the electron donor are contained in the thermal recording layer.

(19)

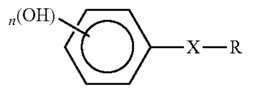

[wherein R represents a C18-C35 alkyl group, or any one of the following formulae,

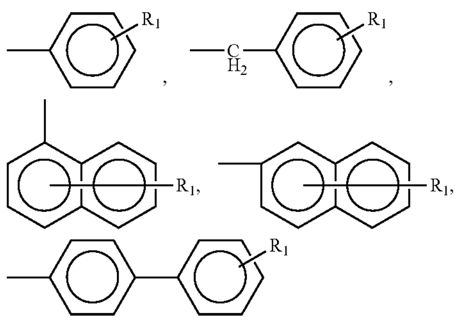

(wherein $R_1$ represents a C18-C35 alkyl group); n represents an integer of 2 or 3; and —X— represents any one of the following formulae,

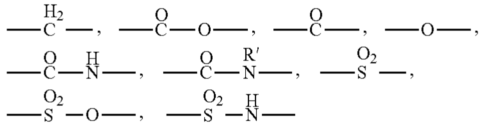

(wherein R' represents a C18-C35 alkyl group)]

In the above-mentioned thermal recording layer, it is preferred that the ratio of the metallic chelate-type color-forming series calculated by the following formula is 0.15 to 1.00.

Formula(ratio of the metallic chelate-type color-forming series)=$(C+D)/(A+B)$

A: content of a basic leuco dye (kg)
B: content of a color-developing composition of the present invention (kg)
C: content of an electron acceptor (kg)
D: content of an electron donor (kg)
(provided that when each component A to D is respectively used as a mixture of two or more compounds, the total of such compounds shall be the amount of the each component)

EMBODIMENT 41

For a thermal recording paper provided with a thermal recording layer on a support wherein the thermal recording layer contains a colorless or pale basic colorless dye and an organic color-developing agent as main components, recycled pulp is used as the support and a color-developing composition of the present invention is used as the organic color-developing agent.

EMBODIMENT 42

In a thermal recording sheet provided with a thermal recording layer on a support wherein the thermal recording layer contains a colorless or pale basic colorless dye and an organic color-developing agent, a color-developing composition of the present invention is contained in the thermal recording layer as the organic color-developing agent, and at least one kind of aminobenzenesulfonamide compounds represented by the following formula (20) is contained at 0.01 to 0.90 parts by mass relative to 1 part by mass of the organic color-developing agent.

(20)

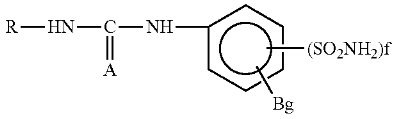

(wherein A represents an oxygen atom or sulfur atom; R represents an unsubstituted or substituted phenyl group, naphthyl group, aralkyl group, alkyl group having 1-6 carbons, cycloalkyl group having 3-6 carbons or alkenyl group having 2-6 carbons; B represents an alkyl group having 1-6 carbons or electron-attracting group; and g represents an integer of 0 to 4 and f represents an integer of 1 to 5 (provided that $g+f \leq 5$))

The above thermal recording layer preferably contains a compound represented by the following formula (21).

(21)

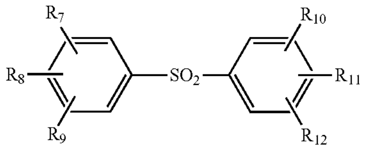

(wherein $R_7$ to $R_{12}$ represents a hydrogen atom, alkyl group having 1-6 carbons, halogen atom, nitro group, alkoxy group having 1-6 carbons, cyano group and allyloxy group)

EMBODIMENT 43

In a thermal recording sheet provided with a thermal color-forming layer on a support sheet wherein the thermal color-forming layer contains a colorless or pale basic colorless dye and an organic color-developing agent as main components, at least one kind of dihydroxydiphenylsulfone compounds represented by the following formula (22) as the organic color-developing agent, 3-di-n-pentylamino-6-methyl-7-anilinofluoran as the basic colorless dye, and at least one kind of diphenylsulfone derivatives represented by the following formula (23) are contained in the thermal color-forming layer. The thermal color-forming layer further contains at least one kind selected from 4-benzyloxy-4'-(2,3-epoxy-2-methylpropoxy)diphenylsulfone, epoxy resin or a color-developing composition of the present invention.

(22)

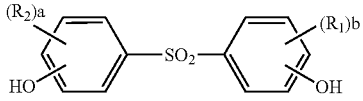

(wherein $R_1$, $R_2$ represents an alkyl group having 1-8 carbons, alkenyl group or halogen atom, and a, b represents an integer of 0 to 3)

(23)

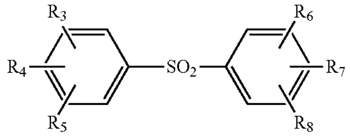

(wherein $R_3$ to $R_8$ represents a hydrogen atom, alkyl group, halogen atom, nitro group, alkoxy group, cyano group and allyloxy group)

In a thermal recording sheet provided with a thermal color-forming layer on a support sheet wherein the thermal color-forming layer contains a colorless or pale basic colorless dye and an organic color-developing agent as main components, at least one kind of dihydroxydiphenylsulfone compounds represented by the above formula (22) as the organic color-developing agent, 3-di-n-pentylamino-6-methyl-7-anilinofluoran as the basic colorless dye, and at least one kind of saturated fatty acid monoamide represented by the following formula (24) are contained in the thermal color-forming layer. The thermal color-forming layer further contains at least one kind selected from 4-benzyloxy-4'-(2,3-epoxy-2-methylpropoxy)diphenylsulfone, epoxy resin or a color-developing composition of the present invention.

$$R_{15}—CONH_2 \qquad (24)$$

(wherein $R_{15}$ represents an alkyl group having 11-21 carbons)

In a thermal recording sheet provided with a thermal color-forming layer on a support sheet wherein the thermal color-forming layer contains a colorless or pale basic colorless dye and an organic color-developing agent as main components, at least one kind of dihydroxydiphenylsulfone compounds represented by the above formula (22) as the organic color-developing agent and 3-di-n-pentylamino-6-methyl-7-anilinofluoran as the basic colorless dye are contained in the thermal color-forming layer. Also, at least one kind of diphenylsulfone derivatives represented by the above formula (23) and at least one kind of saturated fatty acid monoamide represented by the above formula (24) are contained in the thermal color-forming layer as well. The thermal color-forming layer further contains at least one kind selected from 4-benzyloxy-4'-(2,3-epoxy-2-methylpropoxy)diphenylsulfone, epoxy resin or a color-developing composition of the present invention.

In addition, the thermal color-forming layer preferably contains 4,4'-dihydroxydiphenylsulfone as the organic color-developing agent.

EMBODIMENT 44

In a thermal recording sheet provided with a thermal color-forming layer on a support sheet wherein the thermal color-forming layer contains a colorless or pale basic colorless dye and an organic color-developing agent as main components, at least one kind of dihydroxydiphenylsulfone compounds represented by the following formula (25) as the organic color-developing agent, 3-di-n-pentylamino-6-methyl-7-anilinofluoran as the basic colorless dye, and at least one kind of sulfonamide compounds represented by the following formula (26) are contained in the thermal color-forming layer. The thermal color-forming layer further contains at least one kind from 4-benzyloxy-4'-(2,3-epoxy-2-methylpropoxy)diphenylsulfone, epoxy resin or a color-developing composition of the present invention.

(25)

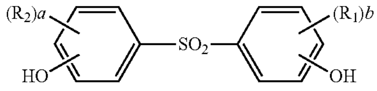

(wherein $R_1$, $R_2$ represents an alkyl group having 1-8 carbons, alkenyl group or halogen atom, and a, b represents an integer of 0 to 3)

(26)

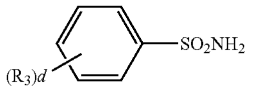

(wherein $R_3$ represents an alkyl group having 1-6 carbons or electron-attracting group, and d represents an integer of 0 to 2)

The thermal color-forming layer preferably further contains 1,2-bis(phenoxymethyl)benzene, and preferably contains 4,4'-dihydroxydiphenylsulfone as the organic color-developing agent.

EMBODIMENT 45

At least one of the following layers is sequentially provided on a support: a high temperature color-forming layer containing a dye precursor, and an organic color-developing agent which forms color when reacted with the dye precursor under heating; and a low temperature color-forming layer that forms a color tone different from that of the high temperature color-forming layer at a lower temperature than the temperature at which the high temperature color-forming layer forms color. A color-developing composition of the present invention is contained as an organic color-developing agent for the high temperature color-forming layer.

EMBODIMENT 46

In a thermal recording body provided with a thermal recording layer on a support wherein the thermal recording layer contains a colorless or pale basic colorless dye and an organic color-developing agent as main components, particulate titanium dioxide which is surface-treated with at least one kind selected from alumina, silica and zirconia is contained, and either a compound of the following formula (27) or a color-developing composition of the present invention is also contained as the organic color-developing agent.

(27)

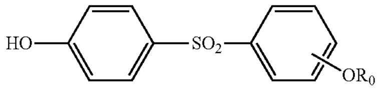

(wherein $R_0$ represents an unsubstituted or substituted alkyl group having 1-4 carbons, aralkyl group, phenyl group or an hydrogen atom)

EMBODIMENT 47

In a thermal recording body provided with a thermal color-forming layer on a support wherein the thermal color-forming layer contains a colorless or pale basic colorless dye and an organic color-developing agent as main components, a color-developing composition of the present invention and at least one kind of dihydroxydiphenylsulfone compounds represented by the above formula (28) are contained in the thermal color-forming layer as the organic color-developing agents. At least one kind of emulsions of a saturated fatty acid monoamide represented by the following formula (29) is also contained in an amount of 1.5 to 5 parts by mass relative to 1 part by mass of the organic color-developing agent.

(28)

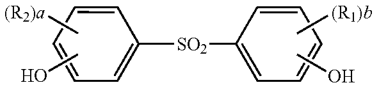

(wherein $R_1$, $R_2$ represents an alkyl group having 1-8 carbons, alkenyl group or halogen atom, and a, b represents an integer of 0 to 3)

$$R_3—CONH_2 \qquad (29)$$

(wherein $R_3$ represents an alkyl group having 11-21 carbons)

EMBODIMENT 48

In a thermal recording body provided with a thermal recording layer on a support wherein the thermal recording layer contains as main components a colorless or pale basic colorless dye and a color-developing agent which forms color when reacted with the basic colorless dye, a color-developing composition of the present invention is contained as the color-developing agent, and the absorption coefficient Ka for water by Bristow method (J. TAPPI Paper and Pulp Test Method No. 51-87) is made to be 0.30 $ml/m^2 \cdot ms^{1/2}$ or more.

EMBODIMENT 49

At least one of the following layers is sequentially provided on a support: a high temperature color-forming layer containing a dye precursor, and an organic color-developing agent which forms color when reacted with the dye precursor under heating; and a low temperature color-forming layer that forms a color tone different from that of the high temperature color-forming layer at a lower temperature than the temperature at which the high temperature color-forming layer forms color. A color-developing composition of the present invention and 3-{[(phenylamino)carbonyl]amino}benzenesulfonamide represented by the following formula (30) is contained as the organic color-developing agent for the high temperature color-forming layer so as to obtain a multicolor thermal recording body.

(30)

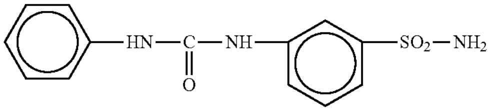

EMBODIMENT 50

In a multicolor thermal recording body provided with a thermal recording layer on a support wherein the thermal recording layer contains two or more colorless or pale dye precursors that respectively develop different color tones, and an organic color-developing agent which forms color when reacted with the dye precursors: (1) at least one kind of the above dye precursors is contained in a composite particulate which contains a dye precursor and a polymer of polyvalent isocyanate compounds; (2) content of the dye precursor in the composite particulate is made to be 40-80% by mass relative to the total mass of the composite particulate; and (3) a color-developing composition of the present invention and at least one kind of dihydroxydiphenylsulfone compounds represented by the following formula (31) are contained as the organic color-developing agent.

(31)

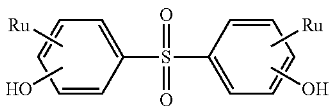

(wherein R represents a hydrogen atom, halogen atom, alkyl group having 1-6 carbons and alkenyl group, and u represents an integer of 1 to 4)

The dye precursors contained in the above-mentioned composite particulate is preferably at least one kind selected from 3-dibtylamino-6-methyl-7-anilinofluoran and 3-(N-isobutyl-N-ethylamino)-6-methyl-7-anilinofluoran.

EMBODIMENT 51

In a thermal recording body provided with a thermal recording layer on a support wherein the thermal recording layer contains a colorless or pale basic leuco dye and a color-developing agent as main components, an acrylic emulsion and colloidal silica are contained in the thermal recording layer, and a color-developing composition of the present invention is further contained as the color-developing agent.

The particle diameter of the colloidal silica is preferably 25 nm or less.

EMBODIMENT 52

A color-developing composition of the present invention is used as a color-developing agent for a thermal recording body provided with a thermal color-forming layer on a support wherein the thermal color-forming layer contains as main components a colorless or pale basic colorless dye and a color-developing agent which forms color when reacted with the basic colorless dye. Here, the thermal recording body is further characterized in that the thermal recording layer contains a color-developing agent with solubility in acetonitrile being 0.2 g/ml or less and the absorption coefficient Ka for water by Bristow method (J. TAPPI Paper and Pulp Test Method No. 51-87) being 0.30 $ml/m^2 \cdot ms^{1/2}$ or more.

The above thermal recording body may further contain a cationic resin.

EMBODIMENT 53

In a thermal recording body provided with a thermal color-forming layer on a support wherein the thermal color-forming layer contains a colorless or pale basic colorless dye and an organic color-developing agent as main components, a compound represented by the following formula (32) is contained in the thermal color-forming layer as the organic color-developing agent, and a color-developing composition of the present invention is further contained as a stabilizer.

(32)

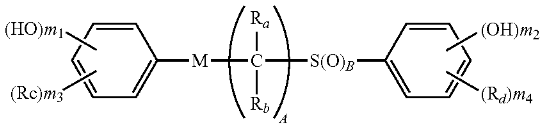

[wherein $R_a$ and $R_b$ each independently represent a hydrogen atom or C1-C6 alkyl group; A represents an integer of 1 to 6; B represents 0, 1 or 2; $m_1$ and $m_2$ each independently represent an integer of 0 or 1 to 3, provided that $m_1$ and $m_2$ are not 0 at the same time; $R_c$ and $R_d$ each independently represent a nitro group, carboxyl group, halogen atom, C1-C6 alkyl group or C2-C6 alkenyl group; $m_3$ and $m_4$ each independently represent an integer of 0, 1 or 2 and when $m_3$ and $m_4$ are both 2, $R_c$ and $R_d$ may be different from each other; and M represents CO or $NR_eCO$ (wherein $R_e$ represents a hydrogen atom or C1-C6 alkyl group), provided that when M is CO, $m_1$ is 1, and when $m_1$ is 0 and M is $NR_eCO$, B is not 0]

EMBODIMENT 54

A color-developing composition of the present invention is used as a color-developing agent for a thermal recording body provided with a thermal recording layer on a support wherein the thermal recording layer contains a colorless or pale basic leuco dye and a color-developing agent as main components. Here, the thermal recording body is further characterized in that the thermal recording layer contains an acrylic polymer and colloidal silica, wherein the acrylic polymer is obtained by copolymerizing acrylic monomer and vinylsilane with the use of a polymerizing emulsifier.

The polymerizing emulsifier is preferably at least one kind selected from alkaline salt of alkylallylsulfosuccinate, sodium(glycerin n-alkenylsuccinoylglycerin)borate, alkaline salt of sulfopropylmaleic acid monoalkyl ester, acrylic acid, and polyoxyethylenealkyl ester of methacrylic acid.

The above acrylic monomer is preferably alkyl acrylate or alkyl methacrylate.

EMBODIMENT 55

A color-developing composition of the present invention is contained in a thermal color-forming layer as an organic color-developing agent for a thermal recording body provided with a thermal color-forming layer on a support wherein the thermal color-forming layer contains a colorless or pale basic colorless dye and an organic color-developing agent as main components. Here, the thermal recording body is further characterized in that it is provided with an inkjet recording surface on the opposite side to the thermal color-forming layer of the support, wherein the inkjet recording surface is coated or immersed with a coating solution having as main materials a water-soluble high-molecular compound, a water-soluble inorganic salt containing a metallic ion of divalent or more, and a cationic resin in which the cationic degree is 4-8 meq/g or more and the molecular weight is 100,000 or more.

The above water-soluble high-molecular compound is preferably polyvinylalcohol.

It is preferred that the above-mentioned thermal color-forming layer further contains a metallic chelate type color-forming component consisting of a higher fatty acid metal double salt having 16-35 carbons as an electron acceptor, and a polyvalent hydroxy aromatic compound represented by the following formula (33) as an electron donor, (33)

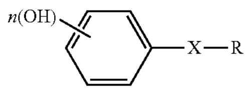

[provided wherein R is a C18-C35 alkyl group, or any one of the following formulae,

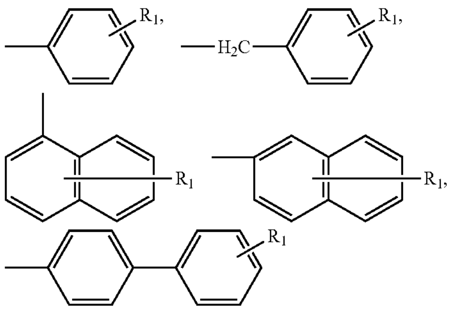

(wherein $R_1$ represents a C18-C35 alkyl group); n is an integer of 2 or 3; —X— is any one of the following formulae, $-CH_2-$, —CO—O—, —CO—, —O—,

—CO—NH—, —CO—NR'—, $-SO_2-$, $-SO_2-O-$, $-SO_2-NH-$ (wherein R' represents a $C_{18}$-$C_{35}$ alkyl group)].

EMBODIMENT 56

A color-developing composition of the present invention is contained in a thermal color-forming layer as an organic color-developing agent for a thermal recording body provided with a thermal color-forming layer on one side of the support and an inkjet recording layer on the other side of the support wherein the thermal color-forming layer contains a colorless or pale basic colorless dye and an organic color-developing agent as main components. Here, the thermal recording body is further characterized in that the Cobb absorption degree is 30 $g/m^2$ or more on the support surface on which the inkjet recording layer is provided.

It is preferred that the inkjet recording layer contains a pigment and a binder. The coating amount is preferred to be 20 $g/m^2$ or less.

It is preferred that the thermal color-forming layer further contains a metallic chelate type color-forming component consisting of a higher fatty acid metal double salt having 16-35 carbons as an electron acceptor and a polyvalent hydroxy aromatic compound represented by the following formula (34) as an electron donor, (34)

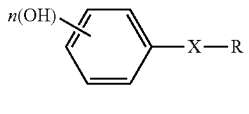

[provided wherein R represents a $C_{18}$-$C_{35}$ alkyl group, or any one of the following formulae,

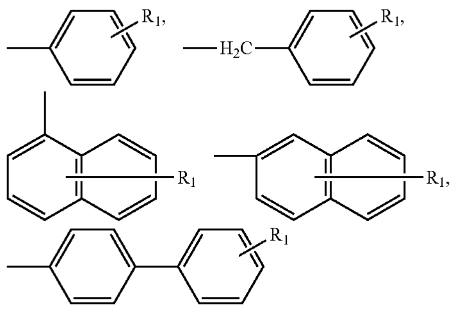

(wherein $R_1$ represents a $C_{18}$-$C_{35}$ alkyl group); n represents an integer of 2 or 3; and —X— represents any one of the following formulae, $-CH_2-$, —CO—O—, —CO—, —O—,

—CO—NH—, —CO—NR'—, $-SO_2-$, $-SO_2-O-$, $-SO_2-NH-$ (wherein R' represents a $C_{18}$-$C_{35}$ alkyl group)].

EMBODIMENT 57

A color-developing composition of the present invention is contained in a thermal color-forming layer as the organic color-developing agent for a thermal recording body provided with a thermal color-forming layer on a support wherein the thermal color-forming layer contains a colorless or pale basic colorless dye and an organic color-developing agent as main components. Here, the thermal recording body is further characterized in that it is conferred an inkjet recording property on the back side surface and in that the support takes a multilayer structure consisting of at least two layers, wherein the one surface of the support is provided with a thermal color-forming layer and the outermost layer on the opposite surface is a layer with a high loading material content that suffices the ink acceptability.

Content of the loading material in the above-mentioned layer with a high loading material content is preferably 5-40 wt % relative to the solid weight of pulp. As for a support, it is preferred to use a support which is made into a multilayer structure by a multilayer paper making machine. It is preferred to provide an ink-receiving layer having a pigment and a binder as main components on the surface of the layer with a high loading material content. Preferably, the above thermal color-forming layer further contains a metallic chelate consisting of a higher fatty acid metal double salt having 16-35 carbons as an electron acceptor and a polyvalent hydroxy aromatic compound represented by the following formula (35) as an electron donor, (35)

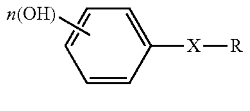

[provided wherein R represents a $C_{18}$-$C_{35}$ alkyl group, or any one of the following formulae,

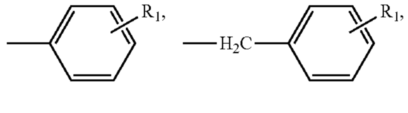

-continued

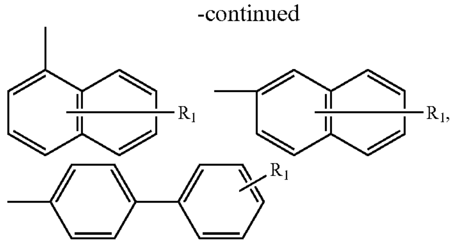

($R_1$ represents a $C_{18}$-$C_{35}$ alkyl group); n represents an integer of 2 or 3; and —X— represents any one of the following formulae]

—$CH_2$—, —CO—O—, —CO—, —O—,
—CO—NH—, —CO—NR'—,
—$SO_2$—, —$SO_2$—O—, —$SO_2$—NH—

EMBODIMENT 58

A color-developing composition of the present invention is used concurrently as a color-developing agent for a thermal recording body provided with a thermal color-forming layer on a support wherein the thermal color-forming layer contains a colorless or pale basic colorless dye and an organic color-developing agent as main components. Here, the thermal recording body is further characterized in that the thermal color-forming layer contains a 1:1 mixture of 4-methyl-4'-hydroxydiphenylsulfone and 4-methyl-2'-hydroxydiphenylsulfone, and a condensate of 4,4'-dihydroxydiphenylsulfone and diethyleneglycol, as the organic color-developing agents.

EMBODIMENT 59

3-Di-n-pentylamino-6-methyl-7-anilinofluoran as a black color-forming compound and 3,3'-bis(dimethylaminophenyl)-6-dimethylaminophthalide or 3-(4-diethylamino-2-ethoxyphenyl)-3-(1-ethyl-2-methylindol-3-i1)-4-azaphthalide as a blue color-forming compound are used as a basic leuco dye, and a color-developing composition of the present invention is used as an organic color-developing agent for a thermal recording body provided with a thermal color-forming layer on a support wherein the thermal color-forming layer contains a colorless or pale basic leuco dye and an organic color-developing agent as main components. Here, the thermal recording body is further characterized in that L*, a* and b* levels that show the color difference are respectively as follows. L* level: 25-40, a* level: 5-20, b* level: −30 to −40.

EMBODIMENT 60

A color-developing composition of the present invention is used as a color-developing agent in a method for producing a thermal recording body, wherein the thermal recording body is provided on a support with a thermal recording layer containing a colorless or pale basic leuco dye and an organic color-developing agent as main components. Here, the thermal recording body is further characterized in that the thermal recording layer contains an acrylic polymer obtained by copolymerization using alkyl acrylate, alkyl methacrylate and vinylsilane as a monomer component; colloidal silica; and a cross-linking agent, and in that the thermal recording body is heated for 24 hours or more under the condition of 30-60° C. after the thermal recording layer has been provided.

It is preferred that the above-mentioned acrylic polymer further contains acrylnitril as a monomer component and it is further preferred to still further contain styrene as a monomer component. The above-mentioned cross-linking agent is preferably glyoxal or melamine-formaldehyde resin.

EMBODIMENT 61

In a thermal recording body provided with a thermal color-forming layer on a support wherein the thermal color-forming layer contains a colorless or pale basic dye, an organic color-developing agent and an organic sensitizer as main components, a color-developing composition of the present invention and bisphenol C are contained in the thermal color-forming layer as the organic color-developing agent.

Alternatively, for a thermal recording body provided with a thermal color-forming layer on a support wherein the thermal color-forming layer contains a colorless or pale basic dye, an organic color-developing agent and an organic sensitizer as main components, the thermal color-forming layer contains a compound represented by the formula (36)

(36)

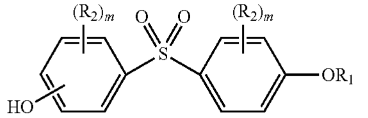

(wherein $R_1$ represents a hydrogen atom, lower alkyl group (where an isopropyl group is excluded) or aryl group; $R_2$ represents a hydrogen atom, lower alkyl group or alkenyl group; m $R_2$s may each be the same or different; and m represents an integer of 0 to 4), a color-developing composition of the present invention and bisphenol C, as the organic color-developing agent.

EMBODIMENT 62

In a thermal recording body provided with a thermal color-forming layer on a support wherein the thermal color-forming layer contains a colorless or pale basic dye and an organic color-developing agent as main components, 4-hydroxy-4'-allyloxydiphenylsulfone, a condensate represented by formula (37)

(37)

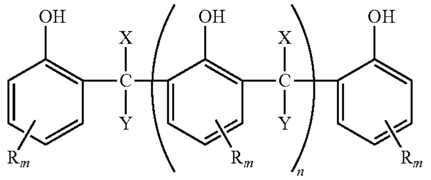

(wherein R represents a halogen atom, hydroxyl group, lower alkyl group, alkoxyl group, cyano group, nitro group, aryl group or aralkyl group; m Rs may each be the same or different; m represents an integer of 0 to 3; n represents an integer of 0 to 3; X and Y each represent a hydrogen atom, alkyl group or aryl group) or the condensate composition, and a color-developing composition of the present invention are contained in the thermal color-forming layer as the organic color-developing agents.

EMBODIMENT 63

In a thermal recording body provided with a thermal color-forming layer on a support wherein the thermal color-forming layer contains a colorless or pale electron-donating leuco dye and an electron-accepting color-developing agent, a condensate composition consisting of a condensate represented by the following formula (38)

(38)

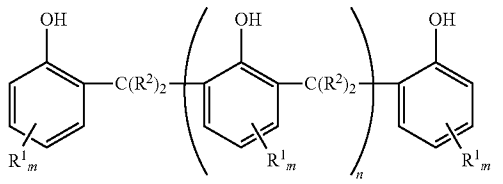

(wherein $R_1$ may each be the same of different and represents a hydrogen atom, halogen atom, hydroxyl group, lower alkyl group, alkoxyl group, cyano group, nitro group, aryl group or aralkyl group; $R_2$ may each be the same or different and represents a hydrogen atom, alkyl group or aryl group; m represents an integer of 0 to 3; and n represents an integer of 0 to 3) is contained in the thermal color-forming layer as the electron-accepting color-developing agent, and a color-developing composition of the present invention is also contained as a stabilizer.

It is preferred that a protective layer is provided on the thermal color-forming layer and that the protective layer contains kaolin with the aspect ratio of 20 or more. It is preferred that the protective layer further contains a carboxyl group-containing resin, epichlorohydrin-type resin and a denatured polyamine/amide-type resin.

Further, it is preferred that the above-mentioned condensate composition is atomized and that the particle diameter distribution (volume based) of the particulate is 0.5 μm or less by 50 percent diameter and 1.2 μm or less by 90 percent diameter as measured by a laser diffraction particle size analyzer.

EMBODIMENT 64

A thermal recording material comprising a usually colorless or pale dye precursor and an electron-accepting compound which reacts with and develops the dye precursor under heating contains at least one kind of salicylic acid derivatives or metal salts thereof and a color-developing composition of the present invention as the electron-accepting compounds.

It is preferred that a salicylic acid derivative or its metal salt is a compound represented by formula (39)

(39)

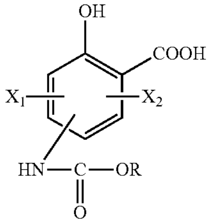

(wherein $X_1$ and $X_2$ represent a hydrogen atom, alkyl group, aralkyl group, aryl group or halogen atom; and R represents an alkyl group, alkenyl group, aralkyl group or aryl group)

It is preferred that the above thermal recording material contains an isocyanate compound and/or imino compound.

EMBODIMENT 65

In a thermal recording material comprising an electron-donating dye precursor which is usually colorless or pale, and an electron-accepting compound which reacts with and develops the dye precursor under heating, a color-developing composition of the present invention and a hydroxybenzoate derivative are contained as the electron-accepting compounds.

The hydroxybenzoate derivative is preferably benzyl 4-hydroxybenzoate. It is preferred that the weight content ratio between the diphenylsulfone derivative and the hydroxybenzoate derivative is in a range of 0.5:6.5 to 5:2, where a range of 2:5 to 1:1 is further preferred.

In addition, it is preferred that a phosphate ester represented by formula (40) or its salt is contained in the thermal recording layer as an additive.

(40)

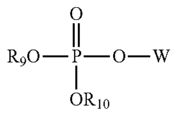

(wherein $R_9$, $R_{10}$ each represents an alkyl group, alkenyl group, aralkyl group, aryl group, alkoxy group or halogen atom; $R_9$, $R_{10}$ may bind to each other and together form a ring; W represents an alkali metal, alkaline earth metal, transition metal or amine)

The above-mentioned phosphate ester is preferably contained at 1-50% by mass relative to the electron-accepting compound and is preferably 2,2'-methylenebis(4,6-di-tertiary-butylphenyl)phosphate.

In addition, it is also preferred that a salicylamide derivative represented by formula (41) is contained as an additive.

(41)

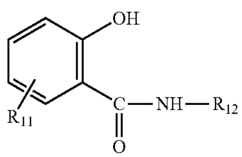

(wherein $R_{11}$ represents a hydrogen atom, alkyl group, alkenyl group, aralkyl group, aryl group or halogen atom; $R_{12}$ represents a hydrogen atom, alkyl group, alkenyl group, aralkyl group, aryl group, halogenated alkyl group, halogenated aryl group, alkoxylated aryl group or alkylthionated aryl group)

The above salicylamide derivative is preferably contained at 3-200% by mass relative to the electron-accepting compound.

EMBODIMENT 66

In a thermal recording material provided with a thermal recording layer on a support wherein the thermal recording layer comprises an electron-donating dye precursor which is usually colorless or pale and an electron-accepting compound which reacts with and develops the dye precursor under heating, a color-developing composition of the present invention is contained as the electron-accepting compound and at least one kind of amide compounds represented by formula (42) is contained as a thermoplastic compound in the thermal recording layer.

(42)

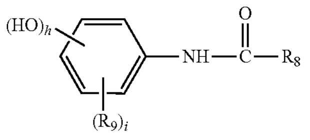

[wherein, $R_8$ represents an alkyl group, alkylcarbonyl group, alkylcarbonylalkyl group, or represents the following formula (43)

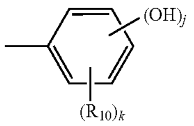

(wherein, $R_{10}$ represents a hydrogen atom, halogen atom, alkyl group, alkenyl group, alkoxy group or phenylsulfonyl group; j, k represents an integer of 0 to 5, and when being 2 or more, $R_{10}$ may each be different); $R_9$ represents a hydrogen atom, halogen atom, alkyl group, alkenyl group, alkoxy group or phenylsulfonyl group; h, i represents an integer of 0 to 5, and when being 2 or more, $R_9$ may each be different]

It is preferred that at least one kind of diphenylsulfone derivatives is contained as the electron-accepting compound. It is preferred that at least one kind of oxalic acid compounds represented by formula (44) is contained in the thermal recording layer.

(44)

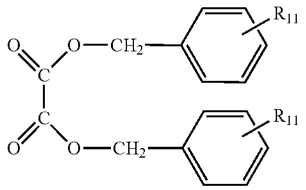

(wherein, $R_{11}$ represents a hydrogen atom, halogen atom, alkyl group, alkenyl group or alkoxy group)

EMBODIMENT 67

A color-developing composition of the present invention is used as an electron-accepting color-developing agent for a thermal recording medium that is provided with a thermal recording layer consisting of at least a single layer on a support, wherein the thermal recording layer contains at least one kind of electron-donating dye precursor which is usually colorless or pale, and an electron-accepting color-developing agent which develops the dye precursor upon heating, wherein the thermal recording medium is further characterized by the following:

(A) the thermal recording medium contains a polyolefin type resin powder on the overcoat layer, and also contains at least one kind from acrylic resin, urethane resin and SER latex which forms a film of 200 μm thickness and which has an elasticity of 300% to 1000% when pulled at 300 mm per minute;

(B) the thermal recording medium contains a polyolefin type resin powder on the overcoat layer, and also contains at least one kind from acrylic resin, urethane resin and SBR latex which forms a film of 200 μm thickness and which has a tensile strength of 100 kgf/$cm^2$ or more when pulled at 300 mm per minute; or (C) the thermal recording medium contains a polyolefin type resin powder on the overcoat layer, and also contains at least one kind from acrylic resin, urethane resin and SBR latex which forms a film of 200 μm thickness, and which has a tensile strength of 100 kgf/$cm^2$ or more and an elasticity of 300% or more when pulled at 300 mm per minute.

It is preferred that the polyolefin type resin powder is a low-density polyolefin type resin powder.

EMBODIMENT 68

In a thermal recording material comprising a thermal recording layer on a support wherein the thermal recording layer contains an electron-donating dye precursor which is usually colorless or pale and an electron-accepting compound which reacts with and develops the dye precursor under heating, and at least a single layer of a protective layer on the thermal recording layer, a color-developing composition of the present invention is contained in the thermal recording layer. The protective layer contains a porous pigment with a specific surface area of 100 $m^2/g$ or more as measured by B.E.T. method, and a water-soluble resin or a water-dispersible resin.

It is preferred that the content ratio of the porous pigment is 40-80% by mass relative to the total solid content in the protective layer.

Further, a porous pigment with a specific surface area of 100 $m^2/g$ or more as measured by B.E.T. method may also be contained in the thermal recording layer. It is also preferred that the thermal recording layer contains a diphenylsulfone derivative presented by formula (45)

(45)

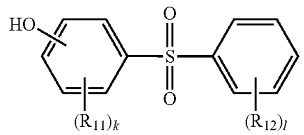

(wherein $R_{11}$ and $R_{12}$ may each be the same or different, and represent a hydrogen atom, halogen atom, hydroxyl group, alkyl group, alkenyl group, aralkyl group, aryl group, alkoxyl group or phenylsulfone group; and h, i each represents an integer of 1 to 4)

Further, it is also preferred that the protective layer contains amorphous silica and the thermal recording layer contains calcium carbonate.

EMBODIMENT 69

In a multicolor thermal recording material provided with a thermal recording layer on a support wherein the thermal recording layer contains two or more kinds of an electron-donating dye precursor which respectively forms different color tones and an electron-accepting color-developing agent which develops the dye precursor upon heating, 3,4-dihydroxy-4'-methyldiphenylsulfone and a color-developing composition of the present invention are used concurrently as the electron-accepting color-developing agent. Here, at least one kind or more of the dye precursor is constituted by being coated with a color formation-controlling layer which is obtained by subjecting vinylmonomers to an addition polymerization.

EMBODIMENT 70

In a thermal recording material provided with a thermal recording layer on a support wherein the thermal recording layer contains as main components an electron-donating dye precursor which is usually colorless or pale and an electron-accepting compound which reacts with and develops the dye precursor under heating, a color-developing composition of the present invention and 4-hydroxy-4'-methyldiphenylsulfone are contained in the thermal recording layer as the electron-accepting compounds.

The above thermal recording layer may contain di(4-methylbenzyl)oxalate or 1,2-bis(3-methylphenoxy)ethane as a sensitizer, and a saturated fatty acid monoamide represented by formula (46) as an auxiliary sensitizer.

$R_1$—$CONH_2$ (46)

(wherein $R_1$ represents an alkyl group having 11-21 carbons)

EMBODIMENT 71

In a thermal recording material provided with a thermal color-forming layer on a support wherein the thermal color-forming layer contains a color-forming compound which is usually colorless or pale, a color-developing compound which can develop the color-forming compound upon heating and a sensitizer as major components, a color-developing composition of the present invention is contained as the color-developing compound and p-toluenesulfonate-β-phenoxyethyl ester is contained as the sensitizer in the thermal color-forming layer.

EMBODIMENT 72

In a thermal recording material provided with a thermal color-forming layer on a support wherein the thermal color-forming layer contains a color-forming compound which is usually colorless or pale, a color-developing compound which can develop the color-forming compound upon heating and a sensitizer as major components, a color-developing composition of the present invention is contained as the color-developing compound and dibenzoilmethane is contained as the sensitizer in the thermal color-forming layer.

EMBODIMENT 73

In a thermal recording material provided with a thermal color-forming layer containing a color-forming compound which is usually colorless or pale and a color-developing compound which develops the color-forming compound upon heating, a compound represented by the following formula (47) and a color-developing composition of the present invention are contained as the color-developing compounds.

(47)

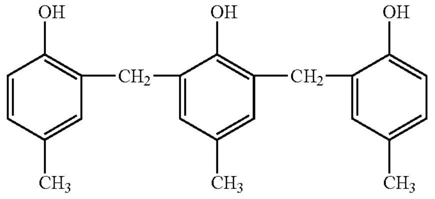

Further, it is preferred that the above-mentioned thermal recording material contains a compound represented by the following formula (48)

(48)

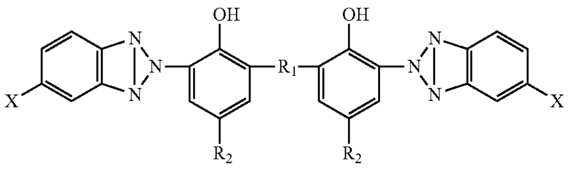

(in formula (48), $R_1$ represents an alkylidene group having 1-8 carbon atoms; $R_2$ represents an alkyl group having 1-18 carbon atoms or aralkyl group having 7-18 carbon atoms; and X represents a hydrogen atom, halogen atom or an alkyl or alkoxy group having 1-18 carbon atoms)

EMBODIMENT 74

In a thermal recording material provided with a thermal color-forming layer on a support wherein the thermal color-forming layer contains a color-forming compound which is usually colorless or pale, and a color-developing compound which develops the color-forming compound upon heating as major components, a color-developing composition of the present invention and a methanebisphenols are contained as the color-developing compounds.

EMBODIMENT 75

In a thermal recording material provided with a thermal color-forming layer on a support wherein the thermal color-forming layer contains a color-forming compound which is usually colorless or pale and a color-developing compound which develops the color-forming compound upon heating, a mixture comprising a compound represented by the following formula (49) and a color-developing composition of the present invention is respectively contained as the color-developing compound in the thermal color-forming layer.

(49)

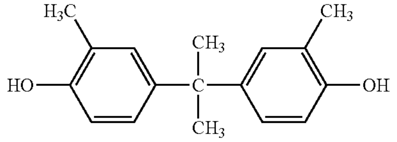

The thermal color-forming layer may also contain a sensitizer, and the sensitizer is preferably one or more kinds selected from the group consisting of stearic acid amide, 2-benzyloxynaphthalene 1,2-diphenoxyethane, 1,2-bis(3-methylphenoxy)ethane, 1,2-diphenoxymethylbenzene, di(4-chlorobenzyl)oxalate ester, di(4-methylbenzyl)oxalate ester, p-benzylbiphenyl, p-acetylbiphenyl and diphenylsulfone.

EMBODIMENT 76

In a thermal recording material provided with a thermal color-forming layer on a support wherein the thermal color-forming layer contains a color-forming compound which is usually colorless or pale, and a color-developing compound which develops the color-forming compound upon heating, 1,1-bis(4-hydroxyphenyl)-1-phenylethane and a color-developing composition of the present invention are contained as the color-developing compounds.

The thermal recording material may also contain a sensitizer, and the sensitizer is preferably one or more kinds selected from the group consisting of stearic acid amide, 2-benzyloxynaphthalene, 1,2-diphenoxyethane, 1,2-bis(3-methylphenoxy)ethane, 1,2-diphenoxymethylbenzene, di(4-chlorobenzyl)oxalate ester, di(4-methylbenzyl)oxalate ester, p-benzylbiphenyl, p-acetylbiphenyl and diphenylsulfone.

EMBODIMENT 77

In a thermal recording material provided with a thermal color-forming layer on a support wherein the thermal color-forming layer contains a color-forming compound which is usually colorless or pale and a color-developing compound which develops the color-forming compound upon heating, a compound represented by the following formula (50) and a color-developing composition of the present invention are respectively contained as the color-developing compound in the thermal color-forming layer.

(50)

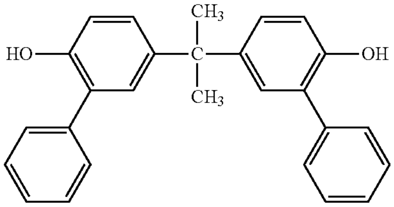

The above-mentioned thermal color-forming layer may further contain a sensitizer, and the sensitizer is preferably one or more kinds selected from the group consisting of stearic acid amide, 2-benzyloxynaphthalene, 1,2-diphenoxyethane, 1,2-bis(3-methylphenoxy)ethane, 1,2-diphenoxymethylbenzene, di(4-chlorobenzyl)oxalate ester, di(4-methylbenzyl)oxalate ester, p-benzylbiphenyl, p-acetylbiphenyl and diphenylsulfone.

EMBODIMENT 78

In a thermal recording material provided with a thermal color-forming layer on a support wherein the thermal color-forming layer contains a color-forming compound which is usually colorless or pale and a color-developing compound which develops the color-forming compound upon heating, bis(3-allyl-4-hydroxyphenyl)sulfone having α-type crystalline form and a color-developing composition of the present invention are contained as the color-developing compounds in the thermal color-forming layer.

EMBODIMENT 79

In a thermal recording material provided with a thermal color-forming layer on a support wherein the thermal color-forming layer contains a color-forming compound which is usually colorless or pale and a color-developing compound which develops the color-forming compound upon heating, a compound represented by the following formula (51), a color-developing composition of the present invention and a sensitizer are contained as the color-developing compounds in the thermal color-forming layer.

(51)

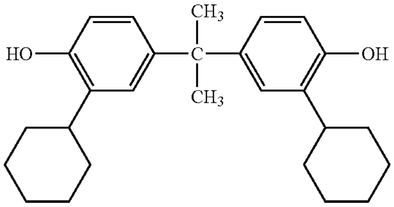

It is preferred that the sensitizer is one or more kinds selected from the group consisting of stearic acid amide, 2-benzyloxynaphthalene, 1,2-diphenoxyethane, 1,2-bis(3-methylphenoxy)ethane, 1,2-diphenoxymethylbenzene, di(4-chlorobenzyl)oxalate ester, di(4-methylbenzyl)oxalate ester, p-benzylbiphenyl, p-acetylbiphenyl and diphenylsulfone.

EMBODIMENT 80

In a thermal recording material provided with a thermal color-forming layer on a support wherein the thermal color-forming layer contains a leuco dye which is colorless or pale at normal temperature, an organic acid substance which reacts with and develops the leuco dye under heating and a sensitizer, a color-developing composition of the present invention as the organic acid substance and one or more kinds selected from the compounds represented by the following formulae (52) to (58) as the sensitizer are contained in the thermal color-forming layer.

(52)

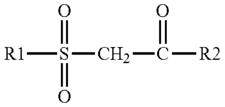

(provided wherein R1 and R2 each independently represent an alkyl group or aryl group)

(53)

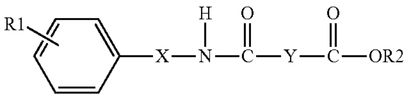

(provided wherein R1 represents a hydrogen atom, alkyl group, alkoxy group, nitro group or halogen atom; R2 represents an alkyl group or aralkyl group; X represents $—C_nH_{2n}—$ which is single-bonded or which has 1-3 carbons; and Y represents a divalent saturated aliphatic group or divalent unsaturated aliphatic group)

(54)

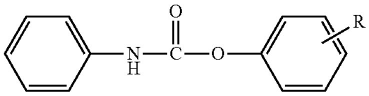

(provided wherein R represents a hydrogen atom, alkyl group, alkoxy group, nitro group or halogen atom)

(55)

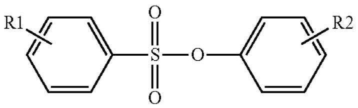

(provided wherein $R_1$ and $R_2$ each independently represent a hydrogen atom, alkyl group, alkoxy group, nitro group or halogen atom)

(56)

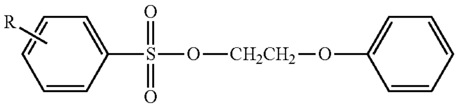

(provided wherein R represents a hydrogen atom, alkyl group, alkoxy group, nitro group or halogen atom)

(57)

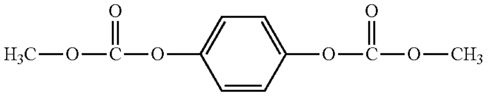

(58)

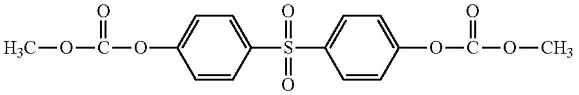

EMBODIMENT 81

For a thermal recording material which consists of a color-developing agent (which is a colorless dye) and a color-developing agent and which contains as a sensitizer a sulfonamide derivative having an ether bond in a molecule represented by the following formula (59), a color-developing composition of the present invention is used as the color-developing agent.

(59)

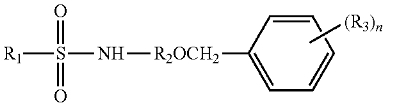

(in formula (59), $R_1$ is an unsubstituted benzene ring, or a benzene ring including 1 to 4 substitutions of one or more groups selected from an alkyl group, phenyl group, cycloalkyl group, alkoxyl group and halogen atom, provided when $R_1$ is the substituted benzene ring, the adjacent substituents may bind to each other and further form a benzene ring or alicyclic ring; $R_2$ represents a $C_2$-$C_3$ alkylene group; $R_3$ represents a methyl group or halogen atom; and n represents an integer of 0 to 2)

The sensitizer is preferably at least one kind of the sulfonamide derivatives having an ether bond selected from the group consisting of N-(2-benzyloxy-ethyl)-4-methyl-benzenesulfonamide, N-(2-benzyloxy-ethyl)-2-methyl-benzenesulfonamide, 4-methyl-N-[2-(4-methyl-benzyloxy)-ethyl]-benzenesulfonamide, N-(2-benzyloxy-propyl)-benzenesulfonamide, and N-[2-(4-methyl-benzyloxy)-propyl]-benzenesulfonamide.

EMBODIMENT 82

In a thermal recording body provided with a thermal color-forming layer on a support wherein the thermal color-forming layer comprises a leuco dye and a color-developing compound that develops the leuco dye under heating, 3-diethylamino-6-methyl-7-anilinofluoran as the leuco dye, 2,4'-dihydroxydiphenylsulfone and a color-developing composition of the present invention as the color-developing compounds, and di-p-chlorobenzyl oxalate as the sensitizer are contained.

It is further possible to provide a protective layer on the uppermost layer of the thermal recording body, wherein the protective layer mainly comprising a water-soluble high-molecular resin and a pigment. In addition, it is preferred to provide a covering layer having a water-soluble high-molecular compound as the main component on a thermal recording layer, and it is also preferred to further provide a protective layer mainly comprising a water-soluble high-molecular resin and a pigment on the uppermost layer of the thermal recording body.

EMBODIMENT 83

In a thermal recording material, 2-anilino-3-methyl-6-dialkylaminofluoran represented by formula (60) and 2-(2'-methylanilino)-3-methyl-6-dialkylaminofluoran represented by formula (61) are mixed and used as a color-forming agent, and a color-developing composition of the present invention is used as a color-developing agent.

(60)

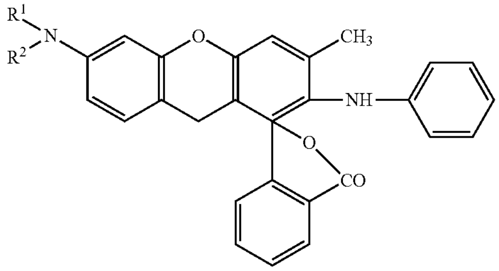

(wherein $R^1$ represents an alkyl group having 1-6 carbons, and $R^2$ represents an alkyl group having 1-6 carbons or cyclohexyl group)

(61)

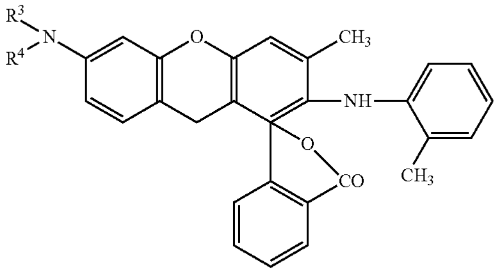

(wherein $R_3$ represents an alkyl group having 1-6 carbons, and $R_4$ represents an alkyl group having 1-6 carbons or cyclohexyl group)

In the formulae (60) and (61), it is preferred that $R_1$ and $R_2$, and $R_3$ and $R_4$ together with their adjacent nitrogen atom represent a diethylamino group, dibutylamino group, dipentylamino group, di-iso-pentylamino group, methylpropylamino group, ethyl-iso-pentylamino group or methylcyclohexylamino group. It is preferred that a color-developing agent represented by formula (60) and a color-developing agent represented by formula (61) are mixed in a ratio of 8:2 to 2:8.

EMBODIMENT 84

For a coating agent for thermal recording printing which comprises a color-developing agent component (A), color-developing agent component (B), photo-curing resin component (C) and photo-curing agent component (D) as essential components, wherein the color-developing agent component (B) is an organic high-molecular color-developing agent having a molecular weight or number average molecular weight of 500 to 3000, a color-developing composition of the present invention is concurrently used as a color-developing agent.

The above coating agent may further contain an anti-color-developing agent component (E) consisting of an alicyclic amine compound and/or alicyclic amide compound that have a nitrogen atom in the ring structure. The photo-curing resin component (C) preferably contains (meth)acrylate resin in an amount of 50% by mass or more.

Further, a thermal recording sheet can be obtained by applying these coating agents for thermal recording on a base substance and then subjecting the base substance to a photo-curing.

EMBODIMENT 85

In a thermal recording material provided with a thermal color-forming layer on a support wherein the thermal color-forming layer contains a leuco dye which is colorless or pale at normal temperature and an organic acid substance which reacts with and develops the leuco dye under heating, a color-developing composition of the present invention is contained as the organic acid substance, and at least one kind of alkylsulfonate naphthyl ester derivatives represented by the following formula (62) is contained as the sensitizer.

$$Ar(R^1)m(OSO_2R^2)n \qquad (62)$$

(wherein Ar represents a naphthalene ring; $R^1$ represents a halogen atom, alkyl group, aralkyl group, alkoxy group, aryloxy group, acyl group or alkyloxycarbonyl group; $R^2$ represents a $C_1$-$C_4$ alkyl group; m represents an integer of 0 to 4; n represents an integer of 1 to 4; and when m or n is 2 or more, such 2 or more $R^1$ or $R^2$ may each be the same or different)

An alkylsulfonate naphthyl ester derivative represented by formula (62) preferably has a melting point ranging from 80° C. to 130° C., and more preferably it is methanesulfonate-2-naphthyl ester or methanesulfonate-6-methyl-2-naphthyl ester.

EMBODIMENT 86

In a thermal recording body comprising a thermal recording layer on a support wherein the thermal recording layer contains a leuco dye and a color-developing agent, a color-developing composition of the present invention is contained and at least one compound selected from di(4-methylbenzyl) oxalate, 1,2-bis(3-methylphenoxy)ethane, 1,2-bis(phenoxymethyl)benzene and diphenylsulfone is also contained as a sensitizer.

The present invention will be further specifically explained in the following with reference to the Examples, but the technical scope of the present invention shall not be limited to these exemplifications.

SYNTHETIC EXAMPLE 1

To a 1 L four-neck recovery flask equipped with an agitator and a thermometer, water (29.0 g) and 8.0 g (0.20 mol) of NaOH were added and dissolved at 90° C. Thereto was added 25.0 g (0.10 mol) of 4,4-dihydroxydiphenylsulfone (hereinafter abbreviated as 4,4'-BPS). The resultant solution was heated to 110° C. and added dropwise with 6.3 g (0.04 mol) of bis(2-chloroethyl)ether (hereinafter abbreviated as DCEE). Upon completion of the dropwise addition, the solution was kept at 110° C. and subjected to a condensation reaction for 6 hours. Upon completion of the reaction, 200.0 g of water was added to the reaction solution which was then kept at room temperature and adjusted for pH by the addition of 13.0 g of 20% $H_2SO_4$. After adjusting the pH, MeOH was added to the reaction solution which was then kept for 1 hour at 90° C. and cooled. A solid was separated by filtration and dried under reduced pressure at 70° C. to obtain the yield of 22.8 g. The result of the high-performance liquid chromatography analysis conducted for the obtained solid is shown in the following table. In the table, the quantitative analysis values for 4,4'-dihydroxydiphenylsulfone were obtained by an absolute calibration method and those values for other compounds were obtained by an internal reference method.

TABLE 1

| | Content ratio (wt %) |
|---|---|
| 4,4'-BPS | 1.0 |
| n = 1 compound | 37.2 |
| n = 2 compound | 19.3 |
| n = 3 compound | 8.9 |
| n = 4 compound | 4.6 |
| n = 5 compound | 2.0 |
| n = 6 compound | 0.9 |

In the table, n=1 to n=6 compounds refer to those compounds where n in the following formula is 1 to 6.

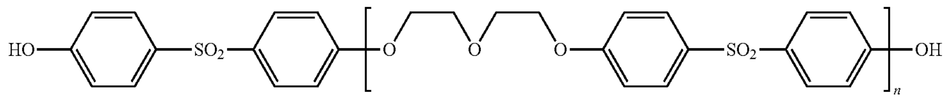

EXAMPLE 1

(Solution A) Preparation of an Undercoat Layer Solution

| | |
|---|---|
| Aluminum hydroxide | 40 parts |
| Aqueous solution of 2.5% alkaline salt of itaconic acid-denatured polyvinylalcohol | 4 parts |
| 40% solution of water-insoluble and alkali-soluble acrylic resin (Water dispersible emulsion manufactured by Etec Corporation, N412-N) | 5 parts |
| Water | 51 parts |

The above components are mixed and stirred to prepare an undercoat layer solution (Solution A).

(Solution B) Preparation of a Thermal Color-forming Layer Solution (Solution C)

| | |
|---|---|
| 3-N-cyclohexyl-N-methylamino-6-methyl-7-anilinofluoran | 5 parts |
| 1,4-Bis(2-vinyloxyethoxy)benzene | 10 parts |
| Calcium carbonate | 15 parts |
| Aqueous solution of 10% alkaline salt of itaconic acid-denatured polyvinylalcohol | 15 parts |
| Water | 15 parts |

The above composition is ground in a sand mill to the average particle diameter of 2 μm or less.

(Solution D)

| | |
|---|---|
| Color-developing composition of Synthetic Example 1 | 25 parts |
| 1,1,3-Tris(3-tert-butyl-4-hydroxy-6-methylphenyl)butane | 5 parts |
| Aqueous solution of 10% alkaline salt of itaconic acid-denatured polyvinylalcohol | 15 parts |
| Water | 55 parts |

The above composition is ground in a sand mill to the average particle diameter of 2 μm or less.

Next, 100 parts of Solution C and 100 parts of Solution D are mixed and stirred to prepare a thermal color-forming layer coating solution (Solution B).

(Solution E) Preparation of a Protective Layer Solution

| | |
|---|---|
| Silica | 1 part |
| Aqueous solution of 10% alkaline salt of itaconic acid-denatured polyvinylalcohol | 1 part |
| Aqueous solution of 10% silicon-denatured polyvinylalcohol | 10 parts |
| Aqueous solution of 12.5% polyamide-epichlorhydrine resin | 1 part |
| Water | 7 parts |

The above composition is mixed and stirred to prepare a protective layer solution (Solution E).

Next, the undercoat layer, thermal color-forming layer and protective layer are applied and dried onto the surface of a high-quality paper with a basis weight of 130 $g/m^2$, to result in the dry coating amounts of 8.0 $g/m^2$, 6.0 $g/m^2$ and 4.0 $g/m^2$, respectively, to obtain a thermal recording material.

EXAMPLE 2

(1) Preparation of Dispersion Solution of a Dye (Solution A)

| | |
|---|---|
| 3-Dibutylamino-6-methyl-N-7-anilinofluoran | 20 parts |
| Aqueous solution of 10% polyvinylalcohol | 20 parts |
| Water | 60 parts |

A composition consisting of the above components is dispersed in a sand mill to the average particle diameter of 0.5 μm to prepare Solution A.

(2) Preparation of Solution B

| | |
|---|---|
| Color-developing composition of Synthetic Example 1 | 30 parts |
| Calcium carbonate | 10 parts |
| Aqueous solution of 10% polyvinylalcohol | 20 parts |
| Water | 40 parts |

A composition consisting of the above components is dispersed in a ball mill to the average particle diameter of 0.5 μm to prepare Solution B.

(3) Preparation of a Thermal Color-forming Layer Coating Solution

| | |
|---|---|
| Solution A | 20 parts |
| Solution B | 60 parts |
| Carboxy group-denatured PVA (solid content: 10%) | 30 parts |
| Aqueous dioctylsulfosuccinate solution (solid content: 5%) | 1 part |

A composition consisting of the above components is mixed to prepare a thermal color-forming layer coating solution.

(4) Preparation of a Protective Layer Coating Solution

| | |
|---|---|
| Dispersion solution of silica (oil absorption; 100 mL/100 g, water dispersion: 1 hour, solid content: 50%) | 60 parts |
| Aqueous resin solution (polyvinylalcohol, solid content 10%) | 100 parts |
| Aqueous dioctylsulfosuccinate solution (solid content: 5%) | 1 part |
| Aqueous solution of cross-linking agent (epichrolhydrine, solid content; 10%) | 10 parts |
| Releasing agent (SM7001, Dow Corning Toray Silicone Co., Ltd. ) | 20 parts |

A composition consisting of the above components is mixed to prepare a protective layer coating solution.

(5) Preparation of an Undercoat Layer Forming Solution

| | |
|---|---|
| Fired, kaolin | 20 parts |
| Styrene/butadiene copolymer latex (solid, concentration: 47.5%) | 20 parts |
| Water | 60 parts |

The above mixture is stirred and dispersed to prepare an undercoat layer forming solution.

[Production of a Thermal Recording Paper]

The undercoat solution is applied and dried on a paper with a basis weight of 60 g/$m^2$ to result in the dry coating amount of 3.0 g/$m^2$. Subsequently thereto, a thermal color-forming coating solution is applied and dried to result in the dye attached amount of 0.45 g/$m^2$. Further thereto, a protective layer coating solution is applied and dried in a protective layer attached amount of 1.5 g/$m^2$ (attached amount is in a dry amount). Subsequently, a super calendar treatment is conducted to obtain a thermal recording material.

EXAMPLE 3

A mixture consisting of the following constituents is dispersed using a magnetic ball mill to prepare [Solution A] to [Solution E].

[Solution A]=Dispersion solution of a leuco dye

| | |
|---|---|
| 3-N,N-dibutylamino-6-methyl-7-anilinofluoran | 10 parts |
| Aqueous solution of 10% polyvinylalcohol | 10 parts |
| Water | 30 parts |
| [Solution B] = Dispersion solution of color-developing agent | 10 parts |
| Color-developing composition of Synthetic Example 1 | |
| Aqueous solution of 10% polyvinylalcohol | 10 parts |
| Water | 30 parts |

[Solution C]=Dispersion solution of a pigment

| | |
|---|---|
| Poronex (calcium phosphate manufactured by Maruo Calcium Co., Ltd., oil absorption: 150 mL/100 g) | 10 parts |
| Aqueous solution of 10% polyvinylalcohol | 10 parts |
| Water | 30 parts |
| [Solution D] = Dispersion solution of a wetting agent | 10 parts |
| Zinc stearate | |
| Aqueous solution of 10% polyvinylalcohol | 10 parts |
| Water | 30 parts |

The average particle diameter of the dye dispersion solution can be measured using LA-920 manufactured by HORIBA Ltd.

Next, Solution E is prepared by mixing, stirring and dispersing a mixture consisting of the following constituents.

[Solution E]=Dispersion solution of plastic hollow particulates

| | |
|---|---|
| Non-formable plastic hollow particulates (outer-shell material: methylmethacrylate/acrylonitrile/isobonylacrylate/polyethyleneglycoldimethacrylate, D100: 10 μm, D100/D50: 3.5, hollow degree: 90%) | 40 parts |
| Styrene/butadiene copolymer latex | 10 parts |
| Water | 50 parts |

Next, a thermal color-forming layer coating solution and an intermediate layer (undercoat) coating solution are prepared using Solutions A to D at the mixing ratio below.

(Thermal Color-forming Layer Coating Solution)

[Solution A] [Solution B]:[Solution C]:[Solution D]:=1:3:3:0.3

(Intermediate Layer Coating Solution)

[Solution E]

The intermediate layer coating solution is applied and dried on the surface of a commercially available high-quality paper (basis weight of 60 g/$m^2$) to result in the dry weight of 3 g/$m^2$, to obtain an undercoat paper. Then, the thermal color-forming layer coating solution is applied and dried to result in the dry weight of leuco dye being 0.5 g/$m^2$, to provide a thermal color-forming layer. Subsequently, a calendar treatment is conducted at a pressure of 20 kg/$cm^2$ to obtain a thermal recording material of the present invention.

EXAMPLE 4

(1) Preparation of Dispersion Solution of a Dye for Thermal Color-forming Layer (Solution A)

| | |
|---|---|
| 3-Dibutylamino-6-methyl-N-7-anilinofluoran | 20 parts |
| Aqueous solution of 10% polyvinylalcohol | 20 parts |
| Water | 60 parts |

A composition consisting of the above components is dispersed in a sand mill to the average particle diameter of 0.5 μm.

(2) Preparation of Dispersion Solution of a Color-Developing Agent for Thermal Color-forming Layer (Solution B)

| | |
|---|---|
| Color-developing composition of Synthetic Example 1 | 30 parts |
| Aqueous solution of 10% polyvinylalcohol | 20 parts |
| Water | 40 parts |

A composition consisting of the above components is dispersed in a ball mill.

(3) Preparation of Dispersion Solution of Protective Layer Filler (Solution C)

| | |
|---|---|
| Silica | 100 parts |
| Aqueous solution of 10% polyvinylalcohol | 20 parts |
| Water | 40 parts |

A composition consisting of the above constituents is dispersed in a ball mill to the average particle diameter of 1.0 μm.

(4) Preparation of a Thermal Color-forming Layer Coating Solution

| | |
|---|---|
| Solution A | 20 parts |
| Solution B | 60 parts |
| Aqueous polyvinylalcohol solution (solid content: 10%) | 30 parts |
| Aqueous dioctylsulfosuccinate solution (solid content: 5%) | 1 part |

A composition consisting of the above constituents is mixed to prepare a thermal color-forming layer coating solution.

(5) Preparation of a Protective Layer Coating Solution

| | |
|---|---|
| Solution C | 60 parts |
| Silicone resin powder (X-52-1621, Shin-Etsu Chemical Co., Ltd.) | 9 parts |
| Aqueous polyvinylalcohol solution (solid content: 10%) | 100 parts |
| Aqueous Kaimen solution (solid content: 10%) | 10 parts |
| Aqueous dioctylsulfosuccinate solution (solid, content: 5%) | 1 part |

A composition consisting of the above constituents are mixed to prepare a protective layer coating solution.

(6) Preparation of an Intermediate Layer Forming Solution

| | |
|---|---|
| Hollow resin powder (hollow rate: 90%, average particle diameter: 3.5 μm, solid content: 40%) | 15 parts |
| Styrene/butadiene copolymer latex (solid concentration: 47.5%) | 15 parts |
| Water | 60 parts |

The above mixture is stirred and dispersed to prepare an intermediate layer forming solution.

(Preparation of a Thermal Recording Material)

The intermediate layer forming solution is applied and dried on a paper with a basis weight of 60 $g/m^2$ to result in the dry coating amount of 3.0 $g/m^2$. A thermal color-forming layer coating solution is formulated and further applied and dried on the above resultant sheet to result in the dye attached amount of 0.54 $g/m^2$. Thereto, a protective layer coating solution is further applied and dried to result in a protective layer attached amount of 1.5 $g/m^2$ (attached amount is in a dry amount). Subsequently, a super calendar treatment is conducted to obtain a thermal recording material.

The average particle diameter can be measured using LA-920, a laser diffraction particle size analyzer manufactured by HORIBA Ltd.

EXAMPLE 5

<Preparation of an Undercoat Layer Coating Solution>

A mixture consisting of the constituents below is mixed and stirred to prepare an under layer forming solution, which is then applied and dried on a support paper with the thickness of 80 μm to result in the dry weight of 3 $g/m^2$ to obtain a paper coated with the under layer.

| | |
|---|---|
| Non-formable plastic hollow particulates (hollow rate: 90%, average particle diameter: 3 μm) | 60 parts |
| Styrene/butadiene copolymer latex (solid concentration: 47.5%) | 30 parts |
| Water | 10 parts |

<Preparation of a Thermal Color-forming Layer Coating Solution>

[Solution A], [Solution B] and [Solution C] respectively consisting of the following constituents are prepared using a sand grinder to the average particle diameters of approximately 0.5 μm for [Solution A], 1.5 μm for [Solution B] and 1.0 μm for [Solution C].

[Solution A]

| | |
|---|---|
| 2-Anilino-3-methyl-6-dibutylaminofluoran | 20 parts |
| Aqueous solution of 10% polyvinylalcohol | 20 parts |
| Water | 60 parts |

[Solution B]

| | |
|---|---|
| 4-Hydroxy-4'-allyloxydiphenylsulfone | 0 part |
| Aqueous solution of 10% polyvinylalcohol | 20 parts |
| Silica | 10 parts |
| Water | 50 parts |

[Solution C]

| | |
|---|---|
| Color-developing composition of Synthetic Example 1 | 20 parts |
| Aqueous solution of 10% polyvinylalcohol | 20 parts |
| Water | 60 parts |

Next, 10 parts of [Solution A], 20 parts of [Solution B] and 20 parts of [Solution C] are mixed to provide a thermal color-forming layer coating solution which is applied and dried on the undercoat layer to result in the dye attached dry amount of 0.5 $g/m^2$, to obtain a thermal color-forming layer.

<Preparation of an Over Layer Coating Solution>

| | |
|---|---|
| Aqueous solution of 10% diacetone-denatured polyvinylalcohol | 10 parts |
| Solution of 10% water-dispersible aluminum hydroxide | 10 parts |
| Aqueous solution of 10% adipic acid dihydrazide | 4 parts |

The above over layer coating solution is applied and dried on the thermal color-forming layer obtained above to result in the dry weight of 3 $g/m^2$, and a calendar treatment is further conducted to attain the surface smoothness of 2000-3000 seconds to produce a thermal recording material of the present invention.

EXAMPLE 6

<Preparation of a Dispersion Solution>

The following constituents are mixed and stirred to prepare a dispersion solution (Solution A).

| | |
|---|---|
| Water dispersion of hollow powder (acrylonitrile•methacrylonitrile•polymer powder, hollow rate: 90%) (solid concentration: 30%) | 33 parts |
| Styrene-butadiene copolymer latex (SMARTEX PA-9159, NIPPON A&L INC., solid concentration: 47.5%, average mass molecular weight: 100,000-200,000, average particle diameter: 175 nm) | 21 parts |
| Aqueous solution of water-soluble polymer (10% vinylalcohol•sodium allylsulfonate copolymer) | 20 parts |
| Water | 26 parts |

<Preparation of a Thermal Recording Layer Coating Solution>

Each of the following solutions are ground in a magnetic ball mill for 2 days to prepare (Solution B), (Solution C) and (Solution D).

(Solution B)

| | |
|---|---|
| 3-(N,N-dibutylamino)-6-methyl-7-anilinofluoran (volume average particle diameter = 0.4 μm) | 20 parts |
| Aqueous solution of 10% polyvinylalcohol | 20 parts |
| Water | 60 parts |

(Solution C)

| | |
|---|---|
| Color-developing composition of Synthetic Example 1 | 20 parts |
| Aqueous solution of 10% polyvinylalcohol | 25 parts |
| Water | 55 parts |

(Solution D)

| | |
|---|---|
| Silica | 20 parts |
| Aqueous solution of 5% methylcellulose | 20 parts |
| Water | 60 parts |

Next, 15 parts of (Solution B), 45 parts of (Solution C), 45 parts of (Solution D) and 5 parts of aqueous alkali solution of 20% isobutylene-maleic anhydride copolymer are mixed and stirred to prepare a thermal recording layer coating solution.

<Preparation of an Overcoat Layer Coating Solution (Solution E)>

The mixture consisting of the following constituents is ground in a magnetic ball mill for 2 days to prepare (Solution E).

(Solution E)

| | |
|---|---|
| Aluminum hydroxide | 20 parts |
| Aqueous solution of 10% polyvinylalcohol | 20 parts |
| Water | 60 parts |

Next, a dispersion solution (Solution A) is applied and dried on the support (neutralized paper mainly consisting of cellulose) using a high-speed blade coating device (CLC-6000, Sumi Tech International) at a coating speed of 300 m/min and the dry attached amount of 3.0 $g/m^2$, to form an intermediate layer. Subsequently, a thermal recording layer coating solution is applied and dried on the intermediate layer, in a similar manner to when forming the intermediate layer, to result in the dry dye attached amount of 0.45 $g/m^2$ to form a thermal recording layer.

Next, an overcoat layer coating solution is applied and dried on the thermal recording layer, in a similar manner to when forming the intermediate layer, to result in the dry resin (polyvinylalcohol) attached amount of 1.6 $g/m^2$ to form an overcoat layer.

Then, a super calendar treatment is conducted as a surface treatment to produce a thermal recording material.

EXAMPLE 7

<Preparation of Acrylic Resin Emulsion>

Following components are mixed and emulsified, and the resultant emulsion is placed in a drip funnel: 98 parts of n-pentylacrylate and 2 parts of acrylic acid; and relative to the total 100 parts of these monomers, 0.06 parts of octyl thioglycolate, 2.0 parts (solid) of reactive anionic emulsifier neutralized with ammonium (Aqualon KH-10, Dai-ichi Kogyo Seiyaku Co., Ltd.); and 25 parts of water.

On the other hand, in a polymerization vessel equipped with an agitator, thermometer, drip funnel and reflux device, 75 parts of water and 0.12 parts in terms of solid content of Aqualon. KH-10 are placed, which are then saturated with nitrogen gas, stirred, and heated to 80° C. Thereto is added an aqueous solution of 5% ammonium persulfate in the amount of 0.08 parts in terms of solid content.

Subsequently, dropwise addition of the emulsion placed in the drip funnel into the polymerization vessel is initiated. At the same time, 0.22 parts in terms of solid content of an aqueous solution of 5% ammonium persulfate is also added dropwise for 4 hours into the vessel.

Upon completion of the dropwise addition, an aqueous solution of 10% ammonium persulfate is further added by 0.1 parts in terms of solid content. Then, the reaction is allowed to occur for 2 hours at 80° C. under stirring and the reactant is cooled and neutralized with ammonium to obtain an acrylic resin emulsion.

<Preparation of an Adhesive>

A wetting agent and an antiseptic are added to the above acrylic resin emulsion and the pH is adjusted to 7.5 by the addition of ammonia water. This resultant emulsion is thickened with an thickening agent to 5000 mPa·s (BL thickener, #4-Rotor, 60 rpm) to obtain a thickening agent.

<Preparation of a Thermal Recording Layer Coating Solution>

[Solution A] and [Solution B] consisting of the following constituents are respectively dispersed in a sand mill to the average particle diameter of 2 μm or less to prepare [Solution A] which is dispersion solution of a dye and [Solution B] which is dispersion solution of a color-developing agent.

[Solution A]

| | |
|---|---|
| 3-Dibutylamino-6-methyl-7-anilinofluoran | 10 parts |
| Aqueous solution of 10% itaconic acid-denatured polyvinylalcohol (KL-318, KURARAY CO., LTD) | 10 parts |
| Water | 30 parts |

[Solution B]

| | |
|---|---|
| Color-developing composition of Synthetic Example 1 | 30 parts |
| Di(p-methylbenzyl)oxalate | 10 parts |
| Aqueous solution of 10% itaconic acid-denatured polyvinylalcohol (KL-318, KURARAY CO., LTD) | 50 parts |
| Silica | 15 parts |
| Water | 197 parts |

Subsequently, the above [Solution A] and [Solution B] are mixed and stirred at the following ratio to prepare a thermal recording layer coating solution [Solution C].

[Solution C]

| | |
|---|---|
| Dispersion solution of a dye [Solution A] | 50 parts |
| Dispersion solution of a color-developing agent [Solution B] | 292 parts |

Next, the above-mentioned thermal recording layer coating solution is applied and dried on a commercially available high-quality paper (basis weight of 52 $g/m^2$), which is a support, to result in the dry weight of 5 $g/m^2$, followed by a calendar treatment to attain the Oken type smoothness on the surface of approximately 1000 seconds. A thermal recording paper is thus obtained.

Subsequently, the above-mentioned adhesive is applied and dried on a releasing paper (LSW, LINTEC Corporation) using a wire bar to result in the dry weight of 20 $g/m^2$, and then this adhesive coated substance is stuck to the above-mentioned thermal recording paper and left under loading condition of 10 kg/(20×30 cm) for 48 hours in a constant temperature room of 23° C. and 50%. An adhesive label for thermal recording is thus obtained.

EXAMPLE 8

(1) Preparation of solutions A and B (Dispersion Solutions of a Dye)

A composition (dye content of 30%) consisting of 30 parts of 3-dibutylamino-6-methyl-N-7-anilinofluoran, 5 parts of sodium polyoxyethylene lauryl sulfate, a silicone emulsion, and a high-molecular dispersant is dispersed to prepare dispersion solution of a leuco dye.

As a disperser, DYNOMILL Type KDLPilot (Willy A. Bachof en) can be used as a sand mill, SC-100 (Mitsui Mining Co., Ltd.) can be used as a SC mill, SRG-100 (ARAKI IRON WORKS LTD.) can be used as a ring mill, and SHG-4 (INOUE MANUFACTURING CO., LTD.) can be used as a spike mill, etc.

(2) Preparation of Solution C (Dispersion Solution of a Color-Developing Agent)

(2)-1

| | |
|---|---|
| Color-developing composition of Synthetic Example 1 | 20 parts |
| Aqueous solution of 10% polyvinylalcohol | 20 parts |
| Water | 60 parts |

A composition consisting of the above constituents is dispersed in a sand mill to obtain a dispersion solution.

(3) Preparation of a Thermal Color-forming Coating Solution

| | |
|---|---|
| Dispersion solutions A and B of a dye | 20 parts |
| Dispersion solution of a color-developing agent, Solution C | 60 parts |
| Colloidal silica (solid content: 20%) | 10 parts |
| Styrene-butadiene latex (solid content: 50%) | 20 parts |
| Dispersion solution of stearic acid amide (solid content: 20%) | 15 parts |
| Aqueous dioctylsulfosuccinate solution (solid content: 5%) | 1 part |

A composition consisting of the above constituents is mixed to prepare a thermal color-forming layer coating solution.

(4) Preparation of an Undercoat Layer Forming Solution

| | |
|---|---|
| Fired kaolin | 20 parts |
| Styrene-butadiene copolymer latex (solid concentration: 47.5%) | 20 parts |
| Water | 60 parts |

The above mixture is stirred and dispersed to prepare an undercoat layer forming solution.

(5) Preparation of an Overcoat Layer Forming Solution

| | |
|---|---|
| Aluminum hydroxide | 20 parts |
| Aqueous solution of 10% polyvinylalcohol | 20 parts |
| Water | 60 parts |

The above mixture is dispersed in a ball mill for 24 hours to prepare (Solution E).

[Production of a Thermal Recording Paper]

An undercoat solution is applied and dried on a paper with a basis weight of 60 g/$m^2$ to result in the dry coating amount of 3.0 g/$m^2$. On this resultant sheet, a thermal color-forming coating solution prepared by using dispersion solutions of a dye and a color-developing agent is applied and dried to result in the dye attached amount of 0.45 g/$m^2$. Further thereto, coating and drying are conducted to result in the resin attached amount of 1.5 g/$m^2$ (attached amount is in a dry amount).

Subsequently, a super calendar treatment is conducted to obtain a thermal recording material.

EXAMPLE 9

| | |
|---|---|
| Color-developing composition of Synthetic Example 1 | 15 parts |
| Di-p-methylbenzyl oxalate ester | 10 parts |
| Dissolved solution of 17% polyvinylalcohol | 10 parts |
| 1,1,3-Tris-5-cyclohexyl-4-hydroxy-o-tolyl-butane | 5 parts |
| Hydrous silica dioxide | 10 parts |
| Water | 50 parts |

The mixture consisting of the above composition is dispersed using a sand mill to the average particle diameter of 1.5-2.0 μm to prepare dispersion solution of a color-developing agent.

EXAMPLE 10

Dispersion solution of a color-developing agent for a thermal recording material is prepared similarly to Example 9, except that a polymeric substance is used which comprises 4,4'-[oxybis(ethyleneoxy-p-phenylenesulfonyl)]diphenol, etc. instead of 1,1,3-tris-5-cyclohexyl-4-hydroxy-o-tolyl-butane in Example 9, that 15 parts of itaconic acid-denatured polyvinylalcohol is added instead of polyvinylalcohol as a dispersant, and that water is added by 45 parts.

EXAMPLE 11

Dispersion solution of a color-developing agent for a thermal recording material is prepared similarly to Example 9, except that 0.5 parts of polyoxypropylene-polyoxyethylene block copolymer (Epan 450, Dai-ichi Kogyo Seiyaku Co., Ltd.) with a cloud point of 70° C. is added to Example 9.

EXAMPLE 12

(1) Preparation of Solutions A 30 parts of 3-dibutylamino-6-methyl-N-7-anilinofluoran and 3 parts of aqueous solution of polyoxyethylene2-ethylhexylether (dye content: 30%) are dispersed in a sand mill to obtain dispersion solution of a dye.

The average particle diameter can be measured using LA-700 manufactured by HORIBA Ltd.

(2) Preparation of Solution B

| | |
|---|---|
| Color-developing composition of Synthetic Example 1 | 20 parts |
| Aqueous solution of 10% polyvinylalcohol | 20 parts |
| Water | 60 parts |

The composition consisting of the above constituents is dispersed in a sand mill to obtain a dispersion solution.

(3) Preparation of a Thermal Color-forming Coating Solution

| | |
|---|---|
| Solution A | 20 parts |
| Solution B | 120 parts |
| Colloidal silica (solid content: 20%) | 10 parts |
| Styrene-butadiene latex (solid content: 50%) | 20 parts |
| Dispersion solution of stearic acid amide (solid content: 20%) | 15 parts |
| Aqueous dioctylsulfosuccinate solution (solid content: 5%) | 1 part |

The composition consisting of the above constituents is mixed to prepare a thermal color-forming layer coating solution.

(4) Preparation of an Undercoat Layer Forming Solution

| | |
|---|---|
| Fired kaolin | 20 parts |
| Styrene-butadiene copolymer latex (solid concentration: 47.5%) | 20 parts |
| Water | 60 parts |

The above mixture is stirred and dispersed to prepare an undercoat layer forming solution.

(5) Preparation of an Overcoat Layer Forming Solution

| | |
|---|---|
| Aluminum hydroxide | 20 parts |
| Aqueous solution of 10% polyvinylalcohol | 20 parts |
| Water | 60 parts |

The above mixture is dispersed in a ball mill for 24 hours to prepare (Solution E).

[Preparation of a Recording Material]

An undercoat solution of the above (4) is applied and dried on a high-quality paper with a basis weight of 60 $g/m^2$ to result in the dry coating amount of 3.0 $g/m^2$. Thereto, solutions A and B are applied and dried to result in the dye attached amount of 0.45 $g/m^2$. Further thereto, the overcoat layer prepared in the above (5) is applied and dried to result in the resin attached amount of 1.5 $g/m^2$ (attached amount is in a dry amount).

Subsequently, a calendar treatment is conducted to obtain a thermal recording material.

EXAMPLE 13

(Preparation of Solutions A)

A composition consisting of 30 parts of 3-dibutylamino-6-methyl-N-anilinofluoran and polyoxyethylene2-ethylhexylether (dye content: 30%) is dispersed in a sand mill.

(Preparation of Solution B)

| | |
|---|---|
| Color-developing composition of Synthetic Example 1 | 20 parts |
| Aqueous solution of 10% polyvinylalcohol | 20 parts |
| Water | 60 parts |

A composition consisting of the above components is dispersed in a sand mill to obtain a dispersion solution.

(Preparation of a Thermal Color-forming Coating Solution)

| | |
|---|---|
| Solution A | 20 parts |
| Solution B | 60 parts |
| Colloidal silica (solid content: 20%) | 10 parts |
| Styrene-butadiene latex (solid content: 50%) | 20 parts |
| Dispersion solution of stearic acid amide (solid content: 20%) | 15 parts |
| Aqueous dioctylsulfosuccinate solution (solid content: 5%) | 1 part |

A composition consisting of the above constituents is mixed to prepare a thermal color-forming layer coating solution.

(Preparation of an Undercoat Layer Forming Solution)

| | |
|---|---|
| Fired kaolin | 20 parts |
| Styrene-butadiene copolymer latex (solid concentration: 47.5%) | 20 parts |
| Water | 60 parts |

The above mixture is stirred and dispersed to prepare an undercoat layer forming solution.

(Preparation of an Overcoat Layer Forming Solution)

| | |
|---|---|
| Aluminum hydroxide | 20 parts |
| Aqueous solution of 10% polyvinylalcohol | 20 parts |
| Water | 60 parts |

The above mixture is dispersed in a ball mill for 24 hours to prepare (Solution E).

(Production of a Thermal Recording Material)

The above-mentioned undercoat solution is applied and dried on a high-quality paper with a basis weight of 60 $g/m^2$ to result in the dry coating amount of 3.0 $g/m^2$. Subsequently thereto, a thermal color-forming coating solution prepared using solutions A and B are applied and dried to result in the dye attached amount of 0.45 $g/m^2$. Further thereto, coating and drying are conducted to result in the resin attached amount of 1.5 $g/m^2$ (attached amount is in a dry amount). Subsequently, a super calendar treatment is conducted to obtain a thermal recording material of the present invention.

EXAMPLE 14

(1) Preparation of Each Component Constituting a Thermal Recording Layer

Each of [Solution A], [Solution B], [Solution C] and [Solution D] having the following constituents is prepared by using a sand grinder to the average particle diameter of 1.0 μm.

[Solution A]

| | |
|---|---|
| 3-Dibutylamino-6-methyl-7-anilinofluoran | 20 parts |
| Aqueous solution of 10% polyvinylalcohol | 20 parts |
| Water | 60 parts |

[Solution B]

| | |
|---|---|
| 4-Hydroxy-4'-allyloxydiphenylsulfone | 20 parts |
| Aqueous solution of 10% polyvinylalcohol | 20 parts |
| Amorphous silica | 10 parts |
| Water | 50 parts |

[Solution C]

| | |
|---|---|
| 4,4'-diallyloxydiphenylsulfone | 20 parts |
| Aqueous solution of 10% polyvinylalcohol | 20 parts |
| Water | 60 parts |

[Solution D]

| | |
|---|---|
| Color-developing composition of Synthetic Example 1 | 20 parts |
| Aqueous solution of 10% polyvinylalcohol | 20 parts |
| Water | 60 parts |

(2) Preparation of a Thermal Recording Layer Coating Solution

[Solution A] to [Solution D] obtained as described above are mixed to produce a thermal recording layer coating solution.

(3) Production of a Thermal Recording Paper

The thermal color-forming coating solution obtained as above is applied and dried on a paper with a basis weight of 60 $g/m^2$ to result in the dye attached amount of 0.50 $g/m^2$ to provide a thermal color-forming layer. Then, a super calendar treatment is conducted to obtain a thermal recording material.

EXAMPLE 15

(1) Preparation of Each Component Constituting a Thermal Color-forming Layer

Each of [Solution A1], [Solution A2], [Solution B] and [Solution E] having the following constituents is prepared by using a sand grinder to the average particle diameter of 1.0 μm for each solution.

[Solution A1]

| | |
|---|---|
| 3-Di(n-pentyl)amino-6-methyl-7-anilinofluoran | 20 parts |
| Aqueous solution of 10% polyvinylalcohol | 20 parts |
| Water | 60 parts |

[Solution A2]

| | |
|---|---|
| 3-Dibutylamino-6-methyl-7-anilinofluoran | 20 parts |
| Aqueous solution of 10% polyvinylalcohol | 20 parts |
| Water | 60 parts |

[Solution B]

| | |
|---|---|
| 4-Hydroxy-4'-allyloxydiphenylsulfone | 20 parts |
| Aqueous solution of 10% polyvinylalcohol | 20 parts |
| Amorphous silica | 10 parts |
| Water | 50 parts |

[Solution E]

| | |
|---|---|
| Color-developing composition of Synthetic Example 1 | 20 parts |
| Aqueous solution of 10% polyvinylalcohol | 20 parts |
| Water | 60 parts |

(2) Preparation of Thermal Color-forming Layer Coating Solution

It is measured to obtain 20 parts respectively of the above [Solution A1] and [Solution A2], 20 parts of [Solution B] and 5 parts of [Solution E]. These are poured into a glass beaker while stirring to produce a thermal color-forming layer coating solution.

(3) Production of a Thermal Recording Paper

The above thermal color-forming coating solution is applied and dried on a paper with a basis weight of 80 $g/m^2$ to result in the dye attached amount of 0.50 $g/m^2$ to provide a thermal color-forming layer. Then, a super calendar treatment is conducted to obtain thermal recording materials of the Examples and Comparative Examples.

EXAMPLE 16

Preparation of Solution A

A composition consisting of 10 parts of 3-di(n-butyl) amino-6-methyl-7-anilinofluoran, 5 parts of aqueous solution of 5% methylcellulose and 25 parts of water is ground in a sand mill to the average particle diameter of 1.0 μm.

Preparation of Solution B

A composition consisting of 20 parts of a color-developing composition of the present invention, 10 parts of 2,4'-dihydroxydiphenylsulfone, 15 parts of aqueous solution of 5% methylcellulose and 75 parts of water is ground in a sand mill to the average particle diameter of 0.6 μm.

Preparation of Solution C

A composition consisting of 20 parts of diphenylsulfone, 10 parts of aqueous solution of 5% methylcellulose and 50 parts of water is ground in a sand mill to the average particle diameter of 1.0 μm.

Preparation of a Thermal Recording Layer Coating Solution 40 parts of Solution A, 120 parts of Solution B, 80 parts of Solution C, 28 parts of a dispersed substance of stearic acid amide which is obtained by an emulsification and dispersion method [product name: Highmicron G-270, average particle diameter: 0.4 μm, solid concentration: 21.5%, Chukyo Yushi Co., Ltd.], 160 parts of aqueous solution of 10% polyvinylalcohol (saponification degree: 88%, polymerization degree: 1000), 20 parts of styrene-butadiene latex with a solid concentration of 50%, 17 parts of light calcium carbonate, and 12.5 parts of aqueous solution of 40% glyoxal are mixed and stirred to obtain a thermal recording layer coating solution.

Preparation of a Protective Layer Coating Solution 500 parts of aqueous solution of 10% acetoacetyl-denatured polyvinylalcohol [product name: Gohsefimer 2200, The Nippon Synthetic Chemical Industry Co., Ltd.], and 80 parts of water dispersion of 50% kaolin [product name: UW-90, Effective Cortex (EC)] are mixed and stirred to obtain a protective layer coating solution.

Production of a Thermal Recording Body

An undercoat layer coating solution, a thermal recording layer coating solution and a protective layer coating solution are respectively applied and dried on one surface of a high-quality paper (neutralized paper) of 64 $g/m^2$ to result in the respective dry coating amounts of 9 $g/m^2$, 6 $g/m^2$ and 3 $g/m^2$ to sequentially form an undercoat layer, a thermal recording layer and a protective layer. A thermal recording body is thus obtained. After each layer has been formed, surface smoothing treatment is conducted by a super calendar treatment.

EXAMPLE 17

Preparation of an Undercoat Layer Coating Solution

A composition consisting of 70 parts of fired clay (product name: Ansilex, Engelhard Corp., oil absorption: 110 ml/100 g), 38 parts of a plastic pigment (product name: Glossdell 1045, solid content: 46%, Mitsui Chemicals, Inc.), 33 parts of aqueous solution of 12% starch-polyvinylacetate graft copolymer (product name: Petrocoat C-8, Nippon Starch Chemical Co., Ltd.), 2 parts of carboxymethylcellulose (product name: Cellogen 7A, Dai-ichi Kogyo Seiyaku Co., Ltd.), 14 parts of styrene-butadiene latex (product name: L-1537Y, solid content: 50%, Asahi Kasei Corporation), and 100 parts of water is mixed and stirred in a high-speed mixer to obtain a undercoat layer coating solution.

Preparation of Solution A

A composition consisting of 16 parts of 3-di(n-butyl) amino-6-methyl-7-anilinofluoran, 8 parts of aqueous solution of 10% polyvinylalcohol (saponification degree: 65 mol %, polymerization degree: 200) and 26 parts of water is ground in a sand grinder to the average particle diameter of 0.8 μm to obtain Solution A.

Preparation of Solution B

A composition consisting of 20 parts of 4-hydroxy-4'-isopropoxydiphenylsulfone, 15 parts of di-p-methylbenzyl oxalate ester, 20 parts of aqueous solution of 10% polyvinylalcohol (saponification degree: 65 mol %, polymerization degree: 200) and 45 parts of water is ground in a sand grinder to the average particle diameter of 1.0 μm or less to obtain Solution B.

Preparation of Solution C

A composition consisting of 20 parts of a color-developing composition of the present invention, 15 parts of di-p-methylbenzyl oxalate ester, 20 parts of aqueous solution of 10% polyvinylalcohol (saponification degree: 65 mol %, polymerization degree: 200) and 45 parts of water is ground in a sand grinder to the average particle diameter of 1.0 μm or less to obtain Solution C.

Preparation of a Thermal Recording Layer Coating Solution 25 parts of Solution A, 75 parts of Solution B, 25 parts of Solution C, 12 parts of calcium carbonate (product name: Brilliant-15, Shiraishi Calcium Kaisha, Ltd.), 10 parts of aluminum hydroxide (product name: HIGILITE H-42, Showa Denko K.K.), 25 parts of dispersion solution of 30% zinc stearate, 15 parts of dispersion solution of 30% paraffin wax, 80 parts of aqueous solution of 20% starch-vinylacetate graft copolymer (product name: Petrocoat C-8, Nippon Starch Chemical Co., Ltd.), 38 parts of aqueous solution of 12% polyvinylalcohol (product name: PVA-110, KURARAY CO., LTD), and 30 parts of water is stirred and mixed to obtain a thermal recording layer coating solution.

Production of a Thermal Recording Body

An undercoat layer coating solution was applied and dried on an acid high-quality paper with a basis weight of 50 $g/m^2$ using a pure blade coater to result in the dry coating amount of 8.0 $g/m^2$, followed by a super calendar treatment to form an undercoat layer. Onto this undercoat layer, a thermal recording layer coating solution was applied and dried using a rod blade coater to result in the dry coating amount of 5 $g/m^2$. Then, a smoothing treatment was conducted by a super calendar treatment to attain the Oken type smoothness (JAPAN TAPPI NO. 5) of 1500 seconds, and a thermal recording body was obtained.

EXAMPLE 18

Preparation of an Undercoat Layer Coating Solution

A composition consisting of 40 parts of fired clay [product name: Ansilex, EC, oil absorption: 110 ml/100 g], 100 parts of dispersion solution of 40% organic hollow powder having the average particle diameter of 1.0 μm (inner diameter/outer diameter=0.7, film material: polystyrene), 1 part of aqueous solution of 40% sodium polyacrylate, 14 parts of styrene-butadiene latex with a solid concentration of 48%, 50 parts of aqueous solution of 10% polyvinylalcohol (saponification degree: 88%, polymerization degree: 1000) and 40 parts of water is mixed and stirred to obtain an undercoat layer coating solution.

Preparation of Solution A

A composition consisting of 10 parts of 3-di(n-pentyl) amino-6-methyl-7-anilinofluoran, 5 parts of aqueous solution of 5% methylcellulose and 25 parts of water is ground in a sand mill to the average particle diameter of 1.0 μm.

Preparation of Solution B

A composition consisting of 20 parts of a color-developing composition of the present invention, 10 parts of 2,4'-dihydroxydiphenylsulfone, 15 parts of aqueous solution of 5% methylcellulose and 75 parts of water is ground in a sand mill to the average particle diameter of 1.0 μm.

Preparation of Solution C

A composition consisting of 15 parts of di-p-methylbenzyl oxalate ester, 5 parts of di-p-chlorobenzyl oxalate ester, 10 parts of aqueous solution of 5% methylcellulose and 50 parts of water is ground in a sand mill to the average particle diameter of 1.0 μm.

Preparation of a Thermal Recording Layer Coating Solution 40 parts of Solution A, 120 parts of Solution B, 80 parts of Solution C, 160 parts of aqueous solution of 10% polyvinylalcohol, 20 parts of styrene-butadiene latex with a solid concentration of 50%, 17 parts of light calcium carbonate, and 12.5 parts of aqueous solution of 40% glyoxal are mixed and stirred to obtain a thermal recording layer coating solution.

Preparation of a Protective Layer Coating Solution 500 parts of aqueous solution of 10% acetoacetyl-denatured polyvinylalcohol [product name: Gohsefimer 2200, The Nippon Synthetic Chemical Industry Co., Ltd.], and 80 parts of water dispersion of 50% kaolin [product name: UW-90, EC] are mixed and stirred to obtain a protective layer coating solution.

Production of a Thermal Recording Body

An undercoat layer coating solution, a thermal recording layer coating solution and a protective layer coating solution were respectively applied and dried on one surface of a high-quality paper (neutralized paper) of 64 $g/m^2$ to result in the respective dry coating amounts of 9 $g/m^2$, 6 $g/m^2$ and 3 $g/m^2$ to sequentially form an undercoat layer, a thermal recording layer and a protective layer. A thermal recording body was thus obtained. After each layer has been formed, surface smoothing treatment is conducted by a super calendar treatment.

EXAMPLE 19

Preparation of Solution A (Dispersion Solution of a Leuce Dye and a Sensitizer)

A composition consisting of 10 parts of 3-di(n-butyl) amino-6-methyl-7-anilinofluoran, 20 parts of di-p-methylbenzyl oxalate ester, 5 parts of aqueous solution of 5% methylcellulose and 65 parts of water is ground in a sand mill to the average particle diameter of 1 μm to obtain Solution A.

Preparation of Solution B (Dispersion Solution of a Color-Developing Agent)

30 parts of N-p-toluenesulfonyl-N'-3-(p-toluenesulfonyloxy)phenylurea (product name: Pergafast 201, Chiba Specialty Chemicals Co., Ltd.), 5 parts of aqueous solution of 5% methylcellulose and 65 parts of water is ground in a sand mill to the average particle diameter of 1 μm to obtain Solution B.

Preparation of Solution C (Dispersion Solution of Storage Property Improver)

20 parts of a color-developing composition of the present invention, 10 parts of 1,1,3-tris(2-methyl-4-hydroxy-5-cyclohexylphenyl)butane, 5 parts of aqueous solution of 5% methylcellulose and 65 parts of water is ground in a sand mill to the average particle diameter of 1 μm to obtain Solution C.

Preparation of a Thermal Recording Layer Coating Solution

A composition consisting of 100 parts of Solution A, 100 parts of Solution B, 50 parts of Solution C, 20 parts of dispersion solution of 30% zinc stearate (product name: HYDRIN Z-7, Chukyo Yushi Co., Ltd.), 30 parts of dispersion solution of 20% stearic acid amide (product name: Highmicron G-270, Chukyo Yushi Co., Ltd.), 6 parts of light calcium carbonate, 20 parts of styrene-butadiene latex with a solid concentration of 50%, 50 parts of aqueous solution of 10% carboxy-denatured polyvinylalcohol, and 10 parts of aqueous solution of 20% polyamide-epichlorhydrine resin (cross-linking agent) is mixed and stirred to obtain a thermal recording layer coating solution.

Preparation of a Protective Layer Coating Solution

A composition consisting of 500 parts of aqueous solution of 10% acetoacetyl group-denatured polyvinylalcohol, 30 parts of kaolin, 17 parts of aluminum hydroxide, 10 parts of zinc stearate with 30% solid content and 100 parts of water is mixed and stirred to obtain a protective layer coating solution.

Preparation of an Undercoat Layer Coating Solution 64 parts of fired kaolin (product name: Ansilex, EC, oil absorption: 90 ml/100 g), 10 parts of light calcium carbonate, 2 parts of aqueous solution of 40% polyacrylic soda and 200 parts of water are dispersed at a high speed in a Cowles disperser. To this dispersion, 80 parts of aqueous solution of 10% polyvinylalcohol (product name: PVA-110, KURARAY CO., LTD), a water dispersion of zinc stearate with a solid concentration of 30% (product name: HYDRIN Z-7, Chukyo Yushi Co., Ltd.) and 16 parts of styrene-butadiene latex with a solid concentration of 50% are added under gentle stirring using a propeller stirrer, to obtain an undercoat layer coating solution.

Production of a Thermal Recording Body

An undercoat layer coating solution, a thermal recording layer coating solution and a protective layer coating solution are sequentially applied and dried on one surface of a neutralized paper containing recycled pulp (55 wt %) with a basis weight of 64 $g/m^2$ to result in the respective dry coating amounts of 8 $g/m^2$, 4 $g/m^2$ and 3 $g/m^2$ to provide an undercoat layer, a thermal recording layer and a protective layer. A thermal recording body is thus obtained. After each layer has been provided, a super calendar treatment is conducted.

EXAMPLE 20

Preparation of an Undercoat Layer Coating Solution

A composition consisting of 70 parts of fired clay (product name: Ansilex, Engelhard Corp., oil absorption: 110 ml/100 g), 38 parts of a plastic pigment (product name: Glossdell 1045, solid content: 46%, Mitsui Chemicals, Inc.), 33 parts of aqueous solution of 12% starch-polyvinylacetate graft copolymer (product name: Petrocoat C-8, Nippon Starch Chemical Co., Ltd.), 2 parts of carboxymethylcellulose (product name: Cellogen 7A, Dai-ichi Kogyo Seiyaku Co., Ltd.), 14 parts of styrene-butadiene latex (product name: L-1537Y, solid content: 50%, Asahi Kasei Corporation), and 100 parts of water is mixed and stirred in a high-speed mixer to obtain a undercoat layer coating solution.

Preparation of Solution A

A composition consisting of 40 parts of 3-di(n-butyl) amino-6-methyl-7-anilinofluoran, 10 parts of aqueous solution of 10% polyvinylalcohol (saponification degree: 65 mol %, polymerization degree: 200) and 50 parts of water is ground in a sand grinder to the average particle diameter of 0.6 μm to obtain Solution A.

Preparation of Solution B

A composition consisting of 20 parts of 4-hydroxy-4'-isopropoxydiphenylsulfone, 20 parts of di-p-methylbenzyl oxalate ester, 10 parts of aqueous solution of 10% polyvinylalcohol (saponification degree: 65 mol %, polymerization degree: 200) and 50 parts of water is ground in a sand grinder to the average particle diameter of 0.8 μm to obtain Solution B.

Preparation of Solution C

A composition consisting of 20 parts of a color-developing composition of the present invention, 20 parts of di-p-methylbenzyl oxalate ester, 10 parts of aqueous solution of 10% polyvinylalcohol (saponification degree: 65 mol %, polymerization degree: 200) and 50 parts of water is ground in a sand grinder to the average particle diameter of 0.8 μm to obtain Solution C.

Preparation of a Thermal Recording Layer Coating Solution

A composition consisting of 25 parts of Solution A, 70 parts of Solution B, 30 parts of Solution C, 10 parts of calcium carbonate (product name: Brilliant-15, Shiraishi Calcium Kaisha, Ltd.), 15 parts of aluminum hydroxide (product name: HIGILITE H-42, Showa Denko K.K.), 25 parts of dispersion solution of 30% zinc stearate, 5 parts of dispersion solution of 30% paraffin wax which is prepared by emulsification and dispersion (product name: D-336, melting point: 60° C., average particle diameter: 0.5 μm, Chukyo Yushi Co.), 60 parts of aqueous solution of 20% starch-vinylacetate graft copolymer (product name: Petrocoat C-8, Nippon Starch Chemical Co., Ltd.), 40 parts of aqueous solution of 10% polyvinylalcohol (product name: PVA-110, KURARAY CO., LTD) and 30 parts of water is mixed and stirred to obtain a thermal recording layer coating solution.

Preparation of a Protective Layer Coating Solution 59 parts of kaolinite clay (product name: HG-90, Engelhard Corp.), 200 parts of aqueous solution of 20% acetoacetyl-denatured polyvinylalcohol (product name: Gohsefimer Z-100, The Nippon Synthetic Chemical Industry Co., Ltd.), 5 parts of aqueous solution of 25% polyamideamine-epichlorohydrine resin, 4 parts of dispersion solution of 38% zinc stearate (product name: Z-8-36, Chukyo Yushi Co., Ltd.) and 300 parts of water are mixed and stirred to obtain a protective layer coating solution.

Production of a Thermal Recording Body

An undercoat layer coating solution is applied and dried on an acid high-quality paper with a basis weight of 50 $g/m^2$ using a pure blade coater to result in the dry coating amount of 8.0 $g/m^2$. Subsequently thereto, a thermal recording layer coating solution is applied and dried using a rod blade coater to result in the dry coating amount of 6 $g/m^2$. Subsequently thereto, a protective layer coating solution is applied and dried using a rod blade coater to result in the dry coating amount of 3 $g/m^2$. Then, a smoothing treatment is conducted by a super calendar treatment to attain the Oken type smoothness (JAPAN TAPPI NO. 5) of 2000 seconds to obtain a thermal recording body.

EXAMPLE 21

Preparation of Solution A

A composition consisting of 20 parts of 3-di(n-butyl) amino-6-methyl-7-anilinofluoran, 20 parts of aqueous solution of 20% polyvinylalcohol (saponification degree: 60 mol %, polymerization degree: 200), 0.5 parts of 5% emulsion of a natural fat defoamer, 0.5 parts of aqueous solution of 5% dioctylsulfosuccinate sodium salt and 20 parts of water is treated in a sand mill to obtain the median diameter of 0.3 μm as measured by a laser diffraction particle size analyzer. Solution A is thus obtained.

Preparation of Solution B

A composition consisting of 20 parts of 3,3'-bis(1-n-butyl-2-methylindole-3-i1)phthalide, 20 parts of aqueous solution of 20% polyvinylalcohol (saponification degree: 60 mol %, polymerization degree: 200), 0.5 parts of 5% emulsion of a natural fat defoamer, 0.5 parts of aqueous solution of 5% dioctylsulfosuccinate sodium salt and 20 parts of water is treated in a sand mill to obtain the median diameter of 0.3 μm as measured by a laser diffraction particle size analyzer. Solution B is thus obtained.

Preparation of Solution C

A composition consisting of 20 parts of 3-{1,1-bis(1-ethyl-2-methylindole-3-il)}-3-p-diethylaminophenylphthalide, 20 parts of aqueous solution of 20% polyvinylalcohol (saponification degree: 60 mol %, polymerization degree: 200), 0.5 parts of 5% emulsion of a natural fat defoamer, 0.5 parts of aqueous solution of 5% dioctylsulfosuccinate sodium salt and 20 parts of water is treated in a sand mill to obtain the median diameter of 1.0 μm as measured by a laser diffraction particle size analyzer. Solution C is thus obtained.

Preparation of Solution D (Dispersion Solution of the Specific Color-Developing Agent (a))

A composition consisting of 20 parts of 3,3'-bis(p-toluenesulfonylaminocarbonylamino)diphenylsulfone (melting point: 225° C.), 20 parts of aqueous solution of 20% polyvinylalcohol (saponification degree: 88 mol %, polymerization degree: 300), 0.5 parts of 5% emulsion of a natural fat defoamer, 0.5 parts of aqueous solution of 5% dioctylsulfosuccinate sodium salt and 20 parts of water is treated in a sand mill to obtain the median diameter of 0.3 μm as measured by a laser diffraction particle size analyzer. Solution D is thus obtained.

Preparation of Solution E (Dispersion Solution of the Specific Color-Developing Agent (b))

A composition consisting of 20 parts of a color-developing composition of the present invention, 20 parts of aqueous solution of 20% polyvinylalcohol (saponification degree: 88 mol %, polymerization degree: 300), 0.5 parts of 5% emulsion of a natural fat defoamer, 0.5 parts of aqueous solution of 5% dioctylsulfosuccinate sodium salt and 55 parts of water is treated in a sand mill to obtain the median diameter of 0.4 μm as measured by a laser diffraction particle size analyzer. Solution E is thus obtained.

Preparation of a Thermal Recording Layer Coating Solution 30 parts of Solution A, 5 parts of Solution B, 5 parts of Solution C, 65 parts of Solution D, 25 parts of Solution E, parts of aqueous solution of 25% polyvinylalcohol (saponification degree: 88 mol %, polymerization degree: 300) and 75 parts of styrene-butadiene latex (product name: SMARTEX 752A, solid content: 48%, NIPPON A&L INC.) as adhesives, 10 parts of aqueous solution of 5% adipic acid dihydrazide, and 50 parts of water are mixed and stirred to obtain a thermal recording layer coating solution.

Preparation of a Protective Layer Coating Solution

A composition consisting of 500 parts of aqueous solution of 10% diacetone-denatured polyvinylalcohol (product name: D-polymer, UNITIKA LTD.), 80 parts of water dispersion of 50% kaolin (product name: UW-90, EC), 20 parts of water dispersed substance of zinc stearate (product name: HYDRIN Z-7-30, Chukyo Yushi Co., Ltd., solid content: 31.5%) and 100 parts of water is mixed and stirred to obtain a protective layer coating solution.

Production of a Thermal Recording Body

A thermal recording layer coating solution and a protective layer coating solution are sequentially applied and dried on one surface of a transparent polyethylene terephthalate film of 175 μm (product name: Tetron film HMW, Teijin Ltd.) to result in the respective dry coating amounts of 20 $g/m^2$ and 4.5 $g/m^2$ to provide a thermal recording layer and a protective layer. A thermal recording body is thus obtained.

EXAMPLE 22

Preparation of an Undercoat Layer Coating Solution

A composition consisting of 100 parts of fired clay (oil absorption: 90 ml/100 g), 200 parts of aqueous solution of 10% polyvinylalcohol (saponification degree: 98 mol %, polymerization degree: 1000), 20 parts of styrene-butadiene latex with a solid concentration of 50% and 100 parts of water is mixed and stirred to obtain an undercoat layer coating solution.

Preparation of Solution A

A composition consisting of 15 parts of 3-(N-ethyl-p-toluidino)-6-methyl-7-anilinofluoran, 5 parts of aqueous solution of 5% methylcellulose and 30 parts of water is ground in a sand mill to the average particle diameter of 1.0 μm to obtain Solution A.

Preparation of Solution B

A composition consisting of 34 parts of 4,4'-bis[(4-methyl-3-phenoxycarbonylaminophenyl)ureide]diphenylsulfone, 5 parts of aqueous solution of 5% methylcellulose and 76 parts of water is ground in a sand mill to the average particle diameter of 1.0 μm to obtain Solution B.

Preparation of Solution C

A composition consisting of 30 parts of diphenylsulfone, 5 parts of aqueous solution of 5% methylcellulose and 55 parts of water is ground in a sand mill to the average particle diameter of 1.0 μm to obtain Solution C.

Preparation of Solution D

A composition consisting of 5 parts of a color-developing composition of the present invention and 76 parts of water is ground in a sand mill to the average particle diameter of 1.0 μm to obtain Solution D.

Preparation of a Thermal Recording Layer Coating Solution

A composition consisting of 50 parts of Solution A, 58 parts of Solution B, 90 parts of Solution C, 57 parts of Solution D, 130 parts of aqueous solution of 10% fully saponified polyvinylalcohol (polymerization degree: 1000), 18 parts of water dispersion of 50% light calcium carbonate having the average particle diameter of 0.5 μm and 1 part of sodium dialkylsulfosuccinate [product name: Rapisol, B-80, 80% active ingredient, NOF CORPORATION] is mixed and stirred to obtain a thermal recording layer coating solution.

Preparation of a Protective Layer Coating Solution

A composition consisting of 250 parts of aqueous solution of 10% acetoacetyl-denatured polyvinylalcohol (product name: Gohsefimer Z-200, The Nippon Synthetic Chemical Industry Co., Ltd.), 70 parts of kaolin (product name: UW-90, Engelhard Corp.), 1 part of aqueous solution of 30% polyamide-epichlorohydrine, 5 parts of water dispersion of 30% zinc stearate having the average particle diameter of 0.5 μm, 2 parts of water dispersion of 40% polyethylene wax (product name: Chemipal W-400, Mitsui Chemical Co., Ltd.) and 150 parts of water is mixed and stirred to obtain a protective layer coating solution.

Production of a Thermal Recording Body

An undercoat layer coating solution and a thermal layer coating solution and a protective layer coating solution are applied and dried on one surface of a neutralized high-quality paper of 60 $g/m^2$ to result in the respective dry coating amounts of 7 $g/m^2$, 6 $g/m^2$ and 3 $g/m^2$ to sequentially provide an undercoat layer, a thermal recording layer and a protective layer. A thermal recording body is thus obtained (Super calendar treatment is respectively conducted subsequent to the provision of the undercoat layer, the thermal recording layer and the protective layer).

EXAMPLE 23

Preparation of Solution A

A composition consisting of 20 parts of 3-di-(n-butyl) amino-6-methyl-7-anilinofluoran, 20 parts of aqueous solution of 20% polyvinylalcohol (saponification degree: 88 mol %, polymerization degree: 300), 4 parts of 5% emulsion of a natural fat defoamer, 8 parts of aqueous solution of 5% dioctylsulfosuccinate sodium salt and 30 parts of water is treated in a sand mill to obtain the median diameter of 0.3 μm as measured by a laser diffraction particle size analyzer. Solution A is thus obtained.

Preparation of Solution B

A composition consisting of 20 parts of 3,3'-bis(1-n-butyl-2-methylindole-3-i1)phthalide, 20 parts of aqueous solution of 20% polyvinylalcohol (saponification degree: 88 mol %, polymerization degree: 300), 4 parts of 5% emulsion of a natural fat defoamer, 8 parts of aqueous solution of 5% dioctylsulfosuccinate sodium salt and 30 parts of water is treated in a sand mill to obtain the median diameter of 0.3 as measured by a laser diffraction particle size analyzer. Solution B is thus obtained.

Preparation of Solution C

A composition consisting of 20 parts of 3-[1,1-bis(1-ethyl-2-methylindole-3-i1)]-3-p-diethylaminophenylphthalide, 20 parts of aqueous solution of 20% polyvinylalcohol (saponification degree: 88 mol %, polymerization degree: 300), 4 parts of 5% emulsion of a natural fat defoamer, 8 parts of aqueous solution of 5% dioctylsulfosuccinate sodium salt and 30 parts of water is treated in a sand mill to obtain the median diameter of 0.3 μm as measured by a laser diffraction particle size analyzer. Solution C is thus obtained.

Preparation of Solution D

A composition consisting of 20 parts of 3,3'-bis(p-toluenesulfonylaminocarbonylamino)diphenylsulfone, 20 parts of aqueous solution of 20% polyvinylalcohol (saponification degree: 88 mol %, polymerization degree: 300), 4 parts of 5% emulsion of a natural fat defoamer, 8 parts of aqueous solution of 5% dioctylsulfosuccinate sodium salt and 30 parts of water is treated in a sand mill to obtain the median diameter of 0.3 μm as measured by a laser diffraction particle size analyzer. Solution D is thus obtained.

Preparation of Solution E

A composition consisting of 20 parts of a color-developing composition of the present invention, 20 parts of aqueous solution of 20% polyvinylalcohol (saponification degree: 88 mol %, polymerization degree: 300), 4 parts of 5% emulsion of a natural fat defoamer, 8 parts of aqueous solution of 5% dioctylsulfosuccinate sodium salt and 30 parts of water is treated in a sand mill to obtain the median diameter of 0.4 μm as measured by a laser diffraction particle size analyzer. Solution E is thus obtained.

Preparation of Solution F

A composition consisting of 20 parts of 1,3,5-tris(4-tert-butyl-3-hydroxy-2,6-dimethylbenzyl)isocyanurate (product name: DH48, ASAHI DENKA Co., Ltd.), 20 parts of aqueous solution of 20% polyvinylalcohol (saponification degree: 88 mol %, polymerization degree: 300), 4 parts of 5% emulsion of a natural fat defoamer, 8 parts of aqueous solution of 5% dioctylsulfosuccinate sodium salt and 30 parts of water is treated in a sand mill to obtain the median diameter of 0.4 μm as measured by a laser diffraction particle size analyzer. Solution F is thus obtained.

Preparation of a Thermal Recording Layer Coating Solution

A composition consisting of 145 parts of Solution A, 25 parts of Solution B, 25 parts of Solution C, 400 parts of Solution D, 65 parts of Solution E, 100 parts of Solution F, 60 parts of aqueous solution of 30% polyvinyl alcohol (saponification degree; 88 mol %, polymerization degree; 300) and 250 parts of styrene-butadiene latex (product name: SMARTEX PA9281, solid content: 48%, NIPPON A&L INC.) as adhesives, 72 parts of aqueous solution of 5% adipic acid dihydrazide and 90 parts of water is mixed and stirred to obtain a thermal recording layer coating solution.

Preparation of a Protective Layer Coating Solution 200 parts of aqueous solution of 10% acetoacetyl-denatured polyvinylalcohol (product name: Gohsefimer 2320, The Nippon Synthetic Chemical Industry Co., Ltd.), 10 parts of water dispersion of 60% kaolin (product name: UW-90, EC), 9 parts of colloidal silica (product name: Snowtex OL, Nissan chemical Industries, Ltd., solid content: 20%), 6 parts of water dispersion of zinc stearate (product name: HYDRIN F-930, Chukyo Yushi Co., Ltd., solid content: 400), 0.4 parts of potassium salt of stearylphosphate ester (product name: Woopol 1800, Matsumoto Yushi-Seiyaku Co., Ltd., solid content: 35%), 1 part of 5% emulsion of a natural fat defoamer, 6 parts of aqueous solution of 5% dioctylsulfosuccinate sodium salt, 3 parts of aqueous solution of 5% potash alum, 15 parts of aqueous solution of 25% polyamideamine-epichlorohydrine (product name: WS-547, JAPAN PMC CORPORATION) and 70 parts of water are mixed and stirred to obtain a protective layer coating solution.

Production of a Thermal Recording Body

A thermal recording layer coating solution and a protective layer coating solution are sequentially applied and dried on a transparent PET film of 175 μm thickness (product name: Tetron film HMW, Teijin Ltd.) to result in the respective dry coating amounts of 21 g/$m^2$ and 4.5 g/$m^2$ to provide a thermal recording layer and a protective layer. A thermal recording body is thus obtained.

EXAMPLE 24

Production of a Support

Kaolin is added to a pulp slurry compounded with 25 parts of NBKP (CSF 550 ml) and 75 parts of LBKP (CSF 560 ml) to result in the paper ash content of 5.0%. Thereto is added a rosin size at 1.5% as a sizing agent and the sulfonate band at 2.0% relative to absolutely dry pulp. This pulp slurry is made into a paper by using a long net multi-cylinder dryer paper machine, and the obtained paper is subjected to a 4-stage super calendar treatment to obtain a support with a basis weight of 58 g/$m^2$.

Production of a Thermal Recording Body

Preparation of Solution A

A composition consisting of 10 parts of 3-(N-ethyl-N-isoamyl)amino-6-methyl-7-anilinofluoran, 5 parts of aqueous solution of 5% methylcellulose and 40 parts of water is ground in a sand mill to the average particle diameter of 3 μm.

Preparation of Solution B

A composition consisting of 30 parts of a color-developing composition of the present invention, 5 parts of aqueous solution of 5% methylcellulose and 80 parts of water is ground in a sand mill to the average particle diameter of 3 μm.

Preparation of Solution C

A composition consisting of 20 parts of 1,2-di(3-methylphenoxy)ethane, 5 parts of aqueous solution of 5% methylcellulose and 55 parts of water is ground in a sand mill to the average particle diameter of 3 μm.

Preparation of Solution D

A composition consisting of 200 parts of aqueous solution of 10% acetoacetyl group-denatured polyvinylalcohol, 100 parts of kaolin (product name: UW-90, EMC), 30 parts of water dispersion of 30% zinc stearate and 100 parts of water is mixed and stirred to obtain a coating solution.

Formation of a Thermal Recording Layer 55 parts of Solution A, 115 parts of Solution B, 80 parts of Solution C, 80 parts of aqueous solution of 10% polyvinylalcohol and 35 parts of calcium carbonate are mixed and stirred to obtain a coating solution. This coating solution is applied and dried on the surface of a support, obtained in the "Production of a support", to result in the dry coating amount of 6 $g/m^2$ to obtain a thermal recording layer. Solution D is applied and dried on this recording layer to result in the dry coating amount of 5 $g/m^2$, followed by a calendar treatment to obtain a thermal recording body.

Production of an Adhesive 100 g of styrene is dissolved in 160 g of benzene and heated to 50° C. Thereto is added 0.003 mol of secondary butyl lithium, and the reaction is occurred in a reactor at about 50° C. until all the styrene is converted to polymers, to obtain a reaction mixture. This reaction mixture is then added with 233 g of butadiene and polymerization is continued until the butadiene monomers are completely converted to polymers. Subsequently, thereto is added divinylbenzene as a coupling agent and the coupling reaction is occurred at 50° C. to obtain a thermoplastic polymer that is a mixture of AB-type diblock copolymer and ABA-type triblock copolymer. This thermoplastic polymer contains polystyrene A in the amount of 30% and AB-type diblock copolymer in the amount of 50%. The content ratio of AB-type diblock copolymer and ABA-type triblock copolymer is adjusted by changing the conditions of coupling reaction such as temperature for the coupling reaction and the timing of addition of alcohol for terminating coupling reaction. A composition consisting of 100 parts by weight of this thermoplastic polymer, 120 parts of an aromatic denatured terpene resin having a melting point of 105° C. (product name: YS Resin TR105, YASUHARA CHEMICAL CO., Ltd.) as a tackifier, 15 parts of a naphthene type process oil (product name: Shellflex 371JY, Shell Japan CO., Ltd.) as a softener and 1.5 parts of 2,2'-methylene-bis(4-ethyl-6-tert-butylphenol) (product name: Nocrac NS-5, Ouchi Shinko Chemical Industrial Co., Ltd.) as an antioxidant is dissolved in toluene to obtain an adhesive.

Production of a Thermal Label

A silicone type releasing agent which is a heat-curing solvent (product name: SD7220, Dow Corning Toray Silicone Co., Ltd.) is applied and dried on a polylaminate base paper with a basis weight of 90 $g/m^2$ (OJT TAC Co., Ltd.) to result in the dry weight of 0.5 $g/m^2$ to obtain a release paper. Then, the above-mentioned adhesive is applied on the silicone-coated surface of this release paper to result in the dry amount of 30 $g/m^2$ to form an adhesive layer. Further, the above-mentioned thermal recording body is sticked on the surface of this adhesive layer to obtain a thermal recording label.

EXAMPLE 25

Production of a Support

A polyethylene resin is melted by heat on both surfaces of a neutralized high-quality paper of 190 $g/m^2$ (paper thickness: 210 μm) in thickness of 20 μm, followed by extrusion coating to obtain a support having resin layers on both surfaces.

Preparation of an Undercoat Layer Coating Solution

A composition consisting of 100 parts of fired clay (oil absorption: 90 ml/100 g), 200 parts of aqueous solution of 10% polyvinylalcohol (saponification degree: 98 mol %, polymerization degree: 1000) and 100 parts of water is mixed and stirred to obtain an undercoat layer coating solution.

Preparation of Solution A

A composition consisting of 40 parts of 3-di-(n-butyl) amino-6-methyl-7-anilinofluoran, 5 parts of aqueous solution of 5% methylcellulose and 55 parts of water is ground in a sand mill to the average particle diameter of 1.0 μm to obtain Solution A.

Preparation of Solution B

A composition consisting of 40 parts of a color-developing composition of the present invention, 5 parts of aqueous solution of 5% methylcellulose and 55 parts of water is ground in a sand mill to the average particle diameter of 1.0 μm to obtain Solution B.

Preparation of Solution C

A composition consisting of 40 parts of 1,2-di(3-methylphenoxy)ethane, 5 parts of aqueous solution of 5% methylcellulose and 55 parts of water is ground in a sand mill to the average particle diameter of 1.0 μm to obtain Solution C.

Preparation of a Thermal Recording Layer Coating Solution 30 parts of Solution A, 60 parts of Solution B, 60 parts of Solution C, 120 parts of aqueous solution of 10% fully saponified polyvinylalcohol, 2 parts of aqueous solution of 40% glyoxal, 20 parts of styrene-butadiene latex with a solid concentration of 50%, and 18 parts of light calcium carbonate are mixed and stirred to obtain a thermal recording layer coating solution.

Preparation of a Protective Layer Coating Solution

A composition consisting of 250 parts of aqueous solution of 10% acetoacetyl-denatured polyvinylalcohol, 72 parts of kaolin (product name: UW-90, Engelhard Corp.), 4 parts of aqueous solution of 30% polyamideamine-epichlorohydrine, 6 parts of water dispersion of 30% zinc stearate and 150 parts of water is mixed and stirred to obtain a protective layer coating solution.

Preparation of a Magnetic Recording Layer Coating Solution

A composition consisting of 100 parts of barium ferrite (MC127, TOGA KOGYO CORP.), 2 parts of sodium polycarbonate (Aron T-40, Toagosei Co., Ltd., 40% aqueous solution), 4 parts of the copolymer salt of styrene and maleic acid anhydride (Polymaron 385, Arakawa Chemical Industries, Ltd. 25% aqueous solution), and 85 parts of water is dispersed in a sand mill. Then, a magnetic recording layer coating solution is obtained by using 30 parts of flexible urethane resin latex (Izelax S-3020N, Hodogaya Chemical Co., Ltd., solid content: 37%).

Production of a Thermal Recording Body

An undercoat layer coating solution, a thermal layer coating solution and a protective layer coating solution are applied and dried on one surface of a support to result in the respective dry coating amounts of 7 $g/m^2$, 6 $g/m^2$ and 4 $g/m^2$ to sequentially provide an undercoat layer, a thermal recording layer and a protective layer. A thermal recording body is thus obtained. Super calendar treatment is respectively conducted subsequent to the provision of the undercoat layer, the thermal recording layer and the protective layer. Next, onto the protective layer, a magnetic recording layer coating solution is applied using a Lip Coater in the flow direction with the coating width of 6.5 mm (the magnetic recording interlayer: 100 mm) to result in a dry coating amount of 30 $g/m^2$, followed by drying for 3 minutes at the drying temperature of 60° C. to provide a stripe magnetic recording layer. Further, before the coating process of the undercoat layer coating solution, both surfaces of the resin layer of the support is subjected to a corona treatment under the conditions of 5 kHz output frequency and 2 kW high-frequency output.

EXAMPLE 26

Preparation of a Microcapsule

A solution which is a mixture of 28 parts of diisopropylnaphthalene (product name: KMC-113, Kureha Chemical Industry Co., Ltd.) as a hydrophobic medium and 12 parts of aromatic polyvalent isocyanate (product name: XD-71-K19, Mitsui Takeda Chemical Inc.) is gradually added to 100 parts of aqueous solution of 5% polyvinylalcohol (product name: PVA217EE, KURARAY CO., LTD), wherein the aromatic polyvalent isocyanate is obtained by adding polyethyleneglycol in the amount of 2% to a dimmer, a trimer or a higher multimer complex of 4,4'-diphenylmethanediisocyanate. The resultant mixture is then subjected to emulsification and dispersion (average particle diameter after the emulsification and dispersion: 0.85 μm, measured by SALAD2000 (model name) manufactured by Shimadzu Corp.) for 2 minutes under stirring at a revolution of 8000 rpm using a homogenizer (product name: T.K. ROBOMICS, Tokushu Kika Kogyo Co., Ltd.). Subsequently, this emulsified dispersion solution is heated to 80° C. and subjected to a curing reaction for 8 hours to prepare a microcapsule dispersion solution having the average particle diameter of 1.0 μm.

The prepared microcapsule dispersion solution was directly used as an undercoat coating solution.

Preparation of a Thermal Recording Layer Coating Solution

Preparation of Solution A

A composition consisting of 10 parts of 3-di(n-butyl) amino-6-methyl-7-anilinofluoran, 5 parts of aqueous solution of 5% methylcellulose and 40 parts of water is ground in a sand mill to the average particle diameter of 1.5 μm or less.

Preparation of Solution B

A composition consisting of 20 parts of di-p-methylbenzyl oxalate ester, 5 parts of aqueous solution of 5% methylcellulose and 55 parts of water is ground in a sand mill to the average particle diameter of 2 μm or less.

Preparation of Solution C

A composition consisting of 20 parts of a color-developing composition of the present invention, 5 parts of aqueous solution of 5% methylcellulose and 55 parts of water is ground in a sand mill to the average particle diameter of 2 μm or less.

Formation of a Thermal Recording Layer

A composition consisting of 55 parts of Solution A, 80 parts of Solution B, 80 parts of Solution C, 75 parts of aqueous solution of 20% vinylacetate-denatured starch (product name: Petrocoat C-8, Nippon Starch Chemical Co., Ltd.), 10 parts of calcium carbonate (product name: Brilliant-15, Shiraishi Calcium Kaisha, Ltd.), 10 parts of amorphous silica (product name: Mizucasile P-603, Mizusawa Industrial Chemicals, Ltd.), 10 parts of dispersion solution of 36% zinc stearate, and 25 parts of dispersion solution of 30% paraffin wax is mixed and stirred to obtain a thermal recording layer coating solution.

Production of a Thermal Recording Body

An undercoat layer coating solution and a thermal recording layer coating solution are sequentially applied and dried on one surface of a high-quality paper with a basis weight of 51.5 g/$m^2$ to result in the respective dry coating amounts of 8 g/$m^2$ and 5 g/$m^2$ to form an undercoat layer and a thermal recording layer. A thermal recording body is thus obtained. Following the formation of the thermal recording layer, surface smoothing treatment is conducted by a super calendar treatment to attain the smoothness (TAPPI NO. 5-B) of 1000±200 seconds.

EXAMPLE 27

Preparation of an Undercoat Layer Coating Solution

A composition consisting of 100 parts of fired clay (oil absorption: 90 ml/100 g), 200 parts of aqueous solution of 10% polyvinylalcohol and 100 parts of water is mixed and stirred to obtain an undercoat layer coating solution.

Preparation of Solution A

A composition consisting of 15 parts of 3-di(n-butyl) amino-6-methyl-7-anilinofluoran, 5 parts of aqueous solution of 5% methylcellulose and 30 parts of water is ground in a sand mill to the average particle diameter of 1.0 μm.

Preparation of Solution B

A composition consisting of 34 parts of a color-developing composition of the present invention, 5 parts of aqueous solution of 5% methylcellulose and 76 parts of water is ground in a sand mill to the average particle diameter of 1.0 μm.

Preparation of Solution C 15 parts of 1,2-di(3-methylphenoxy)ethane, 5 parts of aqueous solution of 5% methylcellulose and 30 parts of water is ground in a sand mill to the average particle diameter of 1.0 μm.

Preparation of Solution D

A composition consisting of 15 parts of a compound represented by formula (3) (product name: WINGSTAY L-HLS, Good-Year Chemical company, average molecular weight: 540), 5 parts of aqueous solution of 5% methylcellulose and 30 parts of water is ground in a sand mill to the average particle diameter of 1.0 μm.

Preparation of a Thermal Recording Layer Coating Solution 50 parts of Solution A, 115 parts of Solution B, 50 parts of Solution C, 25 parts of Solution D, 130 parts of aqueous solution of 10% polyvinylalcohol, 25 parts of water dispersion of 48% styrene-butadiene copolymer emulsion and 50 parts of water dispersion of 30% aluminum hydroxide (product name: HIGILITE H-42M, Showa Denko K.K.) and 3 parts of adipic acid dihydrazide are mixed and stirred to obtain a thermal recording layer coating solution.

Preparation of a Protective Layer Coating Solution

A composition consisting of 300 parts of aqueous solution of 10% acetoacetyl-denatured polyvinylalcohol (product name: Gohsefimer Z-200, The Nippon Synthetic Chemical Industry Co., Ltd.), 150 parts of water dispersion of 50% kaolin (product name: UW-90, EC), 5 parts of water dispersion of 36% zinc stearate, 1.5 parts of water dispersion of 40% polyethylene wax (product name: Chemipal W-400, Mitsui Chemical Co., Ltd.) and 80 parts of water is mixed and stirred to obtain a protective layer coating solution.

Production of a Thermal Recording Body

An undercoat layer coating solution is applied and dried on one surface of a neutralized high-quality paper with a basis weight of 40 g/$m^2$ by a pure blade coating method to result in the dry coating amount of 9 g/$m^2$ to form an undercoat layer. Onto this undercoat layer, a thermal recording layer coating solution and a protective layer coating solution are applied and dried to result in the dry coating amounts of 6 g/$m^2$ and 3 g/$m^2$. A thermal recording body is thus obtained. Subsequent to the formation of the each layer, surface smoothing treatment is respectively conducted by a super calendar treatment.

EXAMPLE 28

Preparation of Dispersion Solution of Composite Particulate

A solution which is a mixture of 28 parts of styrene as an addition-polymerizable monomer, 1 part of 2,2'-azobis-isobutyronitrile, and 12 parts of aromatic polyvalent isocyanate (product name: XD-71-K19, Mitsui Takeda Chemical Inc.) is gradually added to 100 parts of aqueous solution of 5% polyvinylalcohol (product name: PVA217EE, KURARAY CO., LTD), wherein the aromatic polyvalent isocyanate is obtained by adding polyethyleneglycol in the amount of 2% to a polymer of 4,4'-diphenylmethanediisocyanate. The resultant mixture is then subjected to emulsification and dispersion (average particle diameter after the emulsification and dispersion: 0.85 μm) for 2 minutes under stirring at a revolution of 8500 rpm using a homogenizer (product name: T.K. ROBOMICS, Tokushu Kika Kogyo Co., Ltd.). Subsequently, 60 parts of water is added to this emulsified dispersion solution and heated to 65° C. and subjected to curing and polymerization reaction for 8 hours to prepare a dispersion solution of composite particulate, wherein the primary particle has the average particle diameter of 1.5 μm.

The dispersion solution of composite particulate prepared in the "Preparation of an undercoat layer coating solution" is directly used as an undercoat layer coating solution.

Preparation of a Thermal Recording Layer Coating Solution

Preparation of Solution A:

A composition consisting of 10 parts of 3-di(n-butyl) amino-6-methyl-7-anilinofluoran, 5 parts of aqueous solution of 5% methylcellulose and 40 parts of water is ground in a sand mill to the average particle diameter of 1.5 μm or less.

Preparation of Solution B:

A composition consisting of 20 parts of di-p-methylbenzyl oxalate ester, 5 parts of aqueous solution of 5% methylcellulose and 55 parts of water is ground in a sand mill to the average particle diameter of 2 μm or less.

Preparation of Solution C:

A composition consisting of 20 parts of a color-developing composition of the present invention, 5 parts of aqueous solution of 5% methylcellulose and 55 parts of water is ground in a sand mill to the average particle diameter of 2 μm or less.

A composition consisting of 55 parts of Solution A, 80 parts of Solution B, 80 parts of Solution C, 75 parts of aqueous solution of 20% vinylacetate-denatured starch (product name: Petrocoat C-8, Nippon Starch Chemical Co., Ltd.), 10 parts of calcium carbonate (product name: Brilliant-15, Shiraishi Calcium Kaisha, Ltd.), 10 parts of amorphous silica (product name: mizucasile P-603, Mizusawa Industrial Chemicals, Ltd.) 10 parts of dispersion solution of 36% zinc stearate and 25 parts of dispersion solution of 30% paraffin wax is mixed and stirred to obtain a thermal recording layer coating solution.

Production of a Thermal Recording Body

An undercoat layer coating solution and a thermal recording layer coating solution are sequentially applied and dried on one surface of a high-quality paper (neutralized paper) with a basis weight of 51.5 g/m$^2$ to result in the respective dry coating amounts of 8 g/m$^2$ and 5 g/m$^2$ to form an undercoat layer and a thermal recording layer. A thermal recording body is thus obtained. Subsequent to the formation of the thermal recording layer, a super calendar treatment is conducted to attain the smoothness (TAPPI NO. 5-B) of 1000±200 seconds.

EXAMPLE 29

Preparation of an Undercoat Layer Coating Solution

A composition consisting of 200 parts of water-dispersed body of 25% styrene-acrylic resin spherical powder (volume average particle diameter 1.2 μm) whose hole volume ratio after drying is 55%, 30 parts of fired kaolin (Ansilex, EC), 16 parts of styrene-butadiene latex with a solid concentration of 50%, and 70 parts of aqueous solution of 10% partially saponified polyvinylalcohol (saponification degree: 88 mol %, polymerization degree: 1000) is stirred to obtain an undercoat layer coating solution.

Preparation of Solution A:

A composition consisting of 10 parts of 3,6-bis(dimethylamino)fluorene-9-spiro-3'-(6'-dimethylamino) phthalide (leuco dye (A)), 20 parts of 3-di(n-butyl)amino-6-methyl-7-anilinofluoran (leuco dye (B)), parts of aqueous solution of 10% sulfone-denatured polyvinylalcohol and 65 parts of water is ground in a sand mill to the average particle diameter of 0.8 μm to obtain Solution A.

(Preparation of Solution B)

A composition consisting of 30 parts of 4-hydroxy-4'-isopropoxydiphenylsulfone, 5 parts of aqueous solution of 10% sulfone-denatured polyvinylalcohol and 65 parts of water is ground in a sand mill to the average particle diameter of 1.2 μm to obtain Solution B.

(Preparation of Solution C)

A composition consisting of 30 parts of 1,2-bis(3-methylphenoxy)ethane, 10 parts of aqueous solution of 5% methylcellulose and 60 parts of water is ground in a sand mill to the average particle diameter of 1.2 μm to obtain Solution C.

(Preparation of Solution D)

A composition consisting of 20 parts of 1,1-bis(2-methyl-4-hydroxy-5-tert-butylphenyl)butane, 10 parts of a color-developing composition of the present invention, 10 parts of aqueous solution of 5% methylcellulose and 60 parts of water is ground in a sand mill to the average particle diameter of 1.2 μm to obtain Solution D.

(Preparation of a Thermal Recording Layer Coating Solution)

40 parts of Solution A, 80 parts of Solution B, 40 parts of Solution C, 80 parts of Solution. D, 10 parts of light calcium carbonate, 20 parts of dispersion solution of 30% zinc stearate and 100 parts of aqueous solution of 10% polyvinylalcohol (saponification degree: 88 mol %, polymerization degree: 500) are mixed and stirred to obtain a thermal recording layer coating solution.

(Preparation of a Protective Layer Coating Solution)

A composition consisting of 300 parts of aqueous solution of 10% acetoacetyl-denatured polyvinylalcohol (product name: Gohsefimer Z-200, The Nippon Synthetic Chemical Industry Co., Ltd.), 100 parts of water dispersion of 60% kaolin (product name: UW-90, Engelhard Corp.), 15 parts of aqueous solution of 20% polyamideamine-epichlorohydrine resin, 10 parts of water dispersion of 30% zinc stearate and 40 parts of water is mixed and stirred to obtain a protective layer coating solution.

(Production of a Thermal Recording Body)

An undercoat layer coating solution, a thermal recording layer coating solution and a protective layer coating solution are sequentially applied and dried using a rod blade coater on one surface of an acidified high-quality paper with a basis weight of 80 g/m$^2$ and the bulk density of 0.85 to result in the respective dry coating amounts of 8 g/m$^2$, 4 g/m$^2$ and 3 g/m$^2$ to form an undercoat layer, a thermal recording layer and a protective layer (Super calendar treatment was conducted subsequent to the formation of the each layer. Beck smoothness on the surface of the protective layer side is 1500 seconds).

Further, a gloss layer coating solution comprising an acrylic ultraviolet-curing compound as a main component is applied on the protective layer using a gravure printer to result in the amount of 1 g/$m^2$, followed by ultraviolet irradiation for curing the gloss layer. A thermal recording body is thus obtained.

EXAMPLE 30

Preparation of an Undercoat Layer Coating Solution

A composition consisting of 100 parts of fired clay (product name: Ansilex, EC, oil absorption: 80 ml/100 g), 1 part of aqueous solution of 40% sodium polyacrylate, 14 parts of styrene-butadiene latex with a solid concentration of 48% (product name: L-1571, Asahi Kasei Corporation), 50 parts of aqueous solution of 10% polyvinylalcohol (saponification degree: 98 mol %, polymerization degree: 500) and 200 parts of water is mixed and stirred to obtain an undercoat layer coating solution.

Preparation of Dispersion Solution of a Sensitizer (Solution A)

A composition consisting of 18 parts of di-p-methylbenzyl oxalate ester (product name: HS-3520, Dainippon Ink & Chemicals, Inc.), 2 parts of di-p-chlorobenzyl oxalate ester (product name: HS-3519, Dainippon Ink & Chemicals, Inc.), 20 parts of aqueous solution of 10% polyvinylalcohol (product name: Goselane L-3266, The Nippon Synthetic Chemical Industry Co., Ltd.) and 10 parts of water is ground in a vertical sand mill (IMEX Co. Ltd.) to the average particle diameter of 1 μm. Solution A is thus obtained.

Preparation of Dispersion Solution of a Leuco Dye (Solution B)

A composition consisting of 10 parts of 3-di(n-butyl) amino-6-methyl-7-anilinofluoran, 5 parts of aqueous solution of 5% methylcellulose and 30 parts of water is ground in a sand mill to the average particle diameter of 0.5 μm to obtain Solution B.

Preparation of Dispersion Solution of a Color-Developing Agent (Solution C)

A composition consisting of 20 parts of 2,4'-dihydroxydiphenylsulfone (product name: 2,4' BPS, Nicca Chemical CO., Ltd.), 20 parts of aqueous solution of 10% polyvinylalcohol (product name: Goselane L-3266, The Nippon Synthetic Chemical Industry Co., Ltd.) and 10 parts of water is ground using a vertical sand mill (IMEX Co. Ltd.) to the average particle diameter of 1 μm to obtain Solution C.

Preparation of (Solution D)

A composition consisting of 8 parts of a color-developing composition of the present invention, 4 parts of aqueous solution of 5% methylcellulose and 20 parts of water is ground in a sand mill to the average particle diameter of 1 μm to obtain Solution D.

Preparation of a Thermal Recording Layer Coating Solution 50 parts of Solution A, 45 parts of Solution B, 50 parts of Solution C, 32 parts of Solution D, 170 parts of aqueous solution of 10% polyvinylalcohol, 10 parts of dispersion body of 36% zinc stearate (product name: HYDRIN Z-8, Chukyo Yushi Co., Ltd.) and 50 parts of dispersion body of 60% calcium carbonate (product name: Brilliant-15, Shiraishi Calcium Kaisha, Ltd.) are mixed and stirred to obtain a thermal recording layer coating solution.

Production of a Thermal Recording Body

An undercoat layer coating solution and a thermal recording layer coating solution are sequentially applied and dried on one surface of a neutralized paper (support) of 44 g/$m^2$ to result in the respective dry coating amounts of 8 g/$m^2$ and 5 g/$m^2$, followed by a super calendar treatment to obtain a thermal recording body.

EXAMPLE 31

Preparation of an Undercoat Layer Coating Solution

A composition consisting of 40 parts of fired clay (product name: Ansilex, EC, oil absorption: 110 ml/100 g), 100 parts of dispersion solution of 40% organic hollow powder having the average particle diameter of 1.0 μm (inner diameter/outer diameter: 0.7, film material: polystyrene), 1 part of aqueous solution of 40% sodium polyacrylate, 14 parts of styrene-butadiene latex with a solid concentration of 48%, 50 parts of aqueous solution of 10% polyvinylalcohol (saponification degree: 88%, polymerization degree: 1000) and 40 parts of water is mixed and stirred to obtain an undercoat layer coating solution.

Preparation of Solution A

A composition consisting of 10 parts of a color-developing composition of the present invention, 5 parts of aqueous solution of 5% methylcellulose and 25 parts of water is ground in a sand mill to the average particle diameter of 1.0 μm.

Preparation of Solution B

A composition consisting of 5 parts of a color-developing composition of the present invention and 25 parts of water is ground in a sand mill to the average particle diameter of 1.0 μm.

Preparation of Solution C

A composition consisting of 10 parts of 3-(N-ethyl-p-toluidino)-6-methyl-7-anilinofluoran, 5 parts of aqueous solution of 5% methylcellulose and 25 parts of water is ground in a sand mill to the average particle diameter of 1.0 μm.

Preparation of Solution D

A composition consisting of 10 parts of 1,2-di(3-methylphenoxy)ethane, 5 parts of aqueous solution of 5% methylcellulose and 25 parts of water is ground in a sand mill to the average particle diameter of 1.0 μm.

Preparation of a Thermal Recording Layer Coating Solution 100 parts of Solution A, 20 parts of Solution B, 40 parts of Solution C, 80 parts of Solution D, 160 parts of aqueous solution of 10% polyvinylalcohol, 20 parts of styrene-butadiene latex with a solid concentration of 50%, 17 parts of light calcium carbonate, and 12.5 parts of aqueous solution of 40% glyoxal are mixed and stirred to obtain a thermal recording layer coating solution.

Preparation of a Protective Layer Coating Solution 500 parts of aqueous solution of 10% acetoacetyl-denatured polyvinylalcohol (product name: Gohsefimer Z200, The Nippon Synthetic Chemical Industry Co., Ltd.) and 80 parts of water dispersion of 50% kaolin (product name: UW-90, EC) are mixed and stirred to obtain a protective layer coating solution.

Production of a Thermal Recording Body

An undercoat layer coating solution, a thermal recording layer coating solution and a protective layer coating solution are respectively applied and dried on one surface of a high-quality paper (neutralized paper) of 64 g/$m^2$ to result in the respective dry coating amounts of 9 g/$m^2$, 6 g/$m^2$ and 3 g/$m^2$ to sequentially form an undercoat layer, a thermal recording layer and a protective layer. A thermal recording body is thus obtained and the obtained thermal recording body is subjected to surface smoothing treatment by a super calendar treatment.

EXAMPLE 32

EXAMPLE 1

Preparation of Solution A

A composition consisting of 20 parts of 3-di(n-butyl) amino-6-methyl-7-anilinofluoran, 10 parts of aqueous solution of 20% polyvinylalcohol (saponification degree: 60 mol %, polymerization degree: 200), 0.5 parts of 5% emulsion of a natural fat defoamer and 20 parts of water is treated in a sand mill to obtain the median diameter of 1.0 μm as measured by a laser diffraction particle size analyzer. Solution A is thus obtained.

Preparation of Solution B (Dispersion Solution of the Specific Color-Developing Agent (a))

A composition consisting of 20 parts of a color-developing composition of the present invention, 10 parts of aqueous solution of 20% polyvinylalcohol (saponification degree: 88 mol %, polymerization degree: 300), 0.5 parts of 5% emulsion of a natural fat defoamer and 20 parts of water is treated in a sand mill to obtain the median diameter of 1.5 μm as measured by a laser diffraction particle size analyzer. Solution B is thus obtained.

Preparation of Solution C (Dispersion Solution of the Specific Compound (b))

A composition consisting of 20 parts of 1-[α-methyl-α-(4'-hydroxyphenyl)ethyl]-4-[α',α'-bis(4"-hydroxyphenyl)ethyl] benzene, 10 parts of aqueous solution of 20% polyvinylalcohol (saponification degree: 88 mol %, polymerization degree: 300), 0.5 parts of 5% emulsion of a natural fat defoamer and 20 parts of water is treated in a sand mill to obtain the median diameter of 1.5 μm as measured by a laser diffraction particle size analyzer. Solution C is thus obtained.

Preparation of Solution D (Dispersion Solution of a Sensitizer)

A composition consisting of 20 parts of di-p-methylbenzyl oxalate ester (product name: HS-3520, Dainippon Ink & Chemicals, Inc.), 10 parts of aqueous solution of 20% polyvinylalcohol (saponification degree: 88 mol %, polymerization degree: 300), 0.5 parts of 5% emulsion of a natural fat defoamer and 20 parts of water is treated in a sand mill to obtain the median diameter of 1.5 μm as measured by a laser diffraction particle size analyzer. Solution D is thus obtained.

Preparation of a Thermal Recording Layer Coating Solution

A composition consisting of 10 parts of particulate amorphous silica (product name: Mizucasile P-603, Mizusawa Industrial Chemicals, Ltd.), 40 parts of aqueous solution of 25% polyvinylalcohol (saponification degree: 88 mol %, polymerization degree: 300) as an adhesive, 25 parts of Solution A, 40 parts of Solution B, 25 parts of Solution C, 50 parts of Solution D, 16 parts of water dispersion of zinc stearate (product name: HYDRIN Z-7-30, solid content: 31.5%, Chukyo Yushi Co., Ltd.) and 50 parts of water is mixed and stirred to obtain a thermal recording layer coating solution.

Production of a Thermal Recording Body

The above-mentioned thermal recording layer coating solution is applied and dried on one surface of a high-quality paper (neutralized paper) of 64 g/m$^2$ to result in the dry coating amount of 5 g/m$^2$ to form a thermal recording layer, followed by a super calendar treatment to obtain a thermal recording body.

EXAMPLE 33

Preparation of an Undercoat Layer Coating Solution 88 parts of fired kaolin with an oil absorption of 110 ml, 20 parts of styrene-butadiene latex (solid concentration: 50%), 20 parts of aqueous solution of 5% carboxymethylcellulose (product name: Cellogen 7A, Dai-ichi Kogyo Seiyaku Co., Ltd.), 5 parts of aqueous solution of 20% sodium polyacrylate and 190 parts of water are mixed uniformly to obtain an undercoat layer coating solution.

Preparation of Solution A

A composition consisting of 18 parts of di-p-methylbenzyl oxalate ester (product name: HS-3520, Dainippon Ink & Chemicals, Inc.), 2 parts of di-p-chlorobenzyl oxalate ester (product name: HS-3519, Dainippon Ink & Chemicals, Inc.), 20 parts of aqueous solution of 10% polyvinylalcohol (product name: Goselane L-3266, The Nippon Synthetic Chemical Industry Co., Ltd.) and 10 parts of water is dispersed in a vertical sand mill (IMEX Co. Ltd.) to the average particle diameter of 1 μm.

Preparation of Solution B

A composition consisting of 10 parts of 3-di(n-butyl) amino-6-methyl-7-anilinofluoran, 5 parts of aqueous solution of 5% methylcellulose and 40 parts of water is dispersed in a sand mill to the average particle diameter of 0.5 μm.

Preparation of Solution C

A composition consisting of 20 parts of 4-hydroxy-4'-isopropoxydiphenylsulfone (product name: D-8, NIPPON SODA CO., LTD.), 20 parts of aqueous solution of 10% polyvinylalcohol (product name: Goselane L-3266, The Nippon Synthetic Chemical Industry Co., Ltd.) and 10 parts of water is dispersed in a vertical sand mill (IMEX Co. Ltd.) to the average particle diameter of 1 μm.

Preparation of Solution D

A composition consisting of 30 parts of a color-developing composition of the present invention, 5 parts of aqueous solution of 5% methylcellulose and 70 parts of water is dispersed in a sand mill to the average particle diameter of 2 μm.

Preparation of a Thermal Recording Layer Coating Solution 60 parts of Solution A, 70 parts of Solution B, 90 parts of Solution C, 20 parts of Solution D, 170 parts of aqueous solution of 10% polyvinylalcohol, 12 parts of dispersion solution of 36% zinc stearate (product name: HYDRIN Z-8, Chukyo Yushi Co., Ltd.) and 50 parts of dispersion solution of 60% calcium carbonate (product name: Brilliant-15, Shiraishi Calcium Kaisha, Ltd.) are mixed and stirred to prepare a thermal recording layer coating solution.

Production of a Thermal Recording Body

The above-mentioned undercoat layer coating solution is applied and dried on one surface of a high-quality paper of 44 g/m$^2$ to result in the dry coating amount of 8 g/m$^2$. Subsequently thereto, a thermal recording layer coating solution is applied and dried to result in the dry coating amount of 5 g/m$^2$, followed by a super calendar treatment to obtain a thermal recording body.

EXAMPLE 34

Preparation of an Undercoat Layer Coating Solution 88 parts of fired kaolin with an oil absorption of 110 ml/100 g, 20 parts of styrene-butadiene latex (solid concentration: 500), 20 parts of aqueous solution of 5% carboxymethylcellulose (product name: Cellogen 7A, Dai-ichi Kogyo Seiyaku Co., Ltd.), 5 parts of aqueous solution of 20% sodium polyacrylate and 190 parts of water are mixed uniformly to obtain an undercoat layer coating solution.

Preparation of Dispersion Solution of Composite Powder Containing a Dye Precursor (Solution A)

6 parts of 3-di(n-pentyl)amino-6-methyl-7-anilinofluoran and 3 parts of 2-hydroxy-4-octyloxybenzophenone as an ultraviolet absorber are dissolved in 9 parts of dicyclohexylmethane-4,4'-diisocyanate that has been heated to 100° C. The resultant solution is cooled to 35° C. and added gradually to 100 parts of aqueous solution of 8% polyvinylalcohol (trademark: Gosenol GM-14L, The Nippon Synthetic Chemical Industry Co., Ltd.) of the same temperature. The resultant is subjected to emulsification and dispersion under stirring at revolution of 8000 rpm using a homogenizer, and then 60 parts of water is added to this emulsified dispersion solution for homogenization. This emulsified dispersion solution is heated to 90° C., subjected to a curing reaction for 10 hours, and added with water to attain 20% solid concentration. A dispersion solution of composite powder having the average particle diameter of 0.8 μm is thus obtained.

Preparation of Dispersion Body of a Dye Precursor (Solution B)

20 parts of 3-(N-ethyl-p-toluidino)-6-methyl-7-anilinofluoran, 10 parts of solution of 20% sulfone-denatured polyvinyl (product name: Goselane L-3266, The Nippon Synthetic Chemical Industry Co., Ltd.) and 20 parts of water are ground and dispersed using a vertical sand mill (IMEX Co. Ltd.) to the average particle diameter of 0.8 μm.

Preparation of Dispersion Body of a Dye Precursor (Solution C)

20 parts of 3,3 '-bis(1-n-butyl-2-methylindole-3-i1)phthalide, 10 parts of solution of 20% sulfone-denatured polyvinyl (product name: Goselane L-3266, The Nippon Synthetic Chemical Industry Co., Ltd.) and 20 parts of water are ground and dispersed using a vertical sand mill (Sand Grinder, IMEX Co. Ltd.) to the average particle diameter of 0.7 μm.

Preparation of Dispersion Solution of a Color-Developing Agent (Solution D)

20 parts of N-p-toluenesulfonyl-N'-3-(p-toluenesulfonyloxy)phenylurea, 10 parts of a solution of 20% sulfone-denatured polyvinyl (product name: Goselane L-3266, The Nippon Synthetic Chemical Industry Co., Ltd.) and 30 parts of water are ground and dispersed using a vertical sand mill (Sand Grinder, IMEX Co. Ltd.) to the average particle diameter of 1.2 μm.

Preparation of Dispersion Solution of a Sensitizer (Solution E)

20 parts of a 1:1 mixture of di-p-methylbenzyl oxalate and di-p-chlorobenzyl oxalate (product name: HS-7150B, Dainippon Ink & Chemicals, Inc.), 10 parts of a solution of 20% sulfone-denatured polyvinyl (product name: Goselane L-3266, The Nippon Synthetic Chemical Industry Co., Ltd.) and 30 parts of water are ground and dispersed using a vertical sand mill (Sand Grinder, IMEX Co. Ltd.) to the average particle diameter of 1.0 μm.

Preparation of Dispersion Solution of a Diphenylsulfone Cross-Linking Compound (Solution F)

A composition consisting of 20 parts of a color-developing composition of the present invention, 5 parts of aqueous solution of 5% methylcellulose and 25 parts of water is ground and dispersed using a vertical sand mill (Sand Grinder, IMEX Co. Ltd.) to the average particle diameter of 1.0 μm.

Preparation of a First Thermal Color-forming Layer Coating Solution 30 parts of Solution B, 20 parts of Solution D, 30 parts of Solution E, 50 parts of Solution F, 10 parts of aluminum hydroxide, 100 parts of aqueous solution of 10% polyvinylalcohol (product name: PVA-110, KURARAY CO., LTD) and 70 parts of water are mixed and stirred uniformly to obtain a first thermal color-forming layer coating solution.

Preparation of a Second Thermal Color-forming Layer Coating Solution 265 parts of Solution A, 30 parts of Solution C, 60 parts of Solution D, 30 parts of Solution E, 10 parts of aluminum hydroxide, 100 parts of aqueous solution of 10% polyvinylalcohol (product name: PVA-110, KURARAY CO., LTD) and 70 parts of water are mixed and stirred uniformly to obtain a second thermal color-forming layer coating solution.

Preparation of a Protective Layer Coating Solution 100 parts of a solution of 10% acetoacetyl-denatured polyvinylalcohol (product name: Gohsefimer Z-200, The Nippon Synthetic Chemical Industry Co., Ltd.), 200 parts of kaolin, 10 parts of dispersion body of 30% zinc stearate (product name: HYDRIN Z-7, Chukyo Yushi Co., Ltd.) and 100 parts of water are mixed uniformly to obtain a protective layer coating solution.

Production of a Multicolor Thermal Recording Body

An undercoat layer coating solution, a first thermal color-forming layer coating solution, a second thermal color-forming layer coating solution and a protective layer coating solution are applied and dried on one surface of a high-quality paper with a basis weight of 81.4 $g/m^2$ (pH of the paper surface: 5.9) to result in the respective dry coating amounts of 8 $g/m^2$, 4 $g/m^2$, 3 $g/m^2$ and 2 $g/m^2$ to obtain a multicolor thermal recording body sequentially comprising an undercoat layer, a first thermal color-forming layer, a second thermal color-forming layer and a protective layer. Then, smoothing treatment is conducted by a super calendar treatment to attain the Beck smoothness (JIS-P8119) of 4000 seconds on the thermal recording surface. A multicolor thermal recording body is thus produced.

EXAMPLE 35

Dispersion solution of a color-developing agent (Solution A), dispersion solution of a basic colorless dye (Solution B) and dispersion solution of a sensitizer (Solution C) respectively consisting of the following constituents are separately subjected to wet grinding to the average particle diameter of 1 micron in a sand grinder.

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dibutylamino-6-methyl-7-anilinofluoran (ODB-2) | 2.0 parts |
| Aqueous solution of 10% polyvinylalcohol | 4.6 parts |
| Water | 2.6 parts |

Solution C (Dispersion Solution of a Color-Developing Adjuvant)

| | |
|---|---|
| 1,4'-dihydroxydiphenylsulfone | 2.0 parts |
| Aqueous solution of 10% polyvinylalcohol | 18.8 parts |
| Water | 11.2 parts |

Next, the dispersion solutions were mixed and stirred at the following ratio to prepare a coating solution.

| | |
|---|---|
| Solution A (Dispersion solution of a color-developing agent) | 36.0 parts |
| Solution B (Dispersion solution of a basic colorless dye) | 9.2 parts |
| Solution C (dispersion solution of a color-developing adjuvant) | 32.0 parts |
| Kaolin clay (50% dispersion solution) | 12.0 parts |

The above coating solution was coated on one surface of a base paper of 50 g/$m^2$ and dried. The obtained sheet was subjected to a super calendar treatment to attain the smoothness of 500-600 seconds to obtain a thermal recording body with the coating amount of 6.0 g/$m^2$.

EXAMPLE 36

Dispersion solution of a color-developing agent (Solution A), dispersion solution of a basic colorless dye (Solution B) and dispersion solution of a sensitizer (Solution C) respectively consisting of the following constituents are separately subjected to wet grinding to the average particle diameter of 1 micron in a sand grinder.

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dibutylamino-6-methyl-7-anilinofluoran (ODB-2) | 2.0 parts |
| Aqueous solution of 10% polyvinylalcohol | 4.6 parts |
| Water | 2.6 parts |

Solution C (Dispersion Solution of a Sensitizer)

| | |
|---|---|
| Diphenylaminosulfone | 4.0 parts |
| Aqueous solution of 10% polyvinylalcohol | 18.8 parts |
| Water | 11.2 parts |

Next, the dispersion solutions are mixed and stirred at the following ratio to prepare a coating solution.

| | |
|---|---|
| Solution A (Dispersion solution of a color-developing agent) | 36.0 parts |
| Solution B (Dispersion solution of a basic colorless dye) | 9.2 parts |
| Solution C (dispersion solution of a sensitizer) | 34.0 parts |
| Kaolin clay (50% dispersion solution) | 12.0 parts |

The above coating solution is coated on one surface of a base paper of 50 g/$m^2$ and dried. This sheet is subjected to a super calendar treatment to attain the smoothness of 500-600 seconds to obtain a thermal recording body with the coating amount of 6.0 g/$m^2$.

EXAMPLE 37

Dispersion solution of a color-developing agent (Solution A), dispersion solution of a basic colorless dye (Solution B) and dispersion solution of a sensitizer (Solution C) respectively consisting of the following constituents are separately subjected to wet grinding to the average particle diameter of 1 micron in a sand grinder.

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dibutylamino-6-methyl-7-anilinofluoran (ODB-2) | 2.0 parts |
| Aqueous solution of 10% polyvinylalcohol | 4.6 parts |
| Water | 2.6 parts |

Solution C (Dispersion Solution of a Sensitizer)

| | |
|---|---|
| Diphenylsulfone | 4.0 parts |
| Aqueous solution of 10% polyvinylalcohol | 18.8 parts |
| Water | 11.2 parts |

Next, the dispersion solutions are mixed and stirred at the following ratio to prepare a coating solution.

| | |
|---|---|
| Solution A (Dispersion solution of a color-developing agent) | 36.0 parts |
| Solution B (Dispersion solution of a basic colorless dye) | 9.2 parts |
| Solution C (dispersion solution of a sensitizer) | 34.0 parts |
| Kaolin clay (50% dispersion solution) | 12.0 parts |

The above coating solution is coated on one surface of a base paper of 50 g/$m^2$ and dried. This sheet is subjected to a super calendar treatment to attain the smoothness of 500-600 seconds to obtain a thermal recording body with the coating amount of 6.0 g/$m^2$.

EXAMPLE 38

Dispersion solution of a color-developing agent (Solution A), dispersion solution of a basic colorless dye (Solution B) and dispersion solution of a sensitizer (Solution C) respectively consisting of the following constituents are separately subjected to wet grinding to the average particle diameter of 1 micron in a sand grinder.

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dibutylamino-6-methyl-7-anilinofluoran (ODB-2 ) | 2.0 parts |
| Aqueous solution of 10% polyvinylalcohol | 4.6 parts |
| Water | 2.6 parts |

Solution C (Dispersion Solution of a Sensitizer)

| | |
|---|---|
| 2-methylbenzenesulfonamide | 4.0 parts |
| Aqueous solution of 10% polyvinylalcohol | 18.8 parts |
| Water | 11.2 parts |

Next, the dispersion solutions are mixed and stirred at the following ratio to prepare a coating solution.

| | |
|---|---|
| Solution A (Dispersion solution of a color-developing agent) | 36.0 parts |
| Solution B (Dispersion solution of a basic colorless dye) | 9.2 parts |
| Solution C (dispersion solution of a sensitizer) | 34.0 parts |
| Kaolin clay (50% dispersion solution) | 12.0 parts |

The above coating solution is coated on one surface of a base paper of 50 g/$m^2$ and dried. This sheet is subjected to a super calendar treatment to attain the smoothness of 500-600 seconds to obtain a thermal recording body with the coating amount of 6.0 g/$m^2$.

EXAMPLE 39

Dispersion solution of a color-developing agent (Solution A), dispersion solution of a basic colorless dye (Solution B), dispersion solution of a color-developing adjuvant (Solution C) and dispersion solution of a sensitizer (Solution D) respectively consisting of the following constituents are separately subjected to wet grinding to the average particle diameter of 1 micron in a sand grinder.

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dibutylamino-6-methyl-7-anilinofluoran (ODB-2) | 2.0 parts |
| Aqueous solution of 10% polyvinylalcohol | 4.6 parts |
| Water | 2.6 parts |

Solution C (Dispersion Solution of a Color-Developing Adjuvant)

| | |
|---|---|
| 1,4'-dihydroxydiphenylsulfone | 2.0 parts |
| Aqueous solution of 10% polyvinylalcohol | 18.8 parts |
| Water | 11.2 parts |

Solution D (Dispersion Solution of a Sensitizer)

| | |
|---|---|
| 2-methylbenzenesulfonamide | 6.0 parts |
| Aqueous solution of 10% polyvinylalcohol | 18.8 parts |
| Water | 11.2 parts |

Next, the dispersion solutions are mixed and stirred at the following ratio to prepare a coating solution.

| | |
|---|---|
| Solution A (Dispersion solution of a color-developing agent) | 36.0 parts |
| Solution B (Dispersion solution of a basic colorless dye) | 9.2 parts |
| Solution C (Dispersion solution of a color-developing adjuvant) | 32.0 parts |
| Solution D (dispersion solution of a sensitizer) | 36.0 parts |
| Kaolin clay (50% dispersion solution) | 12.0 parts |

The above coating solution is coated on one surface of a base paper of 50 g/$m^2$ and dried. This sheet is subjected to a super calendar treatment to attain the smoothness of 500-600 seconds to obtain a thermal recording body with the coating amount of 6.0 g/$m^2$.

EXAMPLE 40

A formulation consisting of the following constituents is stirred and dispersed to prepare an intermediate layer coating solution (Solution U).

| | |
|---|---|
| Solution U (intermediate layer coating solution) | 100 parts |
| Hollow polymer powder | |
| Styrene-butadiene copolymer latex (solid content: 48%) | 11 parts |
| Aqueous solution of 10% polyvinylalcohol | 10 parts |
| Water | 150 parts |

Subsequently, the intermediate layer coating solution (Solution U) is applied on one surface of a support (base paper of 60 g/$m^2$) and dried to obtain an intermediate layer with the coating amount of 8.0 g/$m^2$. Dispersion solution of a color-developing agent (Solution A) and dispersion solution of a basic colorless dye (Solution B) respectively consisting of the following constituents are separately subjected to wet grinding in a sand grinder to the average particle diameter of 1 micron.

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dibutylamino-6-methyl-7-anilinofluoran (ODB-2) | 2.0 parts |
| Aqueous solution of 10% polyvinylalcohol | 4.6 parts |
| Water | 2.6 parts |

Next, the dispersion solutions are mixed at the following ratio to prepare a coating solution for recording layer.

Recording Layer Coating Solution

| | |
|---|---|
| Solution A (Dispersion solution of a color-developing agent) | 36.0 parts |
| Solution B (Dispersion solution of a basic colorless dye) | 9.2 parts |
| Kaolin clay (50% dispersion solution) | 12.0 parts |

Next, the recording layer coating solution is applied on the intermediate layer of an intermediate layer forming paper and dried. This sheet is subjected to a super calendar treatment to attain the smoothness of 500-600 seconds to obtain a recording layer with the coating amount of 6.0 g/$m^2$.

EXAMPLE 41

An under layer coating solution consisting of the following constituents is applied and dried on one surface of a base paper with a basis weight of 55 $g/m^2$ to result in the dry coating amount of 10 $g/m^2$ to form an under layer.

(Under Layer Coating Solution)

| | |
|---|---|
| Fired kaolin | 1.0 part |
| 48% SBR latex emulsion | 1.0 part |
| Aqueous solution of 10% polyvinylalcohol | 0.5 parts |
| Water | 2.0 parts |

A thermal layer coating solution consisting of the following constituents is applied and dried on a base paper coated with the under layer to result in the dry coating amount of 5.5 $g/m^2$ to form a thermal layer.

| | |
|---|---|
| Dispersion solution containing a color-developing composition of the present invention | 20.0 parts |
| Dispersion solution containing 30% 3-di(n-butyl)amino-6-methyl-7-anilinofluoran | 10.0 parts |
| Dispersion solution containing 20% stearyl gallate | 5.0 parts |
| Dispersion solution containing 20% behenic acid iron•zinc salt | 5.0 parts |
| Dispersion solution containing 20% 1,2-bis(phenoxymethyl)benzene | 10.0 parts |
| Kaolin clay (50% dispersion solution) | 12.0 parts |
| Aqueous solution of 10% polyvinylalcohol | 20 parts |

This sheet is subjected to a super calendar treatment to attain the smoothness of 600 seconds to obtain a thermal recording body.

EXAMPLE 42

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-N-n-dibutylamino-6-methyl-7-anilinofluoran (ODB-2) | 2.0 parts |
| Aqueous solution of 10% polyvinylalcohol | 4.6 parts |
| Water | 2.6 parts |
| Solution C (dispersion solution of a sensitizer) 1,2-Di(3-methylphenoxy)ethane | 4.0 parts |
| Aqueous solution of 10% polyvinylalcohol | 5.0 parts |
| Water | 3.0 parts |

Each solution of the above compositions is ground in a sand grinder to the average particle diameter of 1 micron. Subsequently, the dispersion solutions are mixed and stirred at the following ratio to prepare a coating solution.

| | |
|---|---|
| Solution A | 36.0 parts |
| Solution B | 9.2 parts |
| Solution C | 12.0 parts |
| Kaolin clay (50% dispersion solution) | 12.0 parts |

The above coating solution is applied and dried on one surface of a middle-quality paper consisted of 85% recycled pulp of 50 $g/m^2$ and 15% NBKP to result in the coating amount of 6.0 $g/m^2$. This sheet is subjected to a super calendar treatment to attain the smoothness of 200-600 seconds to obtain a thermal recording paper.

EXAMPLE 43

Dispersion solution of a color-developing agent (Solution A), dispersion solution of a basic colorless dye (Solution B) and dispersion solution of a color-developing adjuvant (Solution C) respectively consisting of the following constituents are separately subjected to wet grinding to the average particle diameter of 1 micron in a sand grinder.

Solution A (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dibutylamino-6-methyl-7-anilinofluoran (ODB-2) | 2.0 parts |
| Aqueous solution of 10% polyvinylalcohol | 4.6 parts |
| Water | 2.6 parts |

Solution C (Dispersion Solution of a Color-Developing Adjuvant)

| | |
|---|---|
| N-phenyl-N'-[3-(aminosulfonyl)phenyl]urea | 2.0 parts |
| Aqueous solution of 10% polyvinylalcohol | 6.3 parts |
| Water | 3.7 parts |

Next, the dispersion solutions are mixed and stirred at the following ratio to prepare a coating solution.

| | |
|---|---|
| Solution A (Dispersion solution of a color-developing agent) | 36.0 parts |
| Solution B (Dispersion solution of a basic colorless dye) | 9.2 parts |
| Solution C (Dispersion solution of a color-developing adjuvant) | 12.0 parts |
| Kaolin clay (50% dispersion solution) | 12.0 parts |

The above coating solution is applied and dried on one surface of a base paper of 50 $g/m^2$. This sheet is subjected to a super calendar treatment to attain the Beck smoothness of 500-600 seconds to obtain a thermal recording sheet with the coating amount of 6.0 $g/m^2$.

EXAMPLE 44

As for each material of a dye, a color-developing agent and a sensitizer, dispersion solutions consisting of the following constituents are prepared beforehand, which dispersion solutions are then subjected to wet grinding in a sand grinder to the average particle diameter of 1 micron.

| | |
|---|---|
| Color-developing composition of the present invention | 6.0 parts |
| Aqueous solution of 10% polyvinylalcohol | 18.8 parts |
| Water | 11.2 parts |

Dispersion Solution of a Dye

| | |
|---|---|
| 3-Di-n-pentylamino-6-methyl-7-anilinofluoran (product name: Black 305, Yamada Chemical Co., LTd., hereinafter abbreviated as B305) | 2.0 parts |
| Aqueous solution of 10% polyvinylalcohol | 4.6 parts |
| Water | 2.6 parts |
| Dispersion solution of diphenylsulfone (DPS) | 6.0 parts |
| Aqueous solution of 10% polyvinylalcohol | 18.8 parts |
| Water | 11.2 parts |

Dispersion Solution of a Stabilizer

| | |
|---|---|
| 4-Benzyloxy-4'-(2,3-epoxy-2-methylpropoxy)diphenyl-sulfone (product name: NTZ-95, NIPPON SODA CO., LTD., hereinafter abbreviated as NTZ) | 1.0 part |
| Aqueous solution of 10% polyvinylalcohol | 3.1 parts |
| Water | 1.9 parts |

Following compositions were mixed to obtain a thermal layer coating solution. This coating solution is applied and dried on a high-quality paper with a basis weight of 50 g/$m^2$ to result in the dry coating amount of 6 g/$m^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye | 9.2 parts |
| Dispersion solution of diphenylsulfone | 36.0 parts |
| Dispersion solution of a stabilizer | 6.0 parts |
| Dispersion solution of 50% kaolin clay | 12.0 parts |

EXAMPLE 45

As for each material of a dye, a color-developing agent and a sensitizer, dispersion solutions consisting of the following constituents are prepared beforehand, which dispersion solutions are then subjected to wet grinding in a sand grinder to the average particle diameter of 1 micron.

| | |
|---|---|
| Color-developing composition of the present invention | 6.0 parts |
| Aqueous solution of 10% polyvinylalcohol | 18.8 parts |
| Water | 11.2 parts |

Dispersion Solution of a Dye

| | |
|---|---|
| 3-Di-n-pentylamino-6-methyl-7-anilinofluoran (product name: Black 305, Yamada Chemical Co., LTd., hereinafter abbreviated as B305) | 2.0 parts |
| Aqueous solution of 10% polyvinylalcohol | 4.6 parts |
| Water | 2.6 parts |
| 4-Methylbenzenesulfonylamide | 6.0 parts |
| Aqueous solution of 10% polyvinylalcohol | 18.8 parts |
| Water | 11.2 parts |

Dispersion Solution of a Stabilizer

| | |
|---|---|
| 4-Benzyloxy-4'-(2,3-epoxy-2-methylpropoxy)diphenyl-sulfone (product name: NTZ-95, NIPPON SODA CO., LTD., hereinafter abbreviated as NTZ) | 1.0 part |
| Aqueous solution of 10% polyvinylalcohol | 3.1 parts |
| Water | 1.9 parts |

Following compositions are mixed to obtain a thermal layer coating solution. This coating solution is applied and dried on a high-quality paper with a basis weight of 50 g/$m^2$ to result in the dry coating amount of 6 g/$m^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye | 9.2 parts |
| Dispersion solution of sulfonamide | 36.0 parts |
| Dispersion solution of a stabilizer | 6.0 parts |
| Dispersion solution of 50% kaolin clay | 12.0 parts |

EXAMPLE 46

Dispersion solution of a color-developing agent for a low-temperature color-forming layer (Solution I), dispersion solution of a leuco dye that forms blue color (Solution II), dispersion solution of a color-developing agent for a high-temperature color-forming layer (Solution III) and dispersion solution of a leuco dye that forms black color (Solution IV) respectively consisting of the following constituents are separately subjected to wet grinding in a sand grinder to the average particle diameter of 1 micron.

Solution I (Dispersion Solution of a Color-Developing Agent)

| | |
|---|---|
| 4-Hydroxy-4'-isopropoxydiphenylsulfone | 6.0 parts |
| 10% Polyvinylalcohol | 18.8 parts |
| Water | 11.2 parts |

Solution II (Dispersion Solution of a Blue-Type Leuco Dye)

| | |
|---|---|
| 3,3-Bis(p-dimethylaminophenyl)-6-dimethylaminophthalide | 1.0 part |
| 10% Polyvinylalcohol | 2.3 parts |
| Water | 1.3 parts |

Solution III (Dispersion Solution of a Color-Developing Agent)

| | |
|---|---|
| Color-developing composition of the present invention | 6.0 parts |
| 10% Polyvinylalcohol | 18.8 parts |
| Water | 11.2 parts |

Solution IV (Dispersion Solution of a Black-Type Leuco Dye)

| | |
|---|---|
| 3-Dibutyl-7-(o-chloroanilino)fluoran | 1.0 part |
| 10% Polyvinylalcohol | 2.3 parts |
| Water | 1.3 parts |

Next, the dispersion solutions are mixed and stirred at the following ratio to prepare a dispersion solution.

(Preparation of a Coating Solution for Low-Temperature Color-Forming Layer)

| | |
|---|---|
| Solution I (Dispersion solution of a color-developing agent) | 36.0 parts |
| Solution II (Dispersion solution of a blue-type leuco dye) | 13.8 parts |
| Silicon oxide pigment (25% dispersion solution, Mizucasile P-527, Mizusawa Industrial Chemicals, Ltd.) | 40 parts |
| Polyvinylalcohol (10%) | 20 parts |

(Preparation of a Coating Solution for High-Temperature Color-Forming Layer)

| | |
|---|---|
| Solution III (Dispersion solution of a color-developing agent) | 36.0 parts |
| Solution IV (Dispersion solution of a black-type leuco dye) | 13.8 parts |
| Silicon oxide pigment (25% dispersion solution, Mizucasile P-527, Mizusawa Industrial Chemicals, Ltd.) | 20 parts |
| Polyvinylalcohol (10%) | 20 parts |

The prepared coating solution for high-temperature color-forming layer is applied and dried on one surface of a base paper of 50 g/$m^2$ to result in the coating amount of 5.0 g/$m^2$. Thereto, a coating solution for low-temperature color-forming layer is further applied to result in 4.0 g/$m^2$. This sheet is subjected to a super calendar treatment to attain the smoothness of 500-600 seconds to obtain a double-color thermal recording body.

EXAMPLE 47

<Formation of a Thermal Recording Layer>

Each solution of the following compositions is ground in a sand grinder to the average particle diameter of 1 micron.

Solution A (Dispersion Solution of Color-Developing Agent-1)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of Basic Colorless Dye)

| | |
|---|---|
| 3-Di-butylamino-6-methyl-7-anilinofluoran (ODB-2) | 2.0 parts |
| Aqueous solution of 10% polyvinylalcohol | 4.6 parts |
| Water | 2.6 parts |

Solution C (Dispersion Solution of a Sensitivity Improver)

| | |
|---|---|
| Parabenzylbiphenyl | 4.0 parts |
| Aqueous solution of 10% polyvinylalcohol | 5.0 parts |
| Water | 3.0 parts |

Subsequently, dispersion solutions are mixed and stirred at the following ratio to prepare a thermal recording layer coating solution.

| | |
|---|---|
| Solution A | 36.0 parts |
| Solution B | 9.2 parts |
| Solution C | 12.0 parts |
| Titanium dioxide treated with alumina•silica•zirconia (L530, Kemira, particle diameter: 30-35 nm) (30% dispersion solution) | 20.0 parts |
| Kaolin clay (50% dispersion solution) | 4.0 parts |

This coating solution is applied and dried on one surface of a support of 50 g/$m^2$ to result in the coating amount of 6.0 g/$m^2$ to obtain a thermal recording layer. This sheet is subjected to a super calendar treatment to attain the Beck smoothness of 200-600 seconds to obtain a thermal recording body.

EXAMPLE 48

As for each material of a dye and a color-developing agent, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

Following compositions are mixed to obtain a thermal layer coating solution. This coating solution is applied and dried on a high-quality paper with a basis weight of 50 g/$m^2$ to result in the dry coating amount of 6 g/$m^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye | 13.8 parts |
| Fatty acid monoamide emulsion (22%) (average particle diameter: 0.5 micron, product name: G-270, Chukyo Yushi Co., Ltd.) | 54.55 parts |
| Kaolin clay (50% dispersion solution) | 26.0 parts |
| Zinc stearate (30% dispersion solution) | 6.7 parts |

EXAMPLE 49

A formulation consisting of the following constituents is stirred and dispersed to prepare an intermediate layer coating solution.

—Intermediate Layer Coating Solution—

| | |
|---|---|
| Fired kaolin | 100 parts |
| Styrene-butadiene copolymer latex (solid content: 48%) | 11 parts |
| Aqueous solution of 10% polyvinylalcohol | 10 parts |
| Water | 150 parts |

Next, the intermediate layer coating solution is applied on one surface of a support (base paper of 80 $g/m^2$) and dried to obtain an intermediate layer with the coating amount of 10.0 $g/m^2$. Further, dispersion solution of a color-developing agent (Solution A), dispersion solution of a basic colorless dye (Solution B) and dispersion solution of a sensitizer (Solution C) respectively consisting of the following constituents are separately subjected to wet grinding to the average particle diameter of 1 micron in a sand grinder.

Solution A (Dispersion Solution of Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution B (Dispersion Solution of Basic Colorless Dye)

| | |
|---|---|
| 3-Dibutylamino-6-methyl-7-anilinofluoran (ODB-2) | 2.0 parts |
| Aqueous solution of 10% polyvinylalcohol | 4.6 parts |
| Water | 2.6 parts |

Solution C (Dispersion Solution of a Sensitizer)

| | |
|---|---|
| 1,2-bis(phenoxymethyl)benzene (PMB-2) | 2.0 parts |
| Aqueous solution of 10% polyvinylalcohol | 2.5 parts |
| Water | 1.5 parts |

Subsequently, the dispersion solutions are mixed and stirred at the following ratio to prepare a recording layer coating solution.

—Recording Layer Coating Solution—

| | |
|---|---|
| Solution A (Dispersion solution of a color-developing agent) | 36.0 parts |
| Solution B (Dispersion solution of a basic colorless dye) | 9.2 parts |
| Solution C (Dispersion solution of a sensitizer) | 6.0 parts |
| Kaolin clay (50% dispersion solution) | 12.0 parts |

The recording layer coating solution is applied on the above-mentioned intermediate layer and dried. This sheet is subjected to a super calendar treatment to attain the smoothness of 500-600 seconds to provide a recording layer with the coating amount of 5.0 $g/m^2$. A thermal recording body is thus obtained.

EXAMPLE 50

Dispersion solution of a color-developing agent for a low-temperature color-forming layer (Solution I) and dispersion solution of a leuco dye that forms blue color (Solution II), and dispersion solutions of a color-developing agent for a high-temperature color-forming layer (Solutions III and IV) and dispersion solution of a leuco dye that forms black color (Solution V) respectively consisting of the following constituents are separately subjected to wet grinding in a sand grinder to the average particle diameter of 1 micron.

Solution I (Dispersion Solution of a Color-Developing Agent)

| | |
|---|---|
| 4-Hydroxy-4'-isopropoxydiphenylsulfone | 6.0 parts |
| Aqueous solution of 10% polyvinylalcohol | 18.8 parts |
| Water | 11.2 parts |

Solution II (Dispersion Solution of a Blue-Type Leuco Dye)

| | |
|---|---|
| 3,3-Bis(p-dimethylaminophenyl)-6-dimethylaminophthalide | 1.0 part |
| Aqueous solution of 10% polyvinylalcohol | 2.3 parts |
| Water | 1.3 parts |

Solution III (Dispersion Solution of a Color-Developing Agent)

| | |
|---|---|
| Color-developing composition of the present invention | 6.0 parts |
| Aqueous solution of 10% polyvinylalcohol | 18.8 parts |
| Water | 11.2 parts |

Solution V (Dispersion Solution of a Black-Type Leuco Dye)

| | |
|---|---|
| 3-(N-ethyl-p-toluidino)-6-methyl-7-anilinofluoran | 1.0 part |
| Aqueous solution of 10% polyvinylalcohol | 2.3 parts |
| Water | 1.3 parts |

Solution IV (Dispersion Solution of a Color-Developing Agent)

| | |
|---|---|
| 3-{[(phenylamino)carbonyl]amino}benzenesulfonamide | 6.0 parts |
| Aqueous solution of 10% polyvinylalcohol | 18.8 parts |
| Water | 11.2 parts |

Next, dispersion solutions are mixed and stirred at the following ratio to prepare a dispersion solution.

(Preparation of a Coating Solution for Low-Temperature Color-Forming Layer)

| | |
|---|---|
| Solution I (Dispersion solution of a color-developing agent) | 36.0 parts |
| Solution II (Dispersion solution of a blue-type leuco dye) | 13.8 parts |
| Silicon oxide pigment (25% dispersion solution, Mizucasile P-527, Mizusawa Industrial Chemicals, Ltd.) | 40.0 parts |
| Polyvinylalcohol (10%) | 20.0 parts |

(Preparation of a Coating Solution for High-Temperature Color-Forming Layer)

| | |
|---|---|
| Solution III (Dispersion solution of a color-developing agent) | 36.0 parts |
| Solution V (Dispersion solution of a black-type leuco dye) | 13.8 parts |
| Solution IV (Dispersion solution of a color-developing agent) | 3.0 parts |
| Polyvinylalcohol (10%) | 20.0 parts |

The prepared coating solution for high-temperature color-forming layer is applied on one surface of a base paper of 50 $g/m^2$ and dried to result in the dry coating amount of 5.0 $g/m^2$. Thereto, a coating solution for low-temperature color-forming layer is further applied to result in 4.0 g/$m^2$. This sheet is subjected to a super calendar treatment to attain the smoothness of 500-600 seconds to obtain a multicolor thermal recording body.

EXAMPLE 51

Solution I (Dispersion Solution of a Blue-Dye Precursor)

| | |
|---|---|
| 3,3-bis-dimethylaminophenyl-6-dimethylaminophthalide <CVL> | 30.0 parts |
| Aqueous solution of 10% polyvinylalcohol | 50.0 parts |
| Water | 20.0 parts |

A mixture solution of the above composition is ground in a sand grinder to the average particle diameter of 1 micron.

Solution II (Dispersion Solution of a Color-Developing Agent)

| | |
|---|---|
| Color-developing composition of the present invention | 30.0 parts |
| Aqueous solution of 10% polyvinylalcohol | 20.0 parts |
| Water | 10.0 parts |

A mixture solution of the above composition is ground in a sand grinder to the average particle diameter of 1 micron.

Solution III (Dispersion Solution of a Color-Developing Agent)

| | |
|---|---|
| 2,4'-dihydroxydiphenylsulfone | 30.0 parts |
| Aqueous solution of 10% polyvinylalcohol | 20.0 parts |
| Water | 10.0 parts |

A mixture solution of the above composition is ground in a sand grinder to the average particle diameter of 1 micron. Subsequently, the dispersion solutions are mixed at the following ratio to obtain a coating solution.

| | |
|---|---|
| Dispersion solution of black-color composite particulate A | 10.0 parts |
| Solution II (Dispersion solution of a blue-color dye precursor) | 10.0 parts |
| Solution III (Dispersion solution of a color-developing agent) | 10.0 parts |
| Solution IV (Dispersion solution of a color-developing agent) | 20.0 parts |
| Dispersion solution of 30% silica | 40.0 parts |

The above coating solution is applied and dried on one surface of a paper of 60 g/$m^2$ using a Mayer Bar to result in the coating amount of 6.0 g/$m^2$ to produce a thermal recording body.

EXAMPLE 52

As for each material of a dye and a color-developing agent, dispersion solutions consisting of the following constituents are prepared beforehand, which dispersion solutions are then subjected to wet grinding in a sand grinder to the average particle diameter of 0.5 μm.

<Dispersion Solution of a Color-Developing Agent>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

<Dispersion Solution of a Sensitizer>

| | |
|---|---|
| Stearic acid amide (average particle diameter: 0.4 μm) | 6.0 parts |
| Aqueous solution of 10% polyvinylalcohol | 18.8 parts |
| Water | 11.2 parts |

Following compositions are mixed to obtain a thermal recording layer coating solution. This coating solution is applied and dried on a high-quality paper with a basis weight of 50 g/$m^2$ to result in the dry coating amount of 6 g/$m^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye | 13.8 parts |
| Dispersion solution of a sensitizer | 36.0 parts |
| Dispersion solution of 50% aluminum hydroxide | 26.0 parts |
| Dispersion solution of 30% zinc stearate | 6.7 parts |
| Acrylic emulsion (product name: Movinyl 735, Clariant Polymer Co., Ltd.) | 20.0 parts |
| Colloidal silica (average particle diameter: 12 nm) | 5.0 parts |

EXAMPLE 53

A formulation consisting of the following constituents are stirred and dispersed to prepare an under layer coating solution.

—Under Layer Coating Solution—

| | |
|---|---|
| Fired kaolin | 100 parts |
| Styrene-butadiene copolymer latex (solid concentration: 48%) | 11 parts |
| Aqueous solution of 10% polyvinylalcohol | 10 parts |
| Water | 150 parts |

Subsequently, the under layer coating solution is coated on one surface of a support (base paper of 80 g/$m^2$) and dried to obtain an under layer with the coating amount of 10.0 g/$m^2$.

Further, dispersion solution of a color-developing agent (Solution A), dispersion solution of a basic colorless dye (Solution B) and dispersion solution of a sensitizer (Solution C) respectively consisting of the following constituents are separately subjected to wet grinding to the average particle diameter of 1 micron in a sand grinder.

Solution A (Dispersion Solution of a Color-Developing Agent)

| | |
|---|---|
| 4-Hydroxy-4'-n-propoxydiphenylsulfone (solubility: 0.1277 g/ml) | 6.0 parts |
| Aqueous solution of 10% polyvinylalcohol | 18.8 parts |
| Water | 11.2 parts |

Solution B (Dispersion Solution of a Basic Colorless Dye)

| | |
|---|---|
| 3-Dipentylamino-6-methyl-7-anilinofluoran (BLACK-305) | 2.0 parts |
| Aqueous solution of 10% polyvinylalcohol | 4.6 parts |
| Water | 2.6 parts |

Solution C (dispersion Solution of a Sensitizer)

| | |
|---|---|
| 1,2-bis(phenoxymethyl)benzene (PMB-2) | 2.0 parts |
| Aqueous solution of 10% polyvinylalcohol | 2.5 parts |
| Water | 1.5 parts |

Next, dispersion solutions were mixed at the following ratio to prepare a recording layer coating solution.

—Recording Layer Coating Solution—

| | |
|---|---|
| Solution A (Dispersion solution of a color-developing agent) | 36.0 parts |
| Solution B (Dispersion solution of a basic colorless dye) | 9.2 parts |
| Solution C (dispersion solution of a sensitizer) | 6.0 parts |
| Aqueous solution of 25% polydiallyldimethyl ammomium chloride (dye fixing agent) | 1.0 part |
| Kaolin clay (50% dispersion solution) | 12.0 parts |

The recording layer coating solution is coated on the above-mentioned under layer and dried. This sheet is subjected to a super calendar treatment to attain the smoothness of 500-600 seconds to provide a recording layer with the coating amount of 5.0 g/$m^2$. A thermal recording body is thus obtained.

EXAMPLE 54

As for each material of a dye and a color-developing agent, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent>

| | |
|---|---|
| NKK-515 (NIPPON SODA CO., LTD.) | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran | 3.0 parts |
| Aqueous solution of 10% polyvinylalcohol | 6.9 parts |
| Water | 3.9 parts |

<Dispersion Solution of a Sensitizer>

| | |
|---|---|
| D-Benzylbiphenyl | 6.0 parts |
| Aqueous solution of 10% polyvinylalcohol | 18.8 parts |
| Water | 11.2 parts |

<Dispersion Solution of a Stabilizer>

| | |
|---|---|
| Color-developing composition of the present invention | 3.0 parts |
| Aqueous solution of 10% polyvinylalcohol | 9.4 parts |
| Water | 5.6 parts |

The above dispersion solutions are mixed at the following ratio to obtain a thermal layer coating solution. This coating solution is applied and dried on a high-quality paper with a basis weight of 50 g/$m^2$ to result in the dry coating amount of 6 g/$m^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye | 13.8 parts |
| Dispersion solution of a sensitizer | 36.0 parts |
| Dispersion solution of a stabilizer | 6.0 parts |
| Dispersion solution of 50% kaolin clay | 26.0 parts |
| Dispersion solution of 30% zinc stearate | 6.7 parts |

EXAMPLE 55

As for each material of a dye and a color-developing agent, dispersion solutions consisting of the following constituents are prepared beforehand, which dispersion solutions are then subjected to wet grinding in a sand grinder to the average particle diameter of 0.5 μm.

<Dispersion Solution of a Color-Developing Agent>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

<Dispersion Solution of a Sensitizer>

| | |
|---|---|
| Stearic acid amide (average particle diameter: 0.4 μm) | 6.0 parts |
| Aqueous solution of 10% polyvinylalcohol | 18.8 parts |
| Water | 11.2 parts |

Following dispersion solutions, etc. are mixed to obtain a thermal recording layer coating solution. This coating solution is applied and dried on a high-quality paper with a basis weight of 50 g/$m^2$ to result in the dry coating amount of 6 g/$m^2$, followed by a super calendar treatment to attain the Beck smoothness of 200-600 seconds. A thermal recording body is thus obtained. Further, a thermal recording body is obtained likewise after retaining this coating solution for 24 hours at 40° C.

| | |
|---|---|
| Dispersion solution of a color-developing agent | 36.0 parts |
| Dispersion solution of a dye | 13.8 parts |
| Dispersion solution of a sensitizer | 36.0 parts |
| Dispersion solution of 50% aluminum hydroxide | 26.0 parts |
| Dispersion solution of 30% zinc stearate | 6.7 parts |
| Aqueous emulsion of acrylic polymer (solid content: 40%) | 20.0 parts |
| Colloidal silica (average particle diameter: 12 nm, solid content: 40%) | 5.0 parts |

EXAMPLE 56

(Production of a Thermal Color-Forming Layer)

As for each material of a dye and a color-developing agent, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

<Dispersion Solution of a Sensitizer>

| | |
|---|---|
| Oxalic acid-di(p-chlorobenzyl ester) (product name: HS-3519, Dainippon Ink & Chemicals, Inc.) | 6.0 parts |
| Aqueous solution of 10% polyvinylalcohol | 18.8 parts |
| Water | 11.2 parts |

Following compositions are mixed to obtain a thermal color-forming layer coating solution. This coating solution is applied and dried on the base paper produced in the above with a basis weight of 80 g/m$^2$ to result in the dry coating amount of 6 g/m$^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye (ODB-2) | 13.8 parts |
| Dispersion solution of a sensitizer | 36.0 parts |
| Dispersion solution of 50% kaolin clay | 26.0 parts |
| Dispersion solution of 30% zinc stearate | 6.7 parts |

(Production of an InkJet Recording Surface)

Onto the other surface of the base paper, a coating solution is applied and dried to result in the dry solid amount of 2.25 g/m$^2$, wherein the coating solution contains 1% polyvinylalcohol (PVA-117, KURARAY CO., LTD), 1% magnesium sulfate and 1% cationic resin (cationic degree: 5 meq/g, MW: 1.0×10$^5$, polyimide-epichlorohydrine resin) respectively as a solid. Then, a machine calendar treatment is conducted to obtain a thermal recording body.

EXAMPLE 57

(Production of a Thermal Color-Forming Layer)

As for each material of a dye and a color-developing agent, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

<Dispersion Solution of a Sensitizer>

| | |
|---|---|
| Oxalic acid-di(p-chlorobenzyl ester) (product name: HS-3519, Dainippon Ink & Chemicals, Inc.) | 6.0 parts |
| Aqueous solution of 10% polyvinylalcohol | 18.8 parts |
| Water | 11.2 parts |

Following compositions are mixed to obtain a thermal layer coating solution. This coating solution is applied and dried on the base paper produced in the above with a basis weight of 80 g/m$^2$ to result in the dry coating amount of 6 g/m$^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye (ODB-2) | 13.8 parts |
| Dispersion solution of a sensitizer | 36.0 parts |
| Dispersion solution of 50% kaolin clay | 26.0 parts |
| Dispersion solution of 30% zinc stearate | 6.7 parts |

(Production of an InkJet Recording Layer)

Followings are mixed: 40 parts of synthetic amorphous silica (Fine Seal X-37B, Tokuyama Soda Co., Ltd.) and 60 parts of synthetic amorphous silica (Syloid 621, Grace Davison Co., Ltd.) as pigments, and 25 parts of polyvinylalcohol (PVA-117, KURARAY CO., LTD), 4 parts of emulsion of ethylene vinylacetate (Sumika Flex 7400, Sumitomo Chemical Co., Ltd.) and 4 parts of styrene-butadiene latex (L×438C, Zeon Corp.) as hydrophilic adhesives. Thereto is further added 2 parts of styrene acrylic resin (Polymaron 360, Arakawa Chemical Industries, Ltd.) as a surface sizing agent and 8 parts of polyamine-type dye fixing agent (PAS-H-10L, Nitto Boseki Co., Ltd.). Thereto, dilution water is further added to prepare a color with 20% solid content.

Onto the surface opposite to the thermal layer coating surface of the base paper, the above coating solution is applied using a bar blade coater and dried to result in the dry solid coating amount of 12 g/m$^2$. Then, a machine calendar treatment is conducted to obtain a thermal recording body.

EXAMPLE 58

(Production of a Thermal Color-Forming Layer)

As for each material of a dye and a color-developing agent, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

<Dispersion Solution of a Sensitizer>

| | |
|---|---|
| Oxalic acid-di(p-chlorobenzyl ester) | 6.0 parts |
| Aqueous solution of 10% polyvinylalcohol | 18.8 parts |
| Water | 11.2 parts |

Following compositions are mixed to obtain a thermal color-forming layer coating solution.

| | |
|---|---|
| Dispersion solution of a color-developing agent | 36.0 parts |
| Dispersion solution of a dye (ODB-2) | 13.8 parts |
| Dispersion solution of a sensitizer | 36.0 parts |
| Dispersion solution of 50% kaolin clay | 26.0 parts |
| Dispersion solution of 30% zinc stearate | 6.7 parts |

This coating solution is applied and dried on the surface, with a low loading material content, of the base paper produced in the above with a basis weight of 80 g/$m^2$ to result in the dry coating amount of 6 g/$m^2$. Then, a super calendar treatment is conducted to attain the Beck smoothness of 200-600 seconds to obtain a thermal recording body.

(Production of an InkJet Recording Layer)

Followings are mixed: 40 parts of synthetic amorphous silica (Fine Seal X-37B, Tokuyama Soda Co., Ltd.) and 60 parts of synthetic amorphous silica (Syloid 621, Grace Davison Co., Ltd.) as pigments, and 25 parts of polyvinylalcohol (PVA-117, KURARAY CO., LTD), 4 parts of emulsion of ethylene vinylacetate (Sumika Flex 7400, Sumitomo Chemical Co., Ltd.) and 4 parts of styrene-butadiene latex (L×438C, Zeon Corp.) as hydrophilic adhesives. Thereto is further added 2 parts of styrene acrylic resin (Polymaron 360, Arakawa Chemical Industries, Ltd.) as a surface sizing agent and 8 parts of polyamine-type dye fixing agent (PAS-HM-10L, Nitto Boseki Co., Ltd.). Thereto, dilution water is further added to prepare a color with 20% solid content.

On a surface, with a high loading material content, of the base paper, the above coating solution is applied and dried using a bar blade coater to result in the dry solid coating amount of 9 g/$m^2$. Then, a machine calendar treatment is conducted to obtain a thermal recording body.

EXAMPLE 59

As for each material of a dye and a color-developing agent, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent A>

| | |
|---|---|
| The 1:1 mixture of 4-methyl-4'-hydroxydiphenylsulfone and 4-methyl-2'-hydroxydiphenylsulfone (product name: DS-2000, Yamamoto Chemicals Inc.) | 6.0 parts |
| Aqueous solution of 10% polyvinylalcohol | 18.8 parts |
| Water | 11.2 parts |

<Dispersion Solution of a Color-Developing Agent B>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

<Dispersion Solution of a Fatty Acid Monoamide>

| | |
|---|---|
| Stearic acid amide | 6.0 parts |
| Aqueous solution of 10% polyvinylalcohol | 18.8 parts |
| Water | 11.2 parts |

Following compositions are mixed to obtain a thermal layer coating solution. This coating solution is applied and dried on a high-quality paper with a basis weight of 50 g/$m^2$ to result in the dry coating amount of 6 g/$m^2$, followed by a super calendar treatment to attain the Beck smoothness of 200-600 seconds. A thermal recording body is thus obtained.

| | |
|---|---|
| Dispersion solution of a color-developing agent A | 36.0 parts |
| Dispersion solution of a color-developing agent B | 6.0 parts |
| Dispersion solution of a dye | 13.8 parts |
| Dispersion solution of fatty acid monoamide | 36.0 parts |
| Dispersion solution of 50% kaolin clay | 26.0 parts |
| Dispersion solution of 30% zinc stearate | 6.7 parts |

EXAMPLE 60

As for each material of a dye and a color-developing agent, dispersion solutions consisting of the following constituents are prepared beforehand, which dispersion solutions are then subjected to wet grinding in a sand grinder to the average particle diameter of 0.5 μm.

<Dispersion Solution of a Color-Developing Agent>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran (ODB-2) | 3.0 parts |
| Aqueous solution of 10% polyvinylalcohol | 6.9 parts |
| Water | 3.9 parts |

<Dispersion Solution of a Sensitizer>

| | |
|---|---|
| Stearic acid amide (average particle diameter: 0.4 μm) | 6.0 parts |
| Aqueous solution of 10% polyvinylalcohol | 18.8 parts |
| Water | 11.2 parts |

Following dispersion solutions, etc. are mixed to obtain a thermal recording layer coating solution. This coating solution is applied and dried on a high-quality paper with a basis weight of 50 g/m$^2$ to result in the dry coating amount of 6 g/m$^2$, followed by a super calendar treatment to attain the Beck smoothness of 200-600 seconds. A thermal recording body is thus obtained.

| | |
|---|---|
| Dispersion solution of a color-developing agent | 36.0 parts |
| Dispersion solution of a dye | 13.8 parts |
| Dispersion solution of a sensitizer | 36.0 parts |
| Dispersion solution of 50% aluminum hydroxide | 26.0 parts |
| Dispersion solution of 30% zinc stearate | 6.7 parts |
| Aqueous emulsion of acrylic polymer (a) (solid content: 40%) | 20.0 parts |
| Spherical colloidal silica (average particle diameter: 12 nm, solid content: 40%) | 5.0 parts |
| Glyoxal | 1.0 part |

The obtained thermal recording body is subjected to heat treatment at 40° C. for 3 days to obtain a desired thermal recording body.

EXAMPLE 61

As for each material of a dye and a color-developing agent, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent-1>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Color-Developing Agent-2>

| | |
|---|---|
| Bisphenol C | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran | 3.0 parts |
| Aqueous solution of 10% polyvinylalcohol | 6.9 parts |
| Water | 3.9 parts |

<Dispersion Solution of a Sensitizer-1>

| | |
|---|---|
| Diphenylsulone | 6.0 parts |
| Aqueous solution of 10% polyvinylalcohol | 18.8 parts |
| Water | 11.2 parts |

Together with the above-mentioned dispersion solutions of a color-developing agent, a dye and a sensitizer, the dispersion solutions of 50% kaolin clay and 30% zinc stearate are also used. These are mixed according to the following formulation to obtain a thermal color-forming layer coating solution. This coating solution is then applied and dried on one surface of a base paper (high-quality paper) with a basis weight of 50 g/m$^2$ to result in the dry coating amount of 6.0 g/m$^2$, followed by a super calendar treatment to attain the Beck smoothness of 200-600 seconds. A thermal recording body is thus obtained.

| | |
|---|---|
| Dispersion solution of a color-developing agent-1 | 32.7 parts |
| Dispersion solution of a color-developing agent-2 | 3.3 parts |
| Dispersion solution of a dye | 13.8 parts |
| Dispersion solution of a sensitizer-1 | 36.0 parts |
| Dispersion solution of a 50% kaolin clay | 26.0 parts |
| Dispersion solution of a 30% zinc stearate | 6.7 parts |

EXAMPLE 62

As for each material of a dye, a color-developing agent and a sensitizer, dispersion solutions consisting of the following constituents are prepared beforehand, which dispersion solutions are then subjected to wet grinding in a sand grinder to the average particle diameter of 0.5 micron.

<Dispersion Solution of a Color-Developing Agent-1>

| | |
|---|---|
| Color-developing composition of the present invention | 6.0 parts |
| Aqueous solution of 10% polyvinylalcohol | 18.8 parts |
| Water | 11.2 parts |

<Dispersion Solution of a Color-Developing Agent-2>

| | |
|---|---|
| Condensate composition containing 2,2'-methylenebis(4-t-butylphenol) by 62% (i.e., a condensate composition containing 2,2'-methylenebis(4-t-butylphenol) by 62%, and the remaining portion is consisted of the corresponding trinuclear condensate (26%), tetranuclear condensate (9%) and pentanuclear condensate (3%)) | 6.0 parts |
| Aqueous solution of 10% polyvinylalcohol | 18.8 parts |
| Water | 11.2 parts |

<Dispersion Solution of a Dye>

| | |
|---|---|
| 3-Di-n-butylamino-6-methyl-7-anilinofluoran | 3.0 parts |
| Aqueous solution of 10% polyvinylalcohol | 6.9 parts |
| Water | 3.9 parts |

<Dispersion Solution of a Sensitizer>

| | |
|---|---|
| 1,2-Di(3-methylphenoxy)ethane | 6.0 parts |
| Aqueous solution of 10% polyvinylalcohol | 18.8 parts |
| Water | 11.2 parts |

Together with the above-mentioned dispersion solution of a color-developing agent-1 and dispersion solution of a color-developing agent-2, the dispersion solutions of a dye, a sensitizer, 50% kaolin clay and 30% zinc stearate are also used. These are mixed according to the following formulation to obtain a thermal color-forming layer coating solution. This coating solution is applied and dried on one surface of a base paper (high-quality paper) with a basis weight of 50 g/$m^2$ to result in the dry coating amount of 6.0 g/$m^2$. Then, a super calendar treatment is conducted to attain the Beck smoothness of 200-600 seconds to obtain a thermal recording body.

| | |
|---|---|
| Dispersion solution of a color-developing agent-1 | 18.0 parts |
| Dispersion solution of a color-developing agent-2 | 18.0 parts |
| Dispersion solution of a dye | 13.8 parts |
| Dispersion solution of a sensitizer | 36.0 parts |
| Dispersion solution of a 50% kaolin clay | 26.0 parts |
| Dispersion solution of a 30% zinc stearate | 6.7 parts |

EXAMPLE 63

An under layer, a thermal color-forming layer (recording layer) and a protective layer are fomed on one surface of a support, and a back layer is formed on the other surface. Coating solutions to be used for each coating layer of a thermal recording body are prepared as follows.

Under Layer Coating Solution

| | |
|---|---|
| Fired kaolin (Ansilex 90, Engelhard Corp.) | 90.0 parts |
| Styrene-butadiene copolymer latex (solid content: 50%) | 10.0 parts |
| Water | 50.0 parts |

The mixture consisting of the above constituents is mixed and stirred to prepare an under layer coating solution.

Thermal Color-Forming Layer Coating Solution

The following Solution A is subjected to wet grinding until retention time reaches 5 minutes by using Sand Grinder (DYNO-MILL TYPE KDL, SHINMARU ENTERPRISES Corp.) under the conditions of the loading rate of zirconia bead (0.5 mm diameter) being 80% (grinding room volume: 1.4 L), rotor circumferential velocity of 12 m/sec, flow of 18 L/Hr, and flow/grinding room volume=13.

Solution A (Dispersion Solution of a Color-Developing Agent):

| | |
|---|---|
| Condensate composition containing 2,2'-methylenebis(4-t-butylphenol) (product name: JKY 224, API Corporation, constituent: 62.3 wt % of 2,2'-methylenebis(4-t-butylphenol), 25.3 wt % of the corresponding trinuclear condensate, 9.3 wt % of the corresponding tetranuclear condensate and the rest are the condensates of pentanuclear or higher) | 6.0 parts |
| Aqueous solution of 10% polyvinylalcohol | 18.8 parts |
| Water | 11.2 parts |

Further, the following Solutions B to D are separately subjected to wet grinding in a sand grinder to the average particle diameter of 0.5 μm.

Solution B (Dispersion Solution of a Basic Colorless Dye):

| | |
|---|---|
| 3-Dibutylamino-6-methyl-7-anilinofluoran (product name: ODB-2, Yamamoto Chemicals Inc.) | 3.0 parts |
| Aqueous solution of 10% polyvinylalcohol | 6.9 parts |
| Water | 3.9 parts |

Solution C (Dispersion Solution of a Sensitizer):

| | |
|---|---|
| 1,2-Bis(phenoxymethyl)benzene (product name: PMB-2, Nicca Chemical CO., Ltd.) | 6.0 parts |
| Aqueous solution of 10% polyvinylalcohol | 18.8 parts |
| Water | 11.2 parts |

Solution D (Dispersion Solution of a Stabilizer)

| | |
|---|---|
| Color-developing composition of the present invention | 6.0 parts |
| Aqueous solution of 10% polyvinylalcohol | 18.8 parts |
| Water | 11.2 parts |

Next, the dispersion solutions are mixed at the following ratio to obtain a thermal color-forming layer coating solution.

| | |
|---|---|
| Solution A (Dispersion solution of a color-developing agent) | 36.0 parts |
| Solution B (Dispersion solution of a basic colorless dye) | 13.8 parts |
| Solution C (Dispersion solution of a sensitizer) | 36.0 parts |
| Solution D (Dispersion solution of a stabilizer) | 36.0 parts |
| Aluminum hydroxide (50% dispersion solution) | 3.2 parts |
| Polyvinylalcohol (10% solution) | 25.0 parts |

Protective Layer Coating Solution

| | |
|---|---|
| Dispersion solution of kaolin (product name: Contour 1500, Imerys Minerals Japan K.K., consitutent: kaolin content of 50 wt %, aspect ratio: 60, average particle diameter: 2.5 μm, oil absorption: 45 ml/100 g) | 9.0 parts |
| Aqueous solution of 10% carboxy-denatured polyvinyl-alcohol (KL118, KURARAY CO., LTD. (polymerization degree: approximately 1700, saponification degree: 95-99 mol %, sodium acetate: 3% or less)) | 30.0 parts |
| Polyamide-epichlorohydrine resin (WS4020, SEIKO PMC Corp., solid content: 25%, cationization degree: 2.7, molecular weight: 2.2 million, quaternized amine) | 4.0 parts |

-continued

| | |
|---|---|
| Denatured polyamine-type resin (product name: Sumirez Resin SPI-102A, Sumitomo Chemical Industries Co., Ltd., solid content: 45%) | 2.2 parts |
| Zinc stearate (product name: HYDRIN Z-7-30, Chukyo Yushi Co., Ltd., solid content: 30%) | 2.0 parts |

An under layer coating solution is applied and dried (blast dryer, 60° C., 2 min) on one surface of a high-quality paper (base paper of 47 g/$m^2$) using a Mayer Bar to result in 10.0 g/$m^2$ to obtain an undercoating paper. A thermal color-forming layer coating solution is applied and dried (blast dryer, 60° C., 2 min) on the under layer of this undercoating paper to result in the coating amount of 6.0 g/$m^2$. Further, a protective layer coating solution is applied on the thermal color-forming layer to result in the coating amount of 3.0 g/$m^2$ and dried. This sheet is subjected to a super calendar treatment to attain the smoothness of 1500-3000 seconds to obtain a thermal recording body.

EXAMPLE 64

Production of a Thermal Recording Material (A) Preparation of a Thermal Coating Solution 35 parts of 3-dibutylamino-6-methyl-7-anilinofluoran, which is a dye precursor, is ground in a ball mill for 24 hours together with 70 parts of aqueous solution of 2.5% polyvinylalcohol to obtain dispersion solution of a dye.

Subsequently, 70 parts of zinc 3,5-di-tert-butylsalicylic acid and 30 parts of a color-developing composition of the present invention are ground in a ball mill together with 300 parts of aqueous solution of 2.5% polyvinylalcohol to obtain dispersion solution of an electron-accepting compound having the volume average particle diameter of 2 μm or less.

The above two kinds of dispersion solutions are mixed, then, thereto is added a dispersion solution in which 70 parts of 2-benzyloxynaphthalene is dispersed in a ball mill with 280 parts of aqueous solution of 2.5% polyvinylalcohol; 500 parts of water dispersion of 20% calcium carbonate; 50 parts of water dispersion of 40% zinc stearate; and 170 parts of water. The resultant is mixed well to prepare a thermal coating solution.

(B) Production of a Thermal Coating Paper

The coating solution consisting of the following constituents is coated and dried on a base paper with a basis weight of 40 g/$m^2$ to result in the solid coating amount of 9 g/$m^2$ to produce a thermal coating paper.

| | |
|---|---|
| Fired kaolin | 100 parts |
| Water dispersion of 50% styrene-butadiene latex | 24 parts |
| Water | 200 parts |

(C) Production of a Thermal Recording Material

The thermal coating solution prepared in the above (A) is applied and dried on the thermal coating paper produced in the above (B) to result in the solid coating amount of 4 g/$m^2$ to produce a thermal recording material.

EXAMPLE 65

Production of a Thermal Recording Material (A) Preparation of a Thermal Coating Solution 30 parts of 3-(N,N'-dibutylamino)-6-methyl-7-anilinofluoran, which is a dye precursor developing black color tone, is ground in a ball mill for 24 hours together with 70 parts of aqueous solution of 2.5% polyvinylalcohol to obtain dispersion solution of a dye precursor. Then, 65 parts of benzyl 4-hydroxybenzoate as an electron-accepting compound, 5 parts of a color-developing composition of the present invention, and 70 parts of benzyl-2-naphthyl eter as a sensitizer are ground in a ball mill together with 420 parts of aqueous solution of 2.5% polyvinylalcohol to obtain a dispersion solution containing an electron-accepting compound having the volume average particle diameter of 2 μm or less. The above two kinds of dispersion solutions are mixed, and thereto is added following additives under stirring. The resultant is mixed well to prepare a coating solution for forming a thermal recording layer.

| | |
|---|---|
| Water dispersion of 50% calcium carbonate | 60 parts |
| Water dispersion of 40% zinc stearate | 15 parts |
| Aqueous solution of 10% polyvinylalcohol | 250 parts |
| Water | 200 parts |

(B) Production of a Thermal Coating Paper

The coating solution consisting of the following constituents is coated and dried on a high-quality paper with a basis weight of 40 g/$m^2$ to result in the solid coating amount of 10 g/$m^2$ to produce a thermal coating paper.

| | |
|---|---|
| Fired, kaolin | 100 parts |
| Water dispersion of 50% styrene-butadiene latex | 24 parts |
| Water | 200 parts |

(C) Production of a Thermal Recording Material

The coating solution for forming a thermal recording layer produced in the above (A) is applied and dried on the thermal coating paper produced in the above (B) to result in the coating amount of the dye precursor being 0.4 g/$m^2$ to produce a thermal recording material.

EXAMPLE 66

(A1) Preparation of a Coating Solution for Forming a Multicolor Thermal Recording Layer (High-Temperature Color-Forming Layer)

3 parts of 3-dibutylamino-6-methyl-7-anilinofluoran, which is a dye precursor for black color formation, is ground in a ball mill together with 7 parts of aqueous solution of 2% polyvinylalcohol to obtain 10 parts of dispersion solution of a dye precursor having the volume average particle diameter of 1 μm. Then, 5 parts of 2,2'-bis {4-(4-hydroxyphenylsulfonyl) phenoxy}diethyl eter, which is a color-developing agent, is ground in a ball mill together with 10 parts of aqueous solution of 2% polyvinylalcohol to obtain 15 parts of dispersion solution of a color-developing agent having the volume average particle diameter of 1 μm.

The above two kinds of dispersion solutions are mixed to prepare a coating solution for forming a multicolor thermal recording layer (high-temperature color-forming layer).

(A2) Preparation of a Coating Solution for Forming a Multicolor Thermal Recording Layer (Low-Temperature Color-Forming Layer)

3 parts of 3-diethylamino-7-chlorofluoran, which is a dye precursor for red color formation, is ground in a ball mill together with 7 parts of aqueous solution of 2% polyvinylalcohol to obtain 10 parts of dispersion solution of a dye precursor having the volume average particle diameter of 1 μm. Then, 5 parts of a color-developing composition of the present invention, which is an electron-accepting color-developing agent, is ground in a ball mill together with 10 parts of aqueous solution of 2% polyvinylaleohol to obtain 15 parts of dispersion solution of a color-developing agent having the volume average particle diameter of 1 μm. Further, 5 parts of di-p-methylbenzyl oxalate is ground in a ball mill together with 10 parts of aqueous solution of 2% polyvinylalcohol to obtain 15 parts of dispersion solution of di-p-methylbenzyl oxalate having the volume average particle diameter of 1 μm. Further, 3 parts of calcium carbonate is ground in a homogenizer together with 7 parts of aqueous solution of 2% sodium hexametaphosphate to obtain 10 parts of dispersion solution of calcium carbonate having the volume average particle diameter of 1 μm. The above four kinds of dispersion solutions are mixed to prepare a coating solution for forming a multicolor thermal recording layer (low-temperature color-forming layer).

(B) Production of a Thermal Coating Paper

| | |
|---|---|
| Fired kaolin | 100 parts |
| Water dispersion of 50% styrene-butadiene latex | 24 parts |
| Water | 200 parts |

The coating solution consisting of the above constituents is coated and dried on a high-quality paper with a basis weight of 50 g/$m^2$ to result in the solid coating amount of 10 g/$m^2$ to produce a thermal layer coating paper.

(C1) Preparation of a Coating Solution for Forming an Overcoat Layer 45 parts of 45% acrylic resin (Boncoat AN258, Dainippon Ink & Chemicals, Inc., elongation degree: 500%, tensile strength: 110 kgf/$cm^2$), 45 parts of dispersion solution of 40% low-density polyolefin (Chemipal M200, Mitsui Chemical Co., Ltd., average particle diameter: 6 μm) and 10 parts of dispersion solution of calcium carbonate (which is obtained by grinding 3 parts of calcium carbonate in a homogenizer together with 7 parts of 2% sodium hexametaphosphate) are mixed to prepare a coating solution for forming an overcoat layer.

(D1) Production of a Multicolor Thermal Recording Layer

The coating solution for forming a multicolor thermal recording layer (high-temperature color-forming layer) produced in the above (A1) is applied and dried on the thermal coating paper produced in the above (B) to result in the solid coating amount of 3 g/$m^2$. Further thereto, a coating solution for forming a multicolor thermal recording layer (low-temperature color-forming layer) prepared in the above (A2) is applied to result in the solid coating amount of 2 g/$m^2$ and dried, followed by a calendar treatment to attain the Beck smoothness on the coated surface of 400-500 seconds. A multicolor thermal recording layer is thus obtained.

Onto the multicolor thermal recording layer provided in the (D1), the coating solution for forming an overcoat layer prepared in the above (C1) is applied and dried to result in the solid coating amount of 1.5 g/$m^2$. Then, a calendar treatment is conducted to attain the Beck smoothness on the coated surface of 600-800 seconds to produce a thermal recording medium.

EXAMPLE 67

Preparation of an Undercoat Layer Coating Solution

A composition consisting of 100 parts of fired kaolin (product name: Ansilex, Engelhard Corp., oil absorption: 90 ml/100 g), 24 parts of styrene-butadiene latex with 50% solid concentration, and 200 parts of water is mixed and stirred to obtain a coating solution for an undercoat layer.

<Dispersion Solution A>

3-Dibutylamino-6-methyl-7-anilinofluoran (200 g) is dispersed in a mixture consisting of aqueous solution of 10% sulfone group-denatured polyvinylalcohol (200 g) and water (600 g). The resultant mixture is ground in a bead mill to the average particle diameter of 1 μM to obtain Dispersion solution A.

<Dispersion Solution B>

A color-developing composition of the present invention (100 g) and 4,4'-bis[2-[2-{4-(4-hydroxyphenylsulfonyl)phenoxy}ethyleneoxy]ethoxy]diphenylsulfone (100 g) are dispersed in a mixture consisting of aqueous solution of 10% sulfone group-denatured polyvinylalcohol (200 g) and water (600 g). The resultant mixture is ground in a bead mill to the average particle diameter of 0.7 μm to obtain Dispersion solution B.

<Dispersion Solution C>

Benzyl-2-naphthylether (200 g) is dispersed in a mixture consisting of aqueous solution of 10% sulfone group-denatured polyvinylalcohol (200 g) and water (600 g). The resultant mixture is ground in a bead mill to the average particle diameter of 1 μm to obtain Dispersion solution C.

<Dispersion Solution D>

Calcium carbonate (200 g) is dispersed in aqueous solution of 0.2% sodium polyacrylate salt (800 g) and stirred using a homomixer for 10 minutes to obtain Dispersion solution D.

Preparation of a Thermal Recording Layer Coating Solution

The above dispersion solutions are used and the materials are mixed at the following ratio. Thereto is added water to obtain the aqueous solution with the concentration of thermal coating solution being 17%. The resultant solution is stirred well to prepare a thermal recording layer coating solution.

| | |
|---|---|
| Dispersion solution A | 30 parts |
| Dispersion solution B | 70 parts |
| Dispersion solution C | 70 parts |
| Dispersion solution D | 10 parts |
| Dispersion solution of 40% zinc stearate | 4 parts |
| Dispersion solution of 30% paraffin wax | 6 parts |
| Aqueous solution of 10% silicon-denatured polyvinylalcohol | 15 parts |
| 20% Acrylic emulsion | 20 parts |

<Dispersion Solution 1>

Amorphous silica with the specific surface area of 350 $m^2$/g (product name: Mizucasile P-78A, Mizusawa Industrial Chemicals, Ltd.) (120 g) is dispersed in aqueous solution of 0.2% sodium polyacrylate salt (880 g) and stirred using a homomixer for 10 minutes to obtain Dispersion solution 1.

Preparation of a Protective Layer Coating Solution

The above dispersion solution is used and the materials are mixed at the following ratio. Thereto is added water to obtain the aqueous solution with the concentration of protective layer coating solution being 9%. The resultant solution is stirred well to prepare a protective layer coating solution.

| | |
|---|---|
| Dispersion solution 1 | 100 parts |
| 20% Acrylic emulsion | 40 parts |
| Dispersion solution of 40% zinc stearate | 5 parts |

Production of a Thermal Recording Material

Onto one surface of a high-quality neutralized paper with a basis weight of 70 g/$m^2$, sequentially applied and dried are an undercoat layer coating solution with the solid coating amount of 9 $g/m^2$, a thermal recording layer coating solution with the coating amount of a dye precursor being 0.6 $g/m^2$, and a protective layer coating solution with the solid coating amount of 1 $g/m^2$. An undercoat layer, a thermal recording layer and a protective layer are thus formed and subjected to a calendar treatment to produce a thermal recording material.

EXAMPLE 68

Production of a Support for Thermal Layer Coating

A coating solution consisting of 100 parts of fired laolin, 24 parts of water dispersion of 50% styrene-butadiene latex, and 200 parts of water is applied and dried on a high-quality paper with a basis weight of 50 $g/m^2$ to result in the solid coating amount of 9 $g/m^2$ to produce a support for thermal layer coating.

Solution A: Production of a Dispersion Solution of Low-Temperature Color-Forming Dye 4 parts of 3-diethylamino-7-chlorofluoran, which is a dye precursor for red color formation, is ground in a bead mill together with 6 parts of aqueous solution of 5% polyvinylalcohol to obtain dispersion solution of a dye precursor having the volume average particle diameter of 0.8 μm.

Solution B: Production of a Coating Solution of a High-Temperature Color-Forming Dye 5 parts of 3-dibutylamino-6-methyl-7-anilinofluoran, which is a dye precursor for black color formation, is ground in a bead mill together with 85 parts of aqueous solution of 2.5% polyvinylalcohol to obtain dispersion solution of a dye precursor having the volume average particle diameter of 1.0 μm. Subsequently, this dispersion solution is transferred to a polymerization vessel, to which 4 parts of methylmethacrylate and 1 part of ethyleneglycoldimethacrylate is added and heated to 70° C. under stirring. Thereto is added 5 parts of aqueous solution of 1% potassium persulfate, which is a polymerization initiator, and the reaction is occurred for 6 hours under continued stirring. Then, the resultant is cooled to room temperature to obtain 100 parts of dispersion solution of dye precursor powder provided with a low-sensitive color formation-controlling layer on its surface.

Solution C: Production of a Coating Solution for a Low-Temperature Color-Forming Dye 5 parts of 3-diethylamino-7-chlorofluoran, which is an electron-donating dye precursor for red color formation, is ground in a bead mill together with 85 parts of aqueous solution of 2.5% polyvinylalcohol to obtain dispersion solution of a dye precursor having the volume average particle diameter of 0.8 μm. Subsequently, this dispersion solution is transferred to a polymerization vessel, to which 2.5 parts of methylmethacrylate is added and heated to 70° C. under stirring. Thereto is added 2.5 parts of aqueous solution of 1% potassium persulfate, which is a polymerization initiator, and the reaction is occurred for 6 hours under continued stirring. Then, the resultant is cooled to room temperature to obtain 95 parts of dispersion solution of a low-temperature color-formation dye precursor that is thinly provided with a high-sensitive color formation-controlling layer on its surface.

Preparation of Dispersion Solution of a Color-Developing Agent

Each of the following compositions are separately ground in a bead mill to the volume average particle diameter of 1.0 μm to obtain 150 parts each of the dispersion solutions of color-developing agent (Solution D to Solution H).

Solution D Dispersion Solution of a Color-Developing Agent:

| | |
|---|---|
| 3,4-Dihydroxy-4'-methyldiphenylsulfone | 30 parts |
| Aqueous solution of 2% polyvinylalcohol | 120 parts |

Solution E Dispersion Solution of a Color-Developing Agent:

| | |
|---|---|
| 3,3'-Diallyl-4,4'-dihydroxydiphenylsulfone | 30 parts |
| Aqueous solution of 2% polyvinylalcohol | 120 parts |

Solution F Dispersion Solution of a Color-Developing Agent:

| | |
|---|---|
| Color-developing composition of the present invention | 30 parts |
| Aqueous solution of 2% polyvinylalcohol | 120 parts |

Solution G Dispersion Solution of a Color-Developing Agent:

| | |
|---|---|
| 4,4'-Dihydroxydiphenylsulfone | 30 parts |
| Aqueous solution of 2% polyvinylalcohol | 120 parts |

Solution H Dispersion Solution of a Color-Developing Agent:

| | |
|---|---|
| Benzyl 4-hydroxybenzoate | 30 parts |
| Aqueous solution of 2% polyvinylalcohol | 120 parts |

Preparation of a Coating Solution for Forming Multicolor Thermal Recording Layer Following dispersion solutions and additives are mixed well under stirring at the following ratio to prepare a coating solution for forming multicolor thermal recording layer.

| | |
|---|---|
| Solution A in the production example 2 (low-temperature-side dye coating solution) | 10 parts |
| Solution B in the production example 3 (high-temperature-side dye coating solution) | 100 parts |
| Solution D in the production example 5 (color-developing agent) | 100 parts |
| Solution E in the production example 5 (color-developing agent) | 50 parts |
| Water dispersion of 20% calcium carbonate | 200 parts |
| Water dispersion of 20% stearic acid amide | 150 parts |
| Water dispersion of 40% zinc stearate | 15 parts |
| Aqueous solution of 10% polyvinylalcohol | 50 parts |

A coating solution for forming multicolor thermal recording layer for producing a multicolor thermal recording material is applied and dried on a support for thermal coating to result in the solid coating amount of 8.0 $g/m^2$. Then, a calendar treatment is conducted to attain the Beck smoothness of 400-500 seconds to obtain a multicolor thermal recording material wherein two kinds of dispersion pawder are concurrently used as color-developing agents and wherein its low-temperature-side is consisted of dispersion powder of the dye precursor and its high-temperature-side is consisted of the dye precursor coated with a color formation-controlling layer.

EXAMPLE 69

Preparation of an Undercoat Layer Coating Solution

A composition consisting of 100 parts of fired clay, 24 parts of styrene-butadiene latex with a solid concentration of 50%, 30 parts of phosphate ester starch with the solid concentration of 20% and 200 parts of water is mixed and stirred to obtain an undercoat layer coating solution.

Preparation of a Thermal Recording Layer Coating Solution

<Dispersion Solution A>

3-Dibutylamino-6-methyl-7-anilinofluoran (200 g) is dispersed in a mixture consisting of aqueous solution of 10% sulfone group-denatured polyvinylalcohol (200 g) and water (600 g). The resultant mixture is ground in a bead mill to the average particle diameter of 1 μm to obtain Dispersion solution A.

<Dispersion Solution B>

A color-developing composition of the present invention (200 g) is dispersed in a mixture consisting of aqueous solution of 10% sulfone group-denatured polyvinylalcohol (200 g) and water (600 g). The resultant mixture is ground in a bead mill to the average particle diameter of 0.7 μm to obtain Dispersion solution B.

<Dispersion Solution C>

4-Hydroxy-4'-methyldiphenylsulfone (200 g) is dispersed in a mixture consisting of aqueous solution of 10% sulfone group-denatured polyvinylalcohol (200 g) and water (600 g). The resultant mixture is ground in a bead mill to the average particle diameter of 0.7 μm to obtain Dispersion solution C.

<Dispersion Solution D>

1,2-Bis(3-methylphenoxy)ethane (200 g) is dispersed in a mixture consisting of aqueous solution of 10% sulfone group-denatured polyvinylalcohol (200 g) and water (600 g). The resultant mixture is ground in a bead mill to the average particle diameter of 1 μm to obtain Dispersion solution D.

<Dispersion Solution E>

Amorphous silica (200 g) is dispersed in aqueous solution of 0.5% sodium polyacrylate salt (800 g) and stirred using a homomixer for 10 minutes to obtain Dispersion solution E.

<Dispersion Solution F>

Aluminum hydroxide (200 g) is dispersed in aqueous solution of 0.5% sodium polyacrylate salt (800 g) and stirred using a homomixer for 10 minutes to obtain Dispersion solution F.

The above dispersion solutions are used and the materials are mixed at the following ratio. Thereto is added water to obtain the aqueous solution with the concentration of thermal coating solution being 15%. The resultant solution is stirred well to prepare a thermal recording layer coating solution.

| | |
|---|---|
| Solution A | 40 parts |
| Solution B | 10 parts |
| Solution C | 70 parts |
| Solution D | 20 parts |
| Solution E | 60 parts |
| Solution F | 60 parts |
| Dispersion solution of 40% zinc stearate | 10 parts |
| Aqueous solution of 10% fully saponified PVA | 40 parts |

Production of a Thermal Recording Body

Onto one surface of a high-quality neutralized paper with a basis weight of 60 g/$m^2$, sequentially applied and dried are an undercoat layer coating solution with the solid coating amount of 10 g/$m^2$, and a thermal recording layer coating solution with the solid coating amount of a dye precursor being 0.3 g/$m^2$. An undercoat layer and a thermal recording layer are thus formed to produce a thermal recording material.

EXAMPLE 70

The mixtures consisting of the following constituents are ground and dispersed in a sand grinder to the average particle diameter of 1 μm or less to respectively prepare Solution [A], Solution [B] and Solution [C].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| Coumpound of formula (1) | 25 parts |
| Aqueous solution of 25% PVA | 20 parts |
| Water | 55 parts |

Solution [C]:

| | |
|---|---|
| p-Toluenesulfonate-β-phenoxyethyl ester | 25 parts |
| Aqueous solution of 25% PVA | 20 parts |
| Water | 55 parts |

Next, a thermal color-forming layer coating solution is prepared by mixing the following at the following ratio, and applied and dried on a high-quality paper with a basis weight of 50 g/$m^2$ to result in the dry amount of 8 g/$m^2$ to obtain a thermal color-forming layer.

| | |
|---|---|
| Solution [A] | 8 parts |
| Solution [B] | 16 parts |
| Solution [C] | 24 parts |
| Water dispersion of 50% calcium carbonate | 12 parts |
| 50% carboxylated styrene-butadiene copolymer latex | 7 parts |

(Formation of a Protective Layer)

Further, the protective layer coating solution consisting of the following ratio is applied and dried on the above-mentioned thermal color-forming layer to result in the dry amount of 2 g/$m^2$ to obtain a thermal recording material of the present invention which is provided with a protective layer.

| | |
|---|---|
| Emulsion of 40% styrene/acrylic acid ester copolymer | 20 parts |
| Water dispersion of 5% bentonite | 40 parts |
| Water dispersion of 30% zinc stearate | 3 parts |

EXAMPLE 71

The mixtures consisting of the following constituents are ground and dispersed in a sand grinder to the average particle diameter of 1 μm or less to respectively prepare Solution [A], Solution [B] and Solution [C].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| Coumpound of formula (1) | 25 parts |
| Aqueous solution of 25% PVA | 20 parts |
| Water | 55 parts |

Solution [C]:

| | |
|---|---|
| Dibenzoylmethane | 25 parts |
| Aqueous solution of 25% PVA | 20 parts |
| Water | 55 parts |

Next, a thermal color-forming layer coating solution is prepared by mixing the following at the following ratio, and applied and dried on a high-quality paper with a basis weight of 50 g/m$^2$ to result in the dry weight of 8 g/m$^2$ to obtain a thermal color-forming layer.

| | |
|---|---|
| Solution [A] | 8 parts |
| Solution [B] | 16 parts |
| Solution [C] | 24 parts |
| Water dispersion of 50% calcium carbonate | 12 parts |
| 50% carboxylated styrene-butadiene copolymer latex | 7 parts |

(Formation of a Protective Layer)

Further, the protective layer coating solution consisting of the following ratio is applied and dried on the above thermal color-forming layer to result in the dry weight of 2 g/m$^2$ to obtain a thermal recording material of the present invention which is provided with a protective layer.

| | |
|---|---|
| Emulsion of 40% styrene/acrylic acid ester copolymer | 20 parts |
| Water dispersion of 5% bentonite | 40 parts |
| Water dispersion of 30% zinc stearate | 3 parts |

EXAMPLE 72

(Formation of a Thermal Color-Forming Layer)

The mixtures consisting of the following constituents are ground and dispersed in a sand grinder to the average particle diameter of 1 μm or less to respectively prepare Solution [A], Solution [B] and Solution [C].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| Color-developing composition of the present invention | 25 parts |
| Aqueous solution of 25% PVA | 20 parts |
| Water | 55 parts |

Solution [C]:

| | |
|---|---|
| A 7:3 mixture of 1,3-p-menthanebisphenol and 2,8-p-menthanebisphenol (molecular weight: 324, melting point: 85° C. (DSC method)) | 25 parts |
| Aqueous solution of 25% PVA | 20 parts |
| Water | 55 parts |

Solution [D]:

| | |
|---|---|
| Di(4-methylbenzyl)oxalate | 25 parts |
| Aqueous solution of 25% PVA | 20 parts |
| Water | 55 parts |

Next, each solution obtained above and the following agents are mixed at the following ratio to prepare a thermal color-forming layer coating solution. This coating solution is applied and dried on a high-quality paper with a basis weight of 50 g/m$^2$ to result in the dry weight of 10 g/m$^2$ to obtain a thermal color-forming layer.

| | |
|---|---|
| Solution [A] | 8 parts |
| Solution [B] | 16 parts |
| Solution [C] | 8 parts |
| Solution [D] | 16 parts |
| Water dispersion of 50% calcium carbonate | 10 parts |
| Emulsion of 50% carboxylated SB copolymer | 10 parts |

(Formation of a Protective Layer)

Further, the mixture consisting of the following constituents is prepared as a protective layer coating solution which is applied and dried on the above thermal color-forming layer to result in the dry weight of 3 g/m$^2$ to obtain a thermal recording material of the present invention which is provided with a protective layer.

| | |
|---|---|
| Emulsion of 40% styrene/acrylic acid ester copolymer | 17 parts |
| Water dispersion of 5% bentonite | 30 parts |
| Water dispersion of 30% zinc stearate | 4 parts |

EXAMPLE 73

Formation of a Thermal Color-Forming Layer

The mixtures consisting of the following constituents are ground and dispersed in a sand grinder to the average particle diameter of 1 μm or less to respectively prepare Solution [A], Solution [B] and Solution [C].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| 2,2-Bis(4-hydroxy-3-methylphenyl)propane | 25 parts |
| Aqueous solution of 25% PVA | 20 parts |
| Water | 55 parts |

Solution [C]:

| | |
|---|---|
| Color-developing composition of the present invention | 25 parts |
| Aqueous solution of 25% PVA | 20 parts |
| Water | 55 parts |

Solution [D]:

| | |
|---|---|
| 1,2-bis(3-methylphenoxy)ethane | 25 parts |
| Aqueous solution of 25% PVA | 20 parts |
| Water | 55 parts |

Next, each solution obtained above and the following agents are mixed at the following ratio to prepare a thermal color-forming layer coating solution. This coating solution is applied and dried on a high-quality paper with a basis weight of 50 $g/m^2$ to result in the dry weight of 10 $g/m^2$ to form a thermal color-forming layer.

| | |
|---|---|
| Solution [A] | 8 parts |
| Solution [B] | 20 parts |
| Solution [C] | 8 parts |
| Solution [D] | 6 parts |
| Water dispersion of 50% calcium carbonate | 10 parts |
| Emulsion of 50% carboxylated SB copolymer | 6 parts |

(Formation of a Protective Layer)

Next, the mixture consisting of the following constituents is prepared as a protective layer coating solution. This coating solution is applied and dried on the above thermal color-forming layer to result in the dry weight of 3 $g/m^2$ to obtain a thermal recording material of the present invention which is provided with a protective layer.

| | |
|---|---|
| Emulsion of 40% styrene/acrylic acid ester copolymer | 17 parts |
| Water dispersion of 5% bentonite | 30 parts |
| Water dispersion of 30% zinc stearate | 4 parts |

EXAMPLE 74

Formation of a Thermal Color-Forming Layer

The mixtures consisting of the following constituents are ground and dispersed using a sand grinder to the average particle diameter of 1 μM or less to respectively prepare Solution [A], Solution [B], Solution [C] and Solution [D].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| 1,1-Bis(4-hydroxyphenyl)-1-phenylethane | 25 parts |
| Aqueous solution of 25% PVA | 20 parts |
| Water | 55 parts |

Solution [C]:

| | |
|---|---|
| Color-developing composition of the present invention | 25 parts |
| Aqueous solution of 25% PVA | 20 parts |
| Water | 55 parts |

Solution [D]:

| | |
|---|---|
| 1,2-bis(3-methylphenoxy)ethane | 25 parts |
| Aqueous solution of 25% PVA | 20 parts |
| Water | 55 parts |

Next, each solution obtained above and the following agents are mixed at the following ratio to prepare a thermal color-forming layer coating solution. This coating solution is applied and dried on a high-quality paper with a basis weight of 50 $g/m^2$ to result in the dry weight of 10 $g/m^2$ to form a thermal color-forming layer.

| | |
|---|---|
| Solution [A] | 8 parts |
| Solution [B] | 20 parts |
| Solution [C] | 8 parts |
| Solution [D] | 6 parts |
| Water dispersion of 50% calcium carbonate | 10 parts |
| Emulsion of 50% carboxylated SB copolymer | 6 parts |

(Formation of a Protective Layer)

Subsequently, the mixture consisting of the following constituents is prepared as a protective layer coating solution. This coating solution is applied and dried on the above thermal color-forming layer to result in the dry weight of 3 $g/m^2$ to obtain a thermal recording material of the present invention which is provided with a protective layer.

| | |
|---|---|
| Emulsion of 40% styrene/acrylic acid ester copolymer | 17 parts |
| Water dispersion of 5% bentonite | 30 parts |
| Water dispersion of 30% zinc stearate | 4 parts |

EXAMPLE 75

Mixtures consisting of the following constituents are ground and dispersed using a sand grinder to the average particle diameter of 1 μm or less to respectively prepare Solution [A], Solution [B], Solution [C] and Solution [D].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| Coumpound represented by formula (63) | 25 parts |
| 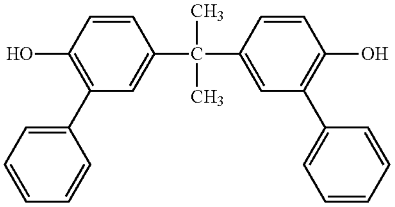 (63) | |
| Aqueous solution of 25% PVA | 20 parts |
| Water | 55 parts |

Solution [C]:

| | |
|---|---|
| Color-developing composition of the present invention | 25 parts |
| Aqueous solution of 25% PVA | 20 parts |
| Water | 55 parts |

Solution [D]:

| | |
|---|---|
| 1,2-Bis(3-methylphenoxy)ethane | 25 parts |
| Aqueous solution of 25% PVA | 20 parts |
| Water | 55 parts |

Next, each solution obtained above and the following agents are mixed at the following ratio to prepare a thermal color-forming layer coating solution. This coating solution is applied and dried on a high-quality paper with a basis weight of 50 g/m$^2$ to result in the dry weight of 10 g/m$^2$ to form a thermal color-forming layer.

| | |
|---|---|
| Solution [A] | 8 parts |
| Solution [B] | 20 parts |
| Solution [C] | 8 parts |
| Solution [D] | 6 parts |
| Water dispersion of 50% calcium carbonate | 10 parts |
| Emulsion of 50% carboxylated SB copolymer | 6 parts |

(Formation of a Protective Layer)

Subsequently, the mixture consisting of the following constituents is prepared as a protective layer coating solution. This coating solution is applied and dried on the above thermal color-forming layer to result in the dry weight of 3 g/m$^2$ to obtain a thermal recording material of the present invention which is provided with a protective layer.

| | |
|---|---|
| Emulsion of 40% styrene/acrylic acid ester copolymer | 17 parts |
| Water dispersion of 5% bentonite | 30 parts |
| Water dispersion of 30% zinc stearate | 4 parts |

EXAMPLE 76

Formation of a Thermal Color-Forming Layer

Mixtures consisting of the following constituents are ground and dispersed using a sand grinder to the average particle diameter of 1 μm or less to respectively prepare Solution [A], Solution [B], Solution [C] and Solution [D].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| α-type crystalline bis(3-allyl-4-hydroxyphenyl)sulfone | 25 parts |
| Aqueous solution of 25% PVA | 20 parts |
| Water | 55 parts |

Solution [C]:

| | |
|---|---|
| Color-developing composition of the present invention | 25 parts |
| Aqueous solution of 25% PVA | 20 parts |
| Water | 55 parts |

Solution [D]:

| | |
|---|---|
| 1,2-Bis(3-methylphenoxy)ethane | 25 parts |
| Aqueous solution of 25% PVA | 20 parts |
| Water | 55 parts |

Next, each solution obtained above and the following agents are mixed at the following ratio to prepare a thermal color-forming layer coating solution. This coating solution is applied and dried on a high-quality paper with a basis weight of 50 g/m$^2$ to result in the dry weight of 10 g/m$^2$ to form a thermal color-forming layer.

| | |
|---|---|
| Solution [A] | 16 parts |
| Solution [B] | 30 parts |
| Solution [C] | 15 parts |
| Solution [D] | 40 parts |
| Water dispersion of 50% calcium carbonate | 16 parts |
| Emulsion of 50% carboxylated SB copolymer | 12 parts |

(Formation of a Protective Layer)

Subsequently, the protective layer coating solution consisting of the following ratio is applied and dried on the above-mentioned thermal color-forming layer to result in the dry weight of 2 g/m$^2$ to obtain a thermal recording material of the present invention which is provided with a protective layer.

| | |
|---|---|
| Emulsion of 40% styrene/acrylic acid ester copolymer | 20 parts |
| Water dispersion of 5% bentonite | 40 parts |
| Water dispersion of 30% zinc stearate | 3 parts |

EXAMPLE 77

Formation of a Thermal Color-Forming Layer

Mixtures consisting of the following constituents are ground and dispersed using a sand grinder to the average particle diameter of 1 μm or less to respectively prepare Solution [A], Solution [B], Solution [C] and Solution [D].

Solution [A]:

| | |
|---|---|
| 3-Dibutylamino-6-methyl-7-anilinofluoran | 25 parts |
| Aqueous solution of 25% PVA | 20 parts |
| Water | 55 parts |

Solution [B]:

| | |
|---|---|
| Compound represented by formula (64) | 25 parts |
| 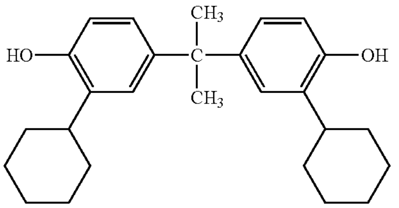 (64) | |
| Aqueous solution of 25% PVA | 20 parts |
| Water | 55 parts |

Solution [C]:

| | |
|---|---|
| Color-developing composition of the present invention | 25 parts |
| Aqueous solution of 25% PVA | 20 parts |
| Water | 55 parts |

Solution [D]:

| | |
|---|---|
| 1,2-Bis(3-methylphenoxy)ethane | 25 parts |
| Aqueous solution of 25% PVA | 20 parts |
| Water | 55 parts |

Next, each solution obtained above and the following agents are mixed at the following ratio to prepare a thermal color-forming layer coating solution. This coating solution is applied and dried on a high-quality paper with a basis weight of 50 g/$m^2$ to result in the dry weight of 7 g/$m^2$ to form a thermal color-forming layer.

| | |
|---|---|
| Solution [A] | 8 parts |
| Solution [B] | 16 parts |
| Solution [C] | 8 parts |

-continued

| | |
|---|---|
| Solution [D] | 16 parts |
| Water dispersion of 50% calcium carbonate | 8 parts |
| Emulsion of 50% carboxylated SB copolymer | 4 parts |

(Formation of a Protective Layer)

Subsequently, the mixture consisting of the following constituents is prepared as a protective layer coating solution. This coating solution is applied and dried on the above thermal color-forming layer to result in the dry weight of 3 g/$m^2$ to obtain a thermal recording material of the present invention which is provided with a protective layer.

| | |
|---|---|
| Emulsion of 40% styrene/acrylic acid ester copolymer | 17 parts |
| Water dispersion of 5% bentonite | 30 parts |
| Water dispersion of 30% zinc stearate | 4 parts |

EXAMPLE 78

(1) Preparation of Solution A 11.5 parts of a color-developing composition of the present invention as an organic acid substance, 11.5 parts of the compound 4 as a sensitizer and 46 parts by weight of aqueous solution of 5 wt % PVA are ground and mixed using a sand mill to prepare Solution A in which powder having the average particle diameter of 0.8 μm are suspended.

(2) Preparation of Solution B 5.5 parts of 7'-anilino-3'-(dibutylamino)-6'-methylfluoran and 49.5 parts of aqueous solution of 5 wt % PVA are ground and mixed using a paint shaker to prepare Solution B in which powder having the average particle diameter of 0.8 μm are suspended.

(3) Preparation of a Thermal Recording Paper 20 parts of Solution A, 10 parts of Solution B, 1 part of paraffin wax emulsion (HYDRIN Z-7, Chukyo Yushi Co., Ltd.), 4 parts of paraffin wax emulsion (HYDRIN P-7, Chukyo Yushi Co., Ltd.) and 11.5 parts of aqueous solution of 10 wt % PVA are mixed to prepare a coating solution. This coating solution is applied and dried on a base paper to prepare a thermal recording paper with the dry coating amount of 6 g/$m^2$.

EXAMPLE 79

Formation of an Undercoat Layer

| | |
|---|---|
| Dispersion solution of 40% fired clay | 45 parts |
| Aqueous solution of 15% polyvinylalcohol | 35 parts |
| Water | 20 parts |

The above composition is mixed to prepare an undercoat coating solution. This solution is applied and dried on a high-quality paper to result in the dry coating amount of 6 g/$m^2$ to form an undercoat layer.

Preparation of Solution A:

| | |
|---|---|
| 3-Dibutylamino-6-methyl-7-anilinofluoran | 30 parts |
| Aqueous solution of 15% polyvinylalcohol | 45 parts |
| Water | 25 parts |

This composition is ground in a sand grinder to the average particle diameter of 0.8 μm to obtain Solution A.

Preparation of Solution B-1:

| | |
|---|---|
| 2,4'-Dihydroxydiphenylsulfone | 20 parts |
| Color-developing composition of the present invention | 10 parts |
| Aqueous solution of 15% polyvinylalcohol | 20 parts |
| Water | 50 parts |

This composition is ground in a sand grinder to the average particle diameter of 1 μM to obtain Solution B-1.

Preparation of Solution C-1:

| | |
|---|---|
| Di-p-chlorobenzyl oxalate | 30 parts |
| Aqueous solution of 15% polyvinylalcohol | 20 parts |
| Water | 50 parts |

This composition is ground in a sand grinder to the average particle diameter of 1 μm to obtain Solution C-1.

Preparation of Solution D:

| | |
|---|---|
| Calcium carbonate (50% dispersion solution) | 10 parts |
| Polyvinylalcohol (15% solution) | 35 parts |
| Dispersion body of zinc stearate (30% solution) | 15 parts |
| Water | 40 parts |

This composition is dispersed using a disperser to obtain Solution D.

Formation of a Recording Layer:

| | |
|---|---|
| Solution A | 15 parts |
| Solution B-1 | 35 parts |
| Solution C-1 | 10 parts |
| Solution D | 40 parts |

The composition consisting of the above is mixed and stirred to obtain a thermal layer coating solution. The obtained thermal layer coating solution is applied and dried on the above undercoat layer to result in the dry weight of 6 $g/m^2$ to form a thermal recording layer, followed by a super calendar treatment to attain the Beck smoothness of 400 seconds or more. A thermal recording body of the interest is thus obtained.

EXAMPLE 80

1) Preparation of a Dispersant of a Color-Developing Agent (Solution A)

| | |
|---|---|
| 2-Anilino-3-methyl-6-N-ethyl-N-iso-pentylaminofluoran | 12.5 parts |
| 2-(2'-Methylanilino)-3-methyl-6-dibutylaminofluoran | 12.5 parts |
| Aqueous solution of 10% polyvinylalcohol (PVA-205, KURARAY CO., LTD) | 50 parts |
| Water | 25 parts |

The above mixture is ground in a sand grinder to the average particle diameter of 0.7 micron.

2) Preparation of Dispersion Solution of a Color-Developing Agent (Solution B)

| | |
|---|---|
| Color-developing composition of the present invention | 8 parts |
| HYDRIN Z-7-30 (dispersion solution of 30% fatty acid zinc, Chukyo Yushi Co., Ltd.) | 4 parts |
| CALSEEDS X-25 (calcium carbonate-type filler, Konoshima Chemical Co., Ltd.) | 8 parts |
| Aqueous solution of 10% polyvinylalcohol (PVA-205, KURARAY CO., LTD) | 70 parts |
| Sodium hexametaphosphate | 16 parts |
| Water | 35 parts |

The above mixture is ground in a sand grinder to the average particle diameter of 0.7 micron.

3) Preparation of Dispersion Solution of a Sensitizer )Solution C)

| | |
|---|---|
| 2-Benzyloxynaphthalene | 25 parts |
| Aqueous solution of 10% polyvinylalcohol (PVA-205, KURARAY CO., LTD) | 50 parts |
| Water | 25 parts |

The above mixture is ground in a sand grinder to the average particle diameter of 0.7 micron.

4) Preparation and Coating of a Thermal Coating Solution 10 parts of Solution A, 60 parts of Solution B and 20 parts of Solution C are mixed and stirred to obtain a thermal coating solution. This coating solution is applied and dried on a paper using a wire bar to result in the dry coating amount of 6 $g/m^2$, followed by a calendar treatment to smoothen the surface. A thermal recording paper is thus obtained.

EXAMPLE 81

Color-Forming Agent Component (A)

| | |
|---|---|
| Black 305 (Leuco dye manufactured by Yamada Chemical Co., LTd., 2'-anilino-3'-methyl-6'-dipentylaminospiro(iso-benzofran-1(1H), 9'-xanthene)-3-on) | 147 parts |
| Color-developing agent component (B): Color-developing composition of the present invention | 293 parts |

Photo-Curing Resin Component (C):

| | |
|---|---|
| UN3320HA (urethane acrylic resin manufactured by Negami Chemical Industrial Co., Ltd.) | 100 parts |
| Aronix M-111 (nonylphenoxyethyleneglycol acrylate manufactured by Toagosei Co., Ltd.) | 300 parts |

Photo-Curing Agent (D):

| | |
|---|---|
| 1-Hydroxycyclohexylphenylketone | 40 parts |

Procedure is carried out according to the above constituents. Photo-curing resin component (C) and Photo-curing agent component (D) are placed in a shielding flask, heated to 60° C., stirred well and cooled to room temperature. Thereto is added Color-forming agent component (A) and Color-developing agent component (B), which is mixed and dispersed using a 3-leg roll to obtain a thermal recording coating agent. Then, the obtained thermal recording coating agent is coated onto a PET film by off-set printing, and the coated PET film is cured using a high-pressure mercury lamp at 10 $mW/cm^2$ for 60 seconds to obtain a thermal recording sheet.

EXAMPLE 82

(1) Preparation of Solution A 3-(N,N-dibutylamino)-6-methyl-7-anilinofluoran (20 g) as a leuco dye and aqueous solution of 10% polyvinylalcohol (100 g) are ground well in a ball mill to prepare Solution A in which powder having the average particle diameter of 0.8 μm are suspended.

(2) Preparation of Solution B

A color-developing composition of the present invention (20 g) as an organic acid substance and aqueous solution of 10% polyvinylalcohol (100 g) are ground well in a ball mill to prepare Solution B in which powder having the average particle diameter of 0.8 μm are suspended.

(3) Preparation of Solution C

Methanesulfonate-2-naphthyl ester (20 g) as a sensitizer and aqueous solution of 10% polyvinylalcohol (100 g) are ground well in a ball mill to prepare Solution C in which powder having the average particle diameter of 0.8 μm are suspended.

(4) Preparation of a Thermal Recording Paper

The above dispersion solutions A, B and C are mixed at the weight ratio of 1:2:2. Calcium carbonate (50 g) is added to this mixture solution (200 g) and dispersed well to obtain a coating solution. This coating solution is applied and dried on a base paper to prepare a thermal recording paper with the dry coating amount of 6 $g/m^2$.

EXAMPLE 83

(Thermal Paper 1)

(a) Dispersion Solution of a Dye (Solution A)

| | |
|---|---|
| 3-Di-n-butylamino-6-methyl-7-anilinofluoran | 16 parts |
| Aqueous solution of 10% polyvinylalcohol | 84 parts |

(b) Dispersion Solution of a Color-Developing Agent (Solution B)

| | |
|---|---|
| Color-developing composition of Synthetic Example 1 | 16 parts |
| Aqueous solution of 10% polyvinylalcohol | 84 parts |

(c) Dispersion Solution of a Sensitizer (Solution C)

| | |
|---|---|
| Di(4-methylbenzyl)oxalate | 16 parts |
| Aqueous solution of 10% polyvinylalcohol | 84 parts |

(d) Dispersion Solution of a Loading Material (Solution D)

| | |
|---|---|
| Calcium carbonate | 27.8 parts |
| Aqueous solution of 10% polyvinylalcohol | 26.2 parts |
| Water | 71 parts |

Mixtures of solutions A to D consisting of the respective constituents are respectively ground well in a sand grinder to prepare the dispersion solutions consisting of the constituents of solutions A to D. A coating solution is prepared by mixing 1 part by mass of solution A, 2 parts by mass of solution B, 1 part by mass of Solution C and 4 parts by mass of solution D. This coating solution is applied and dried onto a white paper using a wire rod (Wire bar No. 12, Webster), followed by a calendar treatment to produce a thermal recording paper (coating amount: about 5.5 $g/m^2$ in terms of dry weight).

(Thermal Paper 2)

A thermal paper is produced similarly to (1), except that 1,2-bis(3-methylphenoxy)ethane was used instead of di(4-methylbenzyl)oxalate in the dispersion solution of a sensitizer (Solution C) in the above (1).

(Thermal Paper 3)

A thermal paper is produced similarly to (1), except that 1,2-bis(phenoxymethyl)benzene was used instead of di(4-methylbenzyl)oxalate in the dispersion solution of a sensitizer (Solution C) in the above (1).

(Thermal Paper 4)

A thermal paper is produced similarly to (1), except that diphenylsulfone was used instead of di(4-methylbenzyl)oxalate in the dispersion solution of a sensitizer (Solution C) in the above (1).

SYNTHIC EXAMPLE 2

To a 1 L four-neck recovery flask equipped with an agitator and a thermometer, water (89.1 g) and 16.0 g (0.40 mol) of NaOH were added and dissolved at 90° C. Thereto, 50.0 g (0.20 mol) of 4,4'-BPS was added. The resultant solution was heated to 110° C. and added dropwise with 7.2 g (0.05 mol) of DCEE. Upon completion of the dropwise addition, the solution was kept at 110° C. and subjected to a condensation reaction for 6 hours. Upon completion of the reaction, 440.0 g of water was added to the reaction solution which was then kept at room temperature and adjusted for pH by the addition of 65.0 g of 5% HCl. After adjusting the pH, 200 mL of MeOH was added to the reaction solution which was then refluxed for 3 hours at 90° C. and allowed to cool. A crystal was separated by filtration and dried under reduced pressure at 70° C. to obtain the yield of 21.2 g. The result of the high-performance liquid chromatography analysis conducted for this crystal is shown in Table 2.

SYNTHETIC EXAMPLE 3

To a 1 L four-neck recovery flask equipped with an agitator and a thermometer, water (14.5 g) and 8.0 g (0.20 mol) of NaOH were added and dissolved at 90° C. Thereto, 25.0 g (0.10 mol) of 4,4'-BPS was added. The resultant solution was heated to 110° C. and added dropwise with 7.1 g (0.05 mol) of DCEE. Upon completion of the dropwise addition, the solution was kept at 110° C. and subjected to a condensation reaction for 6 hours. Upon completion of the reaction, 250.0 g of water was added to the reaction solution which was then kept at room temperature and adjusted for pH by the addition of 13.0 g of 20% $H_2SO_4$. After adjusting the pH, 30 mL of MeOH was added to the reaction solution which was then refluxed for 1 hour at 90° C. and allowed to cool. A crystal was separated by filtration and dried under reduced pressure at 70° C. to obtain the yield of 22.8 g. The result of the high-performance liquid chromatography analysis conducted for this crystal is shown in Table 2.

SYNTHETIC EXAMPLE 4

To a 1 L four-neck recovery flask equipped with an agitator and a thermometer, water (89.1 g) and 16.0 g (0.40 mol) of NaOH were added and dissolved at 90° C. Thereto, 50.0 g (0.20 mol) of 4,4'-EPS was added. The resultant solution was heated to 110° C. and added dropwise with 15.7 g (0.11 mol) of DCEE. Upon completion of the dropwise addition, the solution was kept at 110° C. and subjected to a condensation reaction for 13 hours. Upon completion of the reaction, 440.0 g of water was added to the reaction solution which was then kept at room temperature and adjusted for pH by the addition of 5% HCl. After adjusting the pH, 300 mL of MeOH was added to the reaction solution which was then refluxed for 1 hour at 90° C. and allowed to cool. A crystal was separated by filtration and dried under reduced pressure at 70° C. to obtain the yield of 40.2 g. The result of the high-performance liquid chromatography analysis conducted for this crystal is shown in Table 2.

COMPARATIVE SYNTHETIC EXAMPLE 1

To a 1 L four-neck recovery flask equipped with an agitator and a thermometer, water (29.7 g) and 16.0 g (0.4 mol) of NaOH were added and dissolved at 90° C. Thereto, 50.0 g (0.2 mol) of 4,4'-BPS was added. The resultant solution was heated to 110° C. and added dropwise with 7.2 g (0.05 mol) of DCEE. Upon completion of the dropwise addition, the solution was kept at 110° C. and subjected to a condensation reaction for 6 hours. Upon completion of the reaction, 200.0 g of water was added to the reaction solution which was then kept at room temperature and adjusted for pH by the addition of 98.0 g of 5% HCl. After adjusting the pH, a crystal was separated by filtration and dried under reduced pressure at 70° C. to obtain the yield of 21.0 g. The result of the high-performance liquid chromatography analysis conducted for this crystal is shown in Table 2.

COMPARATIVE SYNTHETIC EXAMPLE 2

To a 1 L four-neck recovery flask equipped with an agitator and a thermometer, water (29.7 g) and 16.0 g (0.4 mol) of NaOH were added and dissolved at 90° C. Thereto, 50.0 g (0.2 mol) of 4,4'-BPS was added. The resultant solution was heated to 110° C. and added dropwise with 12.7 g (0.09 mol) of DCEE. Upon completion of the dropwise addition, the solution was kept at 110° C. and subjected to a condensation reaction for 6 hours. Upon completion of the reaction, 200.0 g of water was added to the reaction solution which was then kept at room temperature and adjusted for pH by the addition of 83.0 g of 5% HCl. After adjusting the pH, a crystal was separated by filtration and dried under reduced pressure at 70° C. to obtain the yield of 35.0 g. The result of the high-performance liquid chromatography analysis conducted for this crystal is shown in Table 2.

COMPARATIVE EXAMPLE 3

To a 1 L four-neck recovery flask equipped with an agitator and a thermometer, water (29.7 g) and 16.0 g (0.4 mol) of NaOH were added and dissolved at 90° C. Thereto, 50.0 g (0.2 mol) of 4,4'-BPS was added. The resultant solution was heated to 110° C. and added dropwise with 15.7 g (0.11 mol) of DCEE. Upon completion of the dropwise addition, the solution was kept at 110° C. and subjected to a condensation reaction for 6 hours. Upon completion of the reaction, 200.0 g of water was added to the reaction solution which was then kept at room temperature and adjusted for pH by the addition of 62.5 g of 5% HCl. After adjusting the pH, a crystal was separated by filtration and dried under reduced pressure at 70° C. to obtain the yield of 31.2 g. The result of the high-performance liquid chromatography analysis conducted for this crystal is shown in Table 2.

TABLE 2

| | Raw Material | | Product (wt %) | | | | |
|---|---|---|---|---|---|---|---|
| | | | 4,4-BPS | | | | |
| | 4,4'-BPS (mol) | DCEE (mol) | Absolute Calibration | N = 1 compound | N = 2 compound | N = 3 compound | N = 4-6 compound |
| Synthetic Example | | | | | | | |
| 2 | 0.20 | 0.05 | 1.0 | 56.5 | 20.1 | 6.5 | 3.0 |
| 3 | 0.20 | 0.09 | 0.8 | 37.2 | 19.3 | 8.9 | 8.9 |
| 4 | 0.20 | 0.11 | 0.7 | 25.2 | 13.8 | 8.1 | 8.9 |
| Comparative Synthetic Example | | | | | | | |
| 1 | 0.20 | 0.05 | 4.5 | 63.2 | 20.6 | 6.0 | 2.5 |
| 2 | 0.20 | 0.09 | 4.4 | 35.2 | 19.3 | 9.4 | 8.1 |
| 3 | 0.20 | 0.11 | 4.4 | 28.1 | 15.7 | 9.3 | 8.7 |

EXAMPLE 84

(Thermal Paper 1)
(a) Dispersion Solution of a Dye (Solution A)

| | |
|---|---|
| 3-Di-n-butylamino-6-methyl-7-anilinofluoran | 16 parts |
| Aqueous solution of 10% polyvinylalcohol | 84 parts |

(b) Dispersion Solution of a Color-Developing Agent (Solution B)

| | |
|---|---|
| Color-developing composition of Synthetic Example 1 | 16 parts |
| Aqueous solution of 10% polyvinylalcohol | 84 parts |

(c) Dispersion Solution of a Loading Material (Solution C)

| | |
|---|---|
| Calcium carbonate | 27.8 parts |
| Aqueous solution of 10% polyvinylalcohol | 26.2 parts |
| Water | 71 parts |

First, mixtures of solutions A to C consisting of respective constituents were respectively ground well in a sand grinder to prepare the dispersion solutions of solutions A to D consisting of the respective constituents. A coating solution was prepared by mixing 1 part by mass of solution A, 2 parts by mass of solution B and 4 parts by mass of solution C. This coating solution was applied and dried on a white paper using a wire rod (Wire bar No. 12, Webster), followed by a calendar treatment to prepare a thermal recording paper (coating amount: about 5.5 $g/m^2$ in terms of dry weight).

(Thermal Paper 2)

A thermal paper was produced similarly to (Thermal paper 1), except that the composition of Synthetic Example 3 was used instead of the composition of Synthetic Example 2 in the dispersion solution of a color-developing agent (solution B) in the above (Thermal paper 1).

(Thermal Paper 3)

A thermal paper was produced similarly to the (Thermal paper 1), except that the composition of Synthetic Example 4 was used instead of the composition of Synthetic Example 2 in the dispersion solution of a color-developing agent (solution B) in the above (Thermal paper 1).

(Thermal Paper 4:Comparison)

A thermal paper was produced similarly to the (Thermal paper 1), except that the composition of Comparative Synthetic Example 1 was used instead of the composition of Synthetic Example 2 in the dispersion solution of a color-developing agent (solution B) in the above (Thermal paper 1).

(Thermal Paper 5Comparison)

A thermal paper was produced similarly to the (Thermal paper 1), except that the composition of Comparative Synthetic Example 2 was used instead of the composition of Synthetic Example 2 in the dispersion solution of color-developing agent (solution B) in the above (Thermal paper 1).

(Thermal Paper 6Comparison)

A thermal paper was produced similarly to the (Thermal paper 1), except that the composition of Comparative Synthetic Example 3 was used instead of the composition of Synthetic Example 2 in the dispersion solution of color-developing agent (solution B) in the above (Thermal paper 1).

(Test 1) Thermal Assessment Test (Background Heat Resistance Test)

A part of the thermal papers 1 to 6 produced in the above was cut off and kept in a thermostat device (Product name: DK-400, Yamato Scientific Co., Ltd.) for 24 hours at 80° C., 90° C. and 100° C., and the background density (Macbeth value) of each test paper was measured. The results are shown in Table 3.

It means that the smaller the Macbeth value is, the whiter and the more superior the tested paper is. As shown in the following table, recording materials of the present invention demonstrate a remarkable effect in the background heat resistance test at a high temperature of 90° C. or more.

TABLE 3

(Test results for Example 84)

| Thermal paper | Color-developing composition | Assessment of thermal recording paper (Background heat resistance test) 80° C. | 90° C. | 100° C. |
|---|---|---|---|---|
| 1 | Reaction composition of Synthetic Example 2 | 0.14 | 0.37 | 0.52 |
| 2 | Reaction composition of Synthetic Example 3 | 0.12 | 0.22 | 0.38 |
| 3 | Reaction composition of Synthetic Example 4 | 0.11 | 0.16 | 0.25 |
| 4 | Reaction composition of Comparative Synthetic Example 1 | 0.19 | 0.55 | 0.87 |
| 5 | Reaction composition of Comparative Synthetic Example 2 | 0.14 | 0.30 | 0.53 |

TABLE 3-continued (Test results for Example 84)

| Thermal paper | Color-developing composition | Assessment of thermal recording paper (Background heat resistance test) 80° C. | 90° C. | 100° C. |
|---|---|---|---|---|
| 6 | Reaction composition of Comparative Synthetic Example 3 | 0.16 | 0.38 | 0.64 |

INDUSTRIAL APPLICABILITY

The present invention enables provision of a recording material which has a superior heat resistance on the background part as well as enabling reduction of the content of a dihydroxydiphenylsulfone derivative, such as 4,4'-dihydroxydiphenylsulfone, in a color-developing composition to 2% by mass or less or further to 1% by mass or less.

The invention claimed is:

1. A recording material that contains a color-developing composition comprising a reaction composition as a major component, wherein the reaction composition contains a mixture of compounds represented by formula (III):

(III)

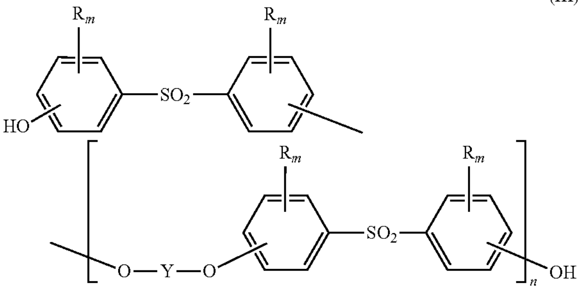

where:

each R independently represents a halogen atom, a C1-C6 alkyl group, or a C2-C6 alkenyl group;

Y either represents:

a linear, branched, or cyclic C1-C12 hydrocarbon group that may have an ether bond, or represents one of the following formulas:

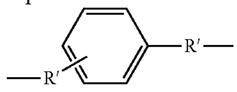

or

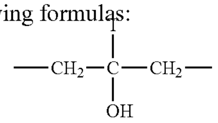

where:

R' represents a methylene group or ethylene group; and

T represents a hydrogen atom or C1-C4 alkyl group;

m represents an integer of 0 to 4; and n represents an integer of 1 to 6;

which is obtained by reacting a dihydroxydiphenylsulfone derivative represented by formula (I):

(I)

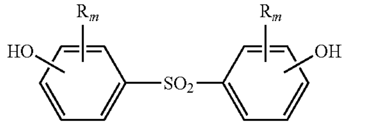

where each R and m is as defined above;

with a dihalide represented by formula (II):

X—Y—X (II)

where X represents a halogen atom and Y has the same meaning as defined above;

wherein:

a content of a n=1 compound of formula (III) in the reaction composition is 10 to 60% by mass relative to a solid content of the entire reaction composition; and a content of the dihydroxydiphenylsulfone derivative represented by formula (I) in the reaction composition is 2% by mass or less relative to the solid content of the entire reaction composition.

2. The recording material according to claim 1, wherein the dihydroxydiphenylsulfone derivative represented by formula (I) is 4,4'-dihydroxydiphenylsulfone.

3. A color-developing composition that comprises a reaction composition as a main component, wherein the reaction composition contains a mixture of compounds represented by formula (III):

(III)

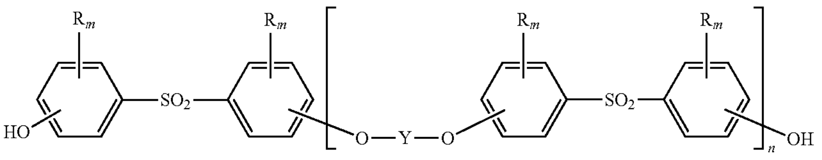

where:

each R independently represents a halogen atom, a C1-C6 alkyl group, or a C2-C6 alkenyl group;

Y either represents:

a linear, branched, or cyclic C1-C12 hydrocarbon group that may have an ether bond, or represents one of the following formulas:

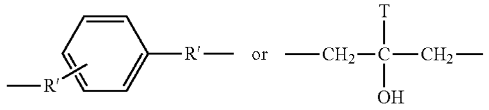

where:

R' represents a methylene group or ethylene group; and

T represents a hydrogen atom or C1-C4 alkyl group;

m represents an integer of 0 to 4; and n represents an integer of 1 to 6;

which is obtained by reacting a dihydroxydiphenylsulfone derivative represented by formula (I):

(I)

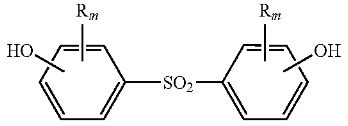

where each R and m is as defined above;

with a dihalide represented by formula (II):

X—Y—X (II)

where X represents a halogen atom and Y has the same meaning as defined above;

wherein:

a content of a n=1 compound of formula (III) in the reaction composition is 10 to 60% by mass relative to a solid content of the entire reaction composition; and a content of the dihydroxydiphenylsulfone derivative represented by formula (I) in the reaction composition is 2% by mass or less relative to the solid content of the entire reaction composition.

4. The color-developing composition according to claim 3, wherein the dihydroxydiphenylsulfone derivative represented by formula (I) is 4,4'-dihydroxydiphenylsulfone.

* * * * *